(12) United States Patent
Kim et al.

(10) Patent No.: US 11,349,207 B2
(45) Date of Patent: May 31, 2022

(54) ELECTRONIC DEVICE HAVING 5G ANTENNA

(71) Applicant: LG ELECTRONICS INC., Seoul (KR)

(72) Inventors: Dongjin Kim, Seoul (KR); Doochan Jung, Seoul (KR); Namyong Kim, Seoul (KR); Cheolwan Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 104 days.

(21) Appl. No.: 16/899,500

(22) Filed: Jun. 11, 2020

(65) Prior Publication Data

US 2021/0280971 A1    Sep. 9, 2021

(30) Foreign Application Priority Data

Mar. 9, 2020    (WO) ................ PCT/KR2020/003265

(51) Int. Cl.
*H01Q 21/06*    (2006.01)
*H01Q 3/26*    (2006.01)
*H01Q 21/28*    (2006.01)

(52) U.S. Cl.
CPC ......... *H01Q 3/2617* (2013.01); *H01Q 21/065* (2013.01); *H01Q 21/28* (2013.01)

(58) Field of Classification Search
CPC .............................. H01Q 1/243; H01Q 21/065
See application file for complete search history.

(56) References Cited

U.S. PATENT DOCUMENTS

| | | | |
|---|---|---|---|
| 2012/0249383 A1 | 10/2012 | Hsu et al. | |
| 2018/0026341 A1 | 1/2018 | Mow et al. | |
| 2020/0153115 A1* | 5/2020 | Yun | ........................ H01Q 9/065 |
| 2020/0287268 A1* | 9/2020 | Moon | ...................... H01Q 1/42 |

FOREIGN PATENT DOCUMENTS

| | | |
|---|---|---|
| KR | 20150053378 | 5/2015 |
| KR | 20200022161 | 3/2020 |
| KR | 20200023032 | 3/2020 |

OTHER PUBLICATIONS

PCT International Application No. PCT/KR2020/003265, International Search Report dated Dec. 2, 2020, 11 pages.

* cited by examiner

*Primary Examiner* — Daniel Munoz
(74) *Attorney, Agent, or Firm* — Lee Hong Degerman Kang & Waimey

(57) ABSTRACT

An electronic device having a fifth-generation (5G) antenna according to an embodiment is provided. The electronic device includes a cover glass through which electromagnetic waves are transmitted, a case having a metal rim formed on a side surface of the electronic device, and an antenna module configured to transmit or receive beamformed signals through a plurality of antenna elements, and wherein the antenna module is configured to be coupled with a module bracket, with being tilted at a predetermined slant angle from a baseline of the electronic device, so as to radiate the beamformed signals through the cover glass.

17 Claims, 30 Drawing Sheets

FIG. 5B

| SUBCARRIER SPACING: $f_o \times 2^m$, $f_o$ = 15kMz AND SCALING VALUE $2^m$, v {-2, 0, 1, 2,..., 5} | | | | | | | |
|---|---|---|---|---|---|---|---|
| m | -2 | 0 | 1 | 2 | 3 | 4 | 5 |
| SUBCARRIER SPACING[kHz] | 3.75 | 15 | 30 | 60 | 120 | 240 | 480 |
| LENGTH OF OFDM SYMBOL [ms] | 266.67 | 66.67 | 33.33 | 16.67 | 8.333 | 4.17 | 2.08 |

15kHz 1 SLOT(14 SYMBOLS) : 1ms SUBFRAME

| 0 | 1 | 2 | 3 | 4 | 5 | 6 | 7 | 8 | 9 | 10 | 11 | 12 | 13 |

| 0 | 1 | 2 | 3 | 4 | 5 | 6 | 7 | 8 | 9 | 10 | 11 | 12 | 13 | 30kHz 1 SLOT(14 SYMBOLS) : 0.5ms

| 0 | 1 | 15kHz 1 SLOT(2 SYMBOLS) : 0.2ms

| 0 | 1 | 2 | 3 | 30kHz MINI SLOT(4 SYMBOLS) : 0.2ms

| 0 | 1 | 2 | 3 | 4 | 5 | 6 | 60kHz MINI SLOT(7 SYMBOLS) : 0.125ms (a)

(b)

ELECTRONIC DEVICE HAVING 5G ANTENNA

CROSS-REFERENCE TO RELATED APPLICATION

Pursuant to 35 U.S.C. § 119, this application claims the benefit of earlier filing date and right of priority to International Application No. PCT/KR2020/003265, filed on Mar. 9, 2020, the contents of which are all hereby incorporated by reference herein in its entirety.

BACKGROUND

1. Technical Field

The present disclosure relates to an electronic device having a fifth-generation (5G) antenna. One particular implementation relates to an electronic device having an array antenna module operating a 5G mmWave band.

2. Description of the Related Art

Electronic devices may be divided into mobile/portable terminals and stationary terminals according to mobility. Also, the electronic device may be classified into handheld types and vehicle mount types according to whether or not a user can directly carry.

Functions of electronic devices are diversified. Examples of such functions include data and voice communications, capturing images and video via a camera, recording audio, playing music files via a speaker system, and displaying images and video on a display. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, an electronic device can be allowed to capture still images or moving images, play music or video files, play games, receive broadcast and the like, so as to be implemented as an integrated multimedia player.

Efforts are ongoing to support and increase the functionality of electronic devices. Such efforts include software and hardware improvements, as well as changes and improvements in the structural components.

In addition to those attempts, the electronic devices provide various services in recent years by virtue of commercialization of wireless communication systems using an LTE communication technology. In the future, it is expected that a wireless communication system using a 5G communication technology will be commercialized to provide various services. Meanwhile, some of LTE frequency bands may be allocated to provide 5G communication services.

In this regard, the electronic device may be configured to provide 5G communication services in various frequency bands. Recently, attempts have been made to provide 5G communication services using a Sub-6 band below a 6 GHz band. In the future, it is also expected to provide 5G communication services by using a millimeter wave (mmWave) band in addition to the Sub-6 band for faster data rate.

Meanwhile, antennas operating in a 5G mmWave band may be disposed on a side surface of the electronic device or inside the electronic device. In recent years, an electronic device such as a mobile terminal defines its external appearance using a metal frame made of a metal. When the appearance of the electronic device is defined by such metal frame, there is a problem that antenna performance of an antenna module in the 5G mmWave band may be deteriorated.

SUMMARY

The present disclosure is directed to solving the aforementioned problems and other drawbacks. Another aspect of the present disclosure is to provide an electronic device having a plurality of antenna modules operating in a 5G mmWave band.

Still another aspect of the present disclosure is to provide a structure for preventing interference with a metal frame in a plurality of antenna modules operating in a 5G mmWave band.

Still another aspect of the present disclosure is to improve antenna radiation characteristics in a plurality of antenna modules operating in a 5G mmWave band.

Still another aspect of the present disclosure is to improve antenna radiation characteristics in a plurality of antenna modules operating in a 5G mmWave band in a state where a metal rim for other antenna modules is disposed.

To achieve the above or other aspects, an electronic device having a 5G antenna according to one embodiment is provided. The electronic device may include a cover glass through which electromagnetic waves are transmitted, a case having a metal rim formed on side surfaces of the electronic device, and an antenna module configured to transmit or receive beamformed signals through a plurality of antenna elements. The antenna module may be configured to be coupled with a module bracket, with being tilted at a predetermined slant angle from a baseline of the electronic device, so as to radiate the beamformed signals through the cover glass.

In one embodiment, a part of a lower region of the antenna module may be disposed lower than the metal rim.

In one embodiment, the electronic device may further include a dielectric mold portion disposed between the metal rim and the cover glass. The predetermined slant angle may be determined in a manner that a beam coverage region by the antenna module is not blocked by the metal rim.

In one embodiment, the electronic device may further include a side key provided at the metal rim in a lengthwise direction of the antenna. The metal rim may include a lower metal rim disposed on a bottom of the side key and an upper metal rim disposed on a top of the side key.

In one embodiment, the dielectric mold portion may be formed inside the cover glass in a first region where the side key is not provided, so as to support a lower portion of the module bracket. The beam coverage area by the antenna module may be formed in a region of the dielectric mold portion and the cover glass, so as not to be blocked by the metal rim.

In one embodiment, the dielectric mold portion may be disposed on an upper portion of the upper metal rim to be located inside the cover glass in a second region where the side key is provided. The beam coverage area by the antenna module may be formed in a region of the dielectric mold portion and the cover glass, so as not to be blocked by the upper metal rim.

In one embodiment, the module bracket may be configured to be mounted on a slanted surface of a metal frame corresponding to the case.

in one embodiment, the case may be a middle case formed between a rear case of the electronic device and a front case corresponding to the cover glass. The metal frame corresponding to the middle case may include a hole reception portion integrally formed with the slanted surface. The hole reception portion may be coupled to a screw hole formed integrally with the module bracket through a screw for fixing the module bracket.

In one embodiment, the electronic device may further include a side key bracket having a hole formed therein to receive the side key, and configured to support the antenna module. The side key bracket may be formed of a dielectric, and a signal radiated through the antenna module may be radiated through the side key bracket and the cover glass.

In one embodiment, the module bracket may be provided with a lower end support portion formed on a lower end thereof and configured to support a lower portion of the antenna module. The side key bracket may be disposed on an upper portion of the lower end support portion and the antenna module and the side key bracket may partially overlap each other.

In one embodiment, the module bracket may be provided with an upper end support portion formed on an upper end thereof and configured to support an upper portion of the antenna module. One end of the upper end support portion may be configured not to cover a substrate of the antenna module to prevent blocking of the signal radiated through the antenna module.

In one embodiment, the antenna module may include a dielectric carrier disposed to be mounted on the module bracket, and at least one substrate disposed on an upper portion of the dielectric carrier. A plurality of antenna elements may be disposed at predetermined intervals on an upper or lower layer of a specific substrate of the at least one substrate of the antenna module.

In one embodiment, the plurality of antenna elements may be configured as arbitrary polygonal patch antennas or circular patch antennas in a rotated state by a predetermined angle. Beamforming may be performed by applying a phase-varied signal between the plurality of antenna elements within the antenna module.

In one embodiment, the electronic device may further include a first antenna module configured to radiate a first signal through another side surface of the electronic device. The antenna module may be a second antenna module configured to radiate a second signal through one side surface of the electronic device.

In one embodiment, the first antenna module may be disposed perpendicular to the baseline of the electronic device, and the second antenna module may be disposed to be tilted at a predetermined slant angle from the baseline of the electronic device. A lower end of the first antenna module may be disposed to be higher than an upper end of the metal rim, so that a signal radiated through the first antenna module is not blocked by the metal rim.

In one embodiment, the first antenna module may be disposed perpendicular to the baseline of the electronic device, and the second antenna module may be disposed to be tilted at a predetermined slant angle from the baseline of the electronic device. A part of a lower region of the first antenna module may be disposed to be lower than an upper end of the metal rim, and lower ends of antenna elements within the first antenna module are disposed to be higher than an upper end of the metal rim.

In one embodiment, the electronic device may further include a transceiver circuit operatively coupled with the first antenna module and the second antenna module, and configured to transmit or receive a first signal through the first antenna module and a second signal through the second antenna module. The electronic device may further include a baseband processor operatively coupled with the transceiver circuit, and configured to perform multiple input/output (MIMO) through the first signal and the second signal transmitted or received through the transceiver circuit.

In one embodiment, the electronic device may further include a third antenna module disposed with being spaced a predetermined distance apart from the first antenna module or the second antenna module and configured to radiate a third signal through a rear surface of the electronic device.

According to the present disclosure, a plurality of antenna modules operating in a 5G mmWave band can be disposed inside different side surfaces of an electronic device.

Further, the present disclosure can provide a structure capable of preventing interference with a metal frame by rotating a plurality of antenna modules operating in a 5G mmWave band at a predetermined angle.

In addition, according to the present disclosure, antenna radiation characteristics and CDF performance can be improved by way of rotating some of a plurality of antenna modules operating in a 5G mmWave band by a predetermined angle, and changing a shape of a metal frame.

In addition, according to the present disclosure, antenna radiation characteristics and CDF performance can be improved by way of rotating some of a plurality of antenna modules operating in a 5G mmWave band by a predetermined angle in a state where a metal rim for another antenna module is provided, and changing a shape of a metal frame.

Further scope of applicability of the present invention will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

BRIEF DESCRIPTION OF THE DRAWINGS

FIG. 5B is a view illustrating a change in a slot length in accordance with a change in a subcarrier spacing in the NR.

DETAILED DESCRIPTION OF THE EMBODIMENTS

Figure 1A:
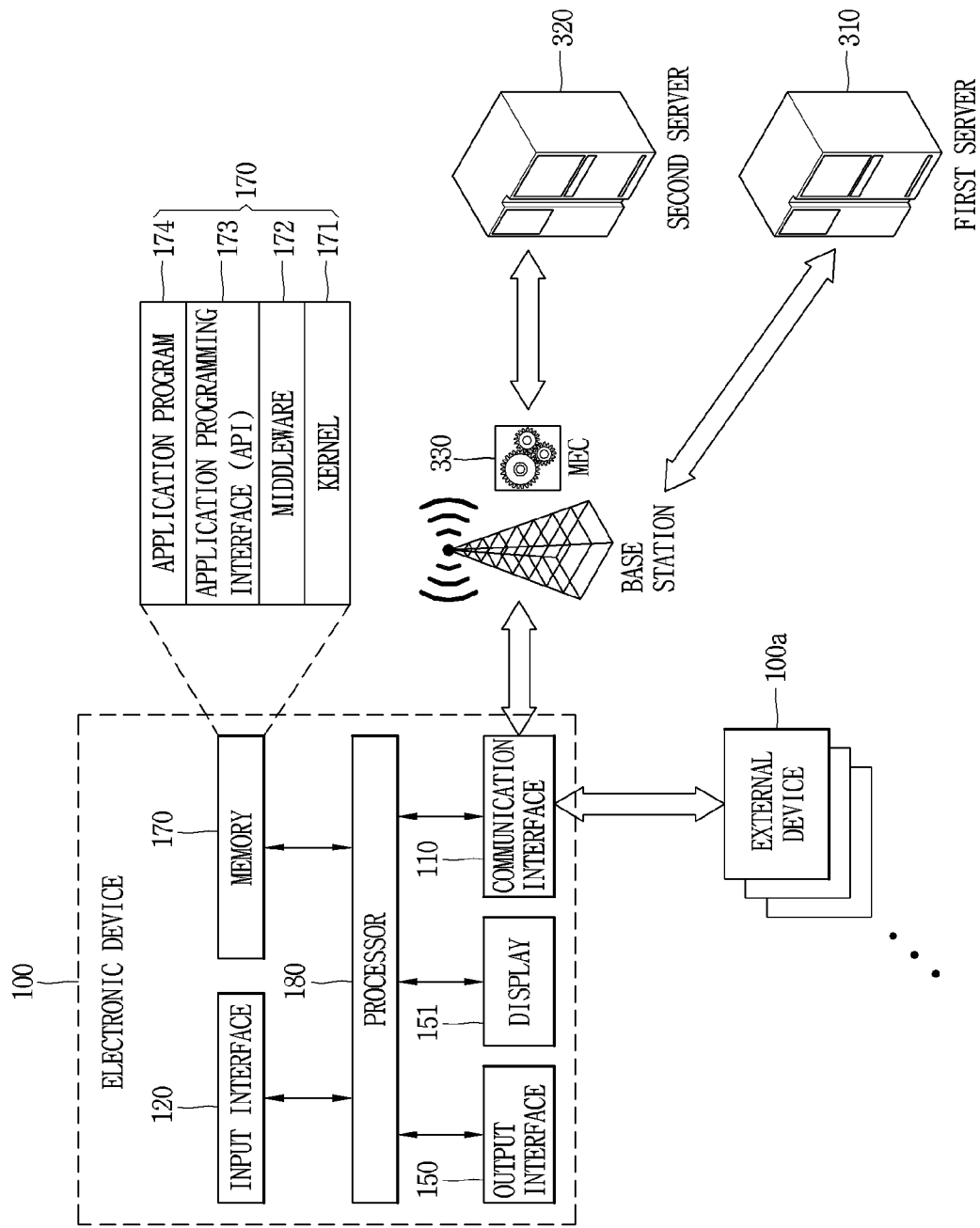
FIG. 1A is a view illustrating a configuration for describing an electronic device in accordance with one embodiment, and an interface between the electronic device and an external device or server.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, user equipment, laptop computers, digital broadcast terminals, personal digital assistants (PDAs), portable multimedia players (PMPs), navigators, portable computers (PCs), slate PCs, tablet PCs, ultra-books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Referring to FIGS. 1A to 10, FIG. 1A is a view illustrating a configuration for describing an electronic device in accordance with one embodiment, and an interface between the electronic device and an external device or server. FIG. 1B is a view illustrating a detailed configuration in which the electronic device according to the one embodiment is interfaced with an external device or a server. FIG. 1C is a view illustrating a configuration in which the electronic device according to the one embodiment is interfaced with a plurality of base stations or network entities.

Figure 2A:
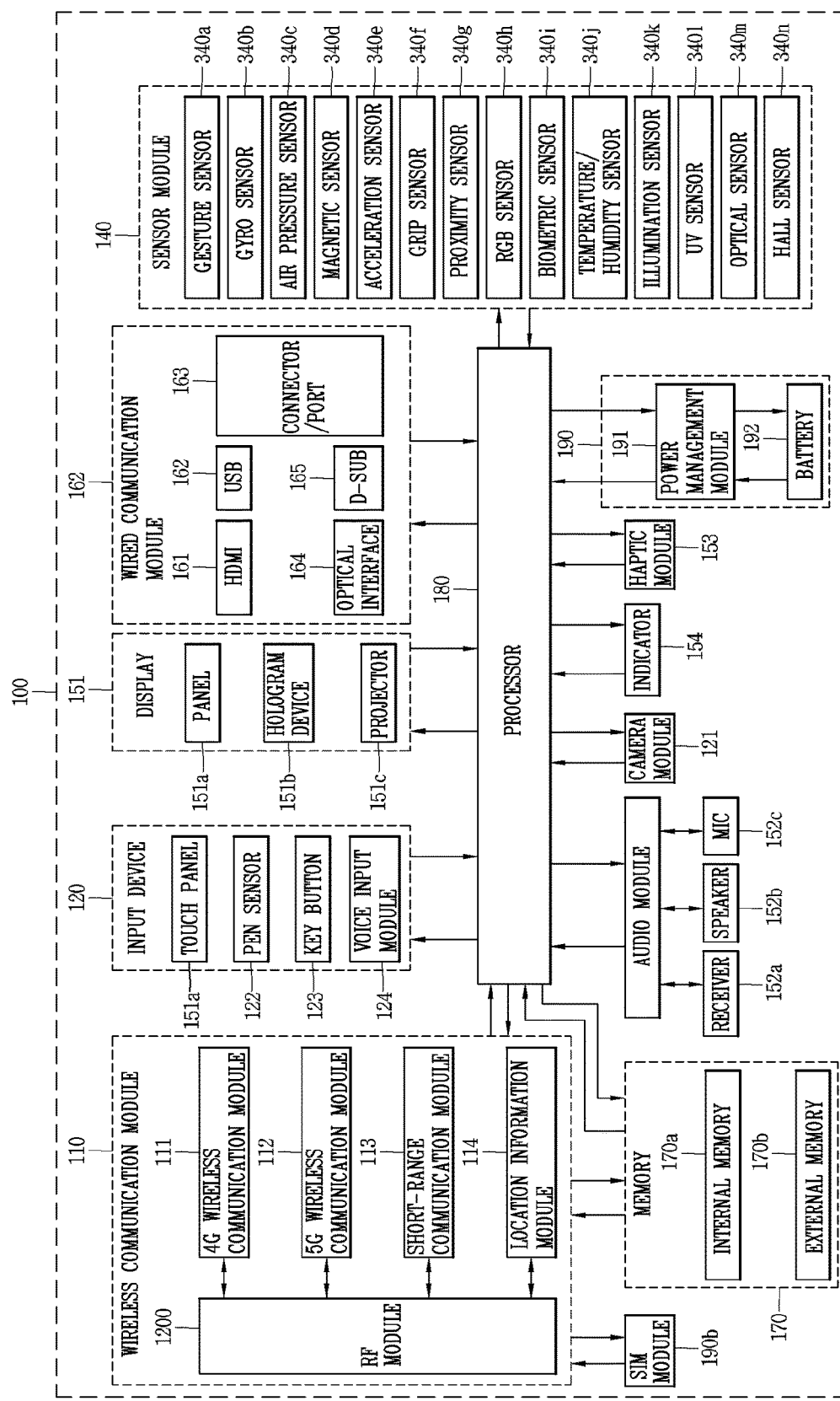
FIG. 2A is a view illustrating a detailed configuration of the electronic device of FIG. 1A.
Figure 2B:
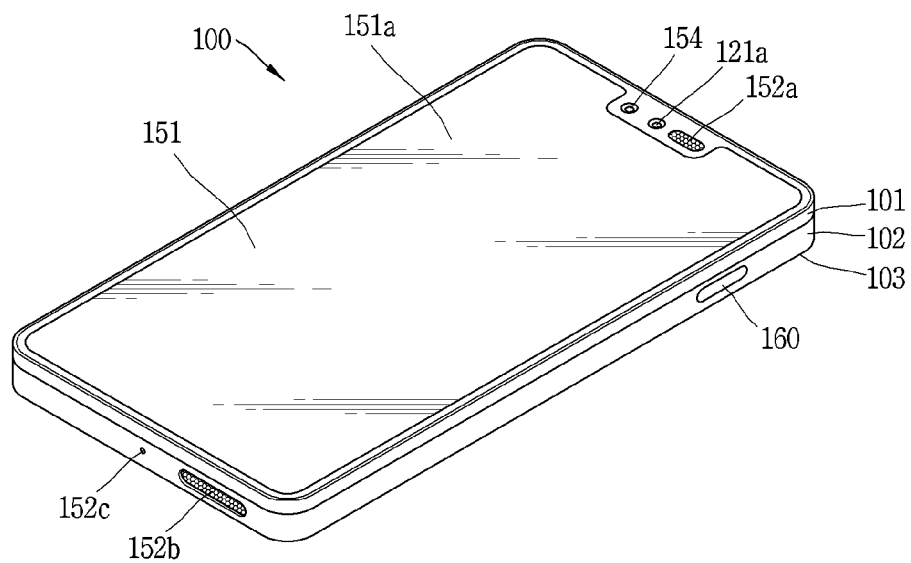
FIGS. 2B and 2C are conceptual views illustrating one example of an electronic device according to the present disclosure, viewed from different directions.
Figure 2C:
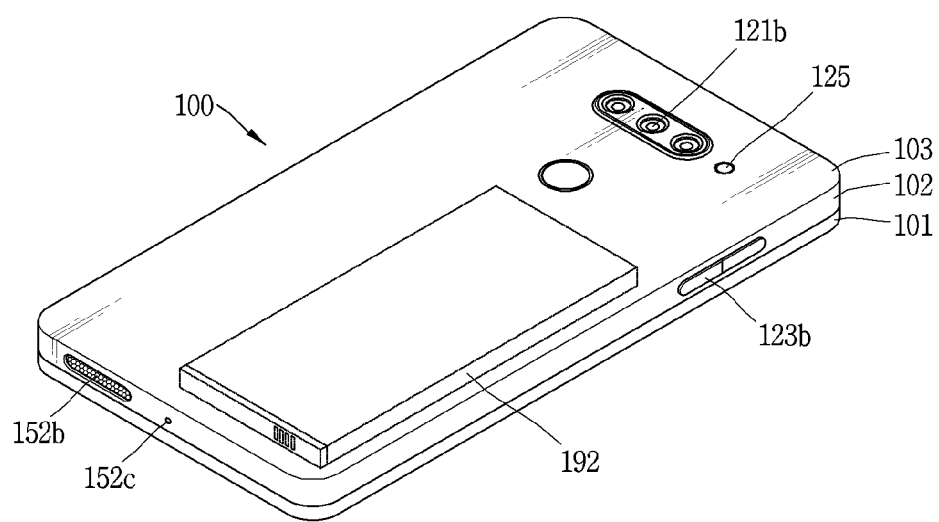

Meanwhile, referring to FIGS. 2A to 2C, FIG. 2A is a view illustrating a detailed configuration of the electronic device of FIG. 1A. FIGS. 2B and 2C are conceptual views illustrating one example of an electronic device according to the present disclosure, viewed from different directions.

Referring to FIG. 1A, the electronic device 100 is configured to include a communication interface 110, an input interface (or input device) 120, an output interface (or output device) 150, and a processor 180. Here, the communication interface 110 may refer to a wireless communication module 110. Also, the electronic device 100 may be configured to further include a display 151 and a memory 170. It is understood that implementing all of the illustrated components is not a requirement. Greater or fewer components may alternatively be implemented.

In more detail, among others, the wireless communication module 110 may typically include one or more modules which permit communications such as wireless communications between the electronic device 100 and a wireless communication system, communications between the electronic device 100 and another electronic device, or communications between the electronic device 100 and an external server. Further, the wireless communication module 110 may typically include one or more modules which connect the electronic device 100 to one or more networks. Here, the one or more networks may be a 4G communication network and a 5G communication network, for example.

Referring to FIGS. 1A and 2A, the wireless communication module 110 may include at least one of a 4G wireless communication module 111, a 5G wireless communication module 112, a short-range communication module 113, and a location information module 114. With regard to this, the 4G wireless communication module 111, the 5G wireless communication module 112, the short-range communication module 113, and the location information module 114 may be implemented as a baseband processor such as a modem. As one example, the 4G wireless communication module 111, the 5G wireless communication module 112, the short-range communication module 113, and the location information module 114 may be implemented as a transceiver circuit operating in an IF frequency band and a base processor. Meanwhile, the RF module 1200 may be implemented as an RF transceiver circuit operating in an RF frequency band of each communication system. However, the present disclosure is not limited thereto, and the 4G wireless communication module 111, the 5G wireless communication module 112, the short-range communication module 113, and the location information module 114 may be interpreted to include RF modules, respectively.

The 4G wireless communication module 111 may perform transmission and reception of 4G signals with a 4G base station through a 4G mobile communication network. In this case, the 4G wireless communication module 111 may transmit at least one 4G transmission signal to the 4G base station. In addition, the 4G wireless communication module 111 may receive at least one 4G reception signal from the 4G base station. In this regard, Uplink (UL) multi-input multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 112 may perform transmission and reception of 5G signals with a 5G base station through a 5G mobile communication network. Here, the 4G base station and the 5G base station may have a Non-Stand-Alone (NSA) structure. For example, the 4G base station and the 5G base station may be a co-located structure in which the stations are disposed at the same location in a cell. Alternatively, the 5G base station may be disposed in a Stand-Alone (SA) structure at a separate location from the 4G base station.

The 5G wireless communication module 112 may perform transmission and reception of 5G signals with a 5G base station through a 5G mobile communication network. In this case, the 5G wireless communication module 112 may transmit at least one 5G transmission signal to the 5G base station. In addition, the 5G wireless communication module 112 may receive at least one 5G reception signal from the 5G base station.

In this instance, 5G and 4G networks may use the same frequency band, and this may be referred to as LTE re-farming. Meanwhile, a Sub-6 frequency band, which is a range of 6 GHz or less, may be used as the 5G frequency band.

On the other hand, a millimeter wave (mmWave) range may be used as the 5G frequency band to perform broadband high-speed communication. When the mmWave band is used, the electronic device 100 may perform beam forming for communication coverage expansion with a base station.

On the other hand, regardless of the 5G frequency band, 5G communication systems can support a larger number of multi-input multi-output (MIMO) to improve a transmission rate. In this instance, UL MIMO may be performed by a plurality of 5G transmission signals transmitted to a 5G base station. In addition, DL MIMO may be performed by a plurality of 5G reception signals received from the 5G base station.

On the other hand, the wireless communication module 110 may be in a Dual Connectivity (DC) state with the 4G base station and the 5G base station through the 4G wireless communication module 111 and the 5G wireless communication module 112. As such, the dual connectivity with the 4G base station and the 5G base station may be referred to as EUTRAN NR DC (EN-DC). Here, EUTRAN is an abbreviated form of "Evolved Universal Telecommunication Radio Access Network", and refers to a 4G wireless communication system. Also, NR is an abbreviated form of "New Radio" and refers to a 5G wireless communication system.

On the other hand, if the 4G base station and 5G base station are disposed in a co-located structure, throughput improvement is achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 111 and the 5G wireless communication module 112.

The short-range communication module 113 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device, or communications between the electronic device and a network where another electronic device (or an external server) is located, via wireless area networks. One example of the wireless area networks is a wireless personal area network.

Meanwhile, short-range communication between electronic devices may be performed using the 4G wireless communication module 111 and the 5G wireless communication module 112. In one embodiment, short-range communication may be performed between electronic devices in a device-to-device (D2D) manner without passing through base stations.

Meanwhile, for transmission rate improvement and communication system convergence, Carrier Aggregation (CA) may be carried out using at least one of the 4G wireless communication module 111 and the 5G wireless communication module 112 and the WiFi communication module 113. In this regard, 4G+WiFi CA may be performed using the 4G wireless communication module 111 and the Wi-Fi communication module 113. Or, 5G+WiFi CA may be performed using the 5G wireless communication module 112 and the WiFi communication module 113.

The location information module 114 is generally configured to detect, calculate, derive or otherwise identify a position (or current position) of the electronic device. As an example, the location information module 115 includes a Global Position System (GPS) module, a Wi-Fi module, or both. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless access point (AP) which transmits or receives a wireless signal to or from the Wi-Fi module. If desired, the location information module 114 may alternatively or additionally function with any of the other modules of the wireless communication module 110 to obtain data related to the position of the electronic device. The location information module 114 is a module used for acquiring the position (or the current position) of the electronic device and may not be limited to a module for directly calculating or acquiring the position of the electronic device.

Specifically, when the electronic device utilizes the 5G wireless communication module 112, the position of the electronic device may be acquired based on information related to the 5G base station which performs radio signal transmission or reception with the 5G wireless communication module. In particular, since the 5G base station of the mmWave band is deployed in a small cell having a narrow coverage, it is advantageous to acquire the position of the electronic device.

The input device 120 may include a pen sensor 1200, a key button 123, a voice input module 124, a touch panel 151a, and the like. On the other hand, the input device 120 may include a camera module 121 for inputting an image signal, a microphone 152c or an audio input module for inputting an audio signal, or a user input unit 123 (e.g., a touch key, a push key (or a mechanical key), etc.) for allowing a user to input information. Data (for example, audio, video, image, and the like) may be obtained by the input device 120 and may be analyzed and processed according to user commands.

The camera module 121 is a device capable of capturing still images and moving images. According to one embodiment, the camera module 121 may include one or more image sensors (e.g., a front sensor or a rear sensor), a lens, an image signal processor (ISP), or a flash (e.g., LED or lamp).

The sensor module 140 may typically be implemented using one or more sensors configured to sense internal information of the electronic device, the surrounding environment of the electronic device, user information, and the like. For example, the sensor module 140 includes at least one of a gesture sensor 340a, a gyro sensor 340b, an air pressure sensor 340c, a magnetic sensor 340d, an acceleration sensor 340e, a grip sensor 340f, and a proximity sensor 340g, a color sensor 340h (e.g. RGB (red, green, blue) sensor), a bio-sensor 340i, a temperature/humidity sensor 340j, an illuminance sensor 340k, an ultra violet (UV) sensor 340l, a light sensor 340m, and a hall sensor 340n. The sensor module 140 may also include at least one of a finger scan sensor, an ultrasonic sensor, an optical sensor (for example, camera 121), a microphone (see 152c), a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The electronic device disclosed herein may be configured to utilize information obtained from one or more sensors, and combinations thereof.

The output interface 150 may typically be configured to output various types of information, such as audio, video, tactile output, and the like. The output interface 150 may be shown having at least one of a display 151, an audio output module 152, a haptic module 153, and an indicator 154.

With regard to this, the display 151 may have an interlayered structure or an integrated structure with a touch sensor in order to implement a touch screen. The touch screen may function as the user input unit 123 which provides an input interface between the electronic device 100 and the user and simultaneously provide an output interface between the electronic device 100 and a user. For example, the display 151 may be a liquid crystal display (LCD), a light emitting diode (LED) display, an organic light emitting diode (OLED) display, a microelectromechanical system (micro) electromechanical systems (MEMS) displays, or an electronic paper display. For example, the display 151 may display various contents (e.g., text, images, videos, icons, and/or symbols, etc.). The display 151 may include a touch screen, and may receive a touch, gesture, proximity, or hovering input using, for example, an electronic pen or a part of a user's body.

Meanwhile, the display 151 may include a touch panel 151a, a hologram device 151b, and a projector 151c and/or a control circuit for controlling them. In this regard, the panel may be implemented to be flexible, transparent, or wearable. The panel may include a touch panel 151a and one or more modules. The hologram device 151b may show a stereoscopic image in the air by using interference of light. The projector 151c may display an image by projecting light on a screen. The screen may be located, for example, inside or outside the electronic device 100.

The audio module 152 may be configured to interwork with the receiver 152a, the speaker 152b, and the microphone 152c. Meanwhile, the haptic module 153 may convert an electrical signal into a mechanical vibration, and generate a vibration or a haptic effect (e.g., pressure, texture). The electronic device may include a mobile TV supporting device (e.g., a GPU) that may process media data as per, e.g., digital multimedia broadcasting (DMB), digital video broadcasting (DVB), or mediaFlo™ standards. The indicator 154 may indicate a particular state of the electronic device 100 or a part (e.g., the processor 310) of the electronic device, including, e.g., a booting state, a message state, or a recharging state.

The wired communication module 160 which may be implemented as an interface unit serves as a passage with various types of external devices connected to the electronic device 100. The wired communication module 160 may include an HDMI 162, a USB 162, a connector/port 163, an optical interface 164, or a D-sub (D-subminiature) 165. Also, the wired communication module 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the electronic device 100 may perform assorted control functions associated with a connected external device, in response to the external device being connected to the wired communication module 160.

The memory 170 is typically implemented to store data to support various functions or features of the electronic device 100. For instance, the memory 170 may be configured to store application programs executed in the electronic device 100, data or instructions for operations of the electronic device 100, and the like. At least some of these application programs may be downloaded from an external server (e.g., a first server 310 or a second server 320) through wireless communication. Other application programs may be installed within the electronic device 100 at the time of manufacturing or shipping, which is typically the case for basic functions of the electronic device 100 (for example, receiving a call, placing a call, receiving a message, sending a message, and the like). It is common for application programs to be stored in the memory 170, installed in the electronic device 100, and executed by the controller 180 to perform an operation (or function) for the electronic device 100.

In this regard, the first server 310 may be referred to as an authentication server, and the second server 320 may be referred to as a content server. The first server 310 and/or the second server 320 may be interfaced with the electronic device through a base station. Meanwhile, a part of the second server 320 corresponding to the content server may be implemented as a mobile edge cloud (MEC) 330 in a base station unit. Accordingly, a distributed network may be implemented through the second server 320 implemented as the mobile edge cloud (MEC) 330, and content transmission delay may be shortened.

The memory 170 may include a volatile and/or nonvolatile memory. Also, the memory 170 may include an internal memory 170a and an external memory 170b. The memory 170 may store, for example, commands or data related to at least one of other components of the electronic device 100. According to one embodiment, the memory 170 may store software and/or a program 240. For example, the program 240 may include a kernel 171, middleware 172, an application programming interface (API) 173, an application program (or "application") 174, or the like. At least one of the kernel 171, the middleware 172, or the API 174 may be referred to as an operating system (OS).

The kernel 171 may control or manage system resources (e.g., the bus, the memory 170, or the processor 180) that are used for executing operations or functions implemented in other programs (e.g., the middleware 172, the API 173, or the application program 174). In addition, the kernel 171 may provide an interface to control or manage system resources by accessing individual components of the electronic device 100 in the middleware 172, the API 173, or the application program 174.

The middleware 172 may function as an intermediary so that the API 173 or the application program 174 communicates with the kernel 171 to exchange data. Also, the middleware 172 may process one or more task requests received from the application program 247 according to priorities. In one embodiment, the middleware 172 may give at least one of the application programs 174 a priority to use the system resources (e.g., the bus, the memory 170, or the processor 180) of the electronic device 100, and process one or more task requests. The API 173 is an interface for the application program 174 to control functions provided by the kernel 171 or the middleware 1723, for example, at least one for file control, window control, image processing, or text control. Interface or function, for example Command).

The processor 180 typically functions to control an overall operation of the electronic device 100, in addition to the operations associated with the application programs. The processor 180 may provide or process information or functions appropriate for a user by processing signals, data, information and the like, which are input or output by the foregoing components, or executing application programs stored in the memory 170. Furthermore, the processor 180 may control at least part of the components illustrated in FIGS. 1A and 2A, in order to execute the application programs stored in the memory 170. In addition, the processor 180 may control a combination of at least two of those components included in the electronic device 100 to activate the application program.

The processor 180 may include one or more of a central processing unit (CPU), an application processor (AP), an image signal processor (ISP), a communication processor (CP), and a low power processor (e.g., sensor hub). For example, the processor 180 may execute a control of at least one of other components and/or an operation or data processing related to communication.

The power supply unit 190 may be configured to receive external power or provide internal power in order to supply appropriate power required for operating elements and components included in the electronic device 100. The power supply unit 190 may include a power management module 191 and a battery 192, and the battery 192 may be an embedded battery or a replaceable battery. The power management module 191 may include a power management integrated circuit (PMIC), a charging IC, or a battery or fuel gauge. The PMIC may have a wired and/or wireless recharging scheme. The wireless charging scheme may include, e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 396, and a voltage, a current, or a temperature while the battery 396 is being charged. The battery 396 may include, e.g., a rechargeable battery or a solar battery.

Each of the external device 100a, the first server 310, and the second server 320 may be the same or different type of device (e.g., external device or server) as or from the electronic device 100. According to an embodiment, all or some of operations executed on the electronic device 100 may be executed on another or multiple other electronic devices (e.g., the external device 100a, the first server 310 and the second server 320. According to an embodiment, when the electronic device 100 should perform a specific function or service automatically or at a request, the electronic device 100, instead of executing the function or service on its own or additionally, may request another device (e.g., the external device 100a, the first server 310, and the second server 320) to perform at least some functions associated therewith. The another electronic device (e.g., the external device 100a, the first server 310, and the second server 320) may execute the requested function or additional function and transfer a result of the execution to the electronic device 100. The electronic device 100 may provide the requested function or service by processing the received result as it is or additionally. To that end, a cloud computing, distributed computing, client-server computing, or mobile-edge cloud (MEC) technology may be used, for example.

At least part of the components may cooperatively operate to implement an operation, a control or a control method of an electronic device according to various embodiments disclosed herein. Also, the operation, the control or the control method of the electronic device may be implemented on the electronic device by an activation of at least one application program stored in the memory 170.

Figure 1B:
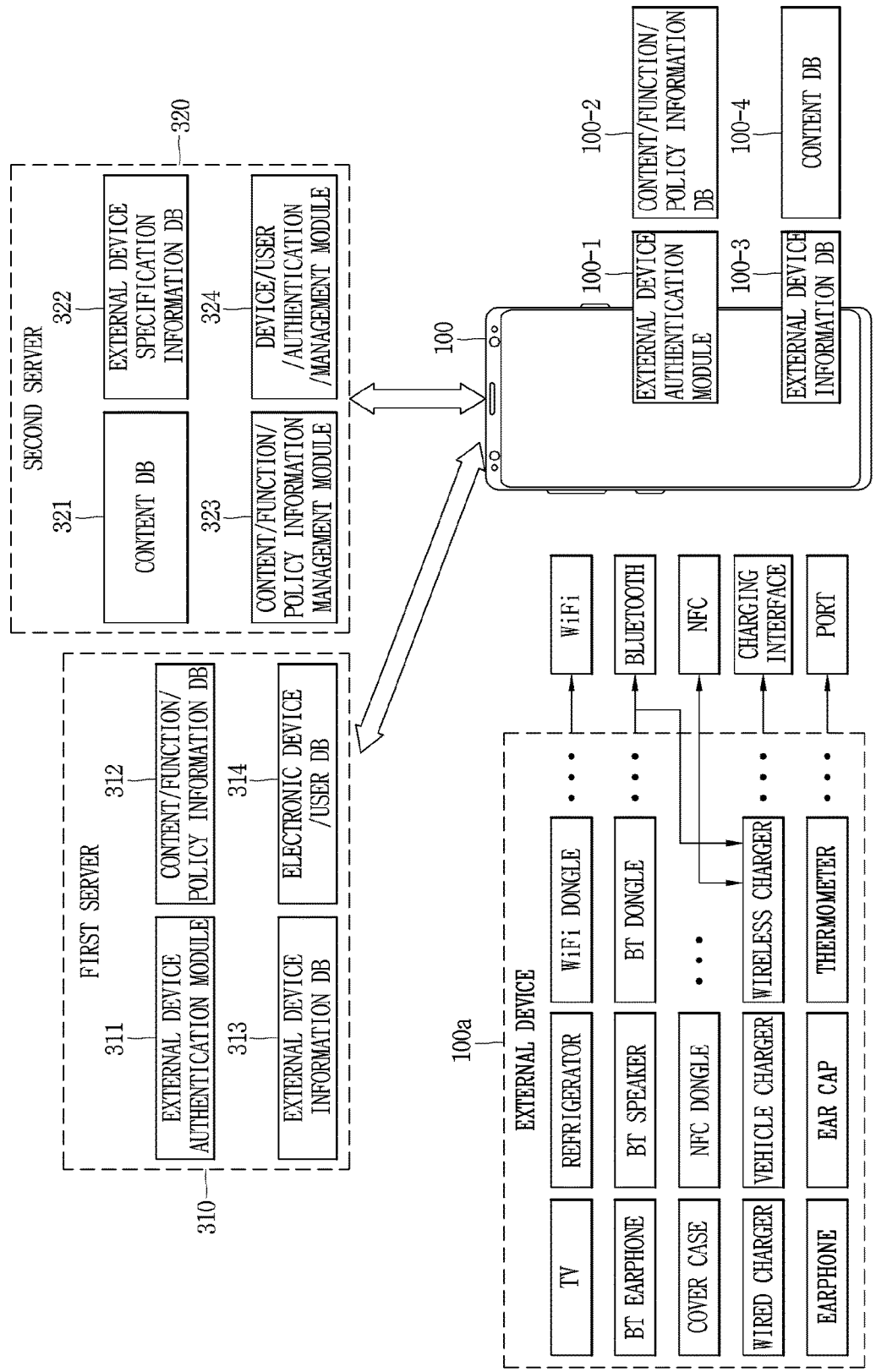
FIG. 1B is a view illustrating a detailed configuration in which the electronic device according to the one embodiment is interfaced with an external device or a server.

Referring to FIGS. 1A and 1B, the wireless communication system may include an electronic device 100, at least one external device 100*a*, a first server 310 and a second server 320. The electronic device 100 may be functionally connected to at least one external device 100*a*, and may control contents or functions of the electronic device 100 based on information received from the at least one external device 100*a*. According to one embodiment of the present disclosure, the electronic device 100 may perform authentication to determine whether the at least one external device 100 includes or generates information following a predetermined rule using the servers 310, 320. Also, the electronic device 100 may display contents or control functions by controlling the electronic device 100 based on an authentication result. According to an embodiment of the present disclosure, the electronic device 100 may be connected to at least one external device 100*a* through a wired or wireless communication interface to receive or transmit information. For example, the electronic device 100 and the at least one external device 100*a* include a near field communication (NFC), a charger (e.g., Information can be received or transmitted in a universal serial bus (USB)-C), ear jack, Bluetooth (BT), wireless fidelity (WiFi), or the like.

The electronic device 100 may include at least one of an external device authentication module 100-1, a content/function/policy information DB 100-2, an external device information DB 100-3, or a content DB 104. The at least one external device 100*a*, as an assistant apparatus associated with the electronic device 100, may be a device designed for various purposes, such as ease of use, increased appearance aesthetics, and enhanced usability of the electronic device 100. The at least one external device 100*a* may or may not be in physical contact with the electronic device 100. According to one embodiment, the at least one external device 100*a* may be functionally connected to the electronic device 100 using a wired/wireless communication module to control information for controlling content or a function in the electronic device 100.

According to one embodiment, the at least one external device 100*a* may include an authentication module for encrypting/decrypting at least one of various pieces of information included in the external device information, or storing or managing it in a physical/virtual memory area that is not directly accessible from the outside. According to one embodiment, the at least one external device 100*a* may perform communication with the electronic device 100 or may provide information through communication between the external devices. According to one embodiment, the at least one external device 100*a* may be functionally connected to the server 310 or 320. In various embodiments, the at least one external device 100*a* may be various types of products such as a cover case, an NFC dongle, a car charger, an earphone, an ear cap (e.g., an accessory device mounted on a mobile phone audio connector), a thermometer, an electronic pen, a BT earphone, a BT speaker, a BT dongle, a TV, a refrigerator, and a WiFi dongle.

In this regard, for example, the external device 100*a* such as a wireless charger may supply power to the electronic device 100 through a charging interface such as a coil. In this case, control information may be exchanged between the external device 100*a* and the electronic device 100 through in-band communication through a charging interface such as a coil. Meanwhile, control information may be exchanged between the external device 100*a* and the electronic device 100 through out-of-band communication such as Bluetooth or NFC.

On the other hand, the first server 310 may include a server or a cloud device for a service associated with the at least one external device 100*a*, or a hub device for controlling a service in a smart home environment. The first server 310 may include at least one of an external device authentication module 311, a content/function/policy information DB 312, an external device information DB 313, and an electronic device/user DB 314. The first server 310 may be referred to as an authentication management server, an authentication server, or an authentication related server. The second server 320 may include a server or cloud device for providing a service or content, or a hub device for providing a service in a smart home environment. The second server 320 may include at least one of a content DB 321, an external device specification information DB 322, a content/function/policy information management module 323, and a device/user authentication/management module 324. The second server 130 may be referred to as a content management server, a content server, or a content related server.

On the other hand, the electronic device 100 described herein may maintain a connection state between a 4G base station (eNB) and a 5G base station (eNB) through the 4G wireless communication module 111 and/or the 5G wireless communication module 112. In this regard, as described above, FIG. 1C illustrates a configuration in which the electronic device 100 is interfaced with a plurality of base stations or network entities.

Figure 1C:
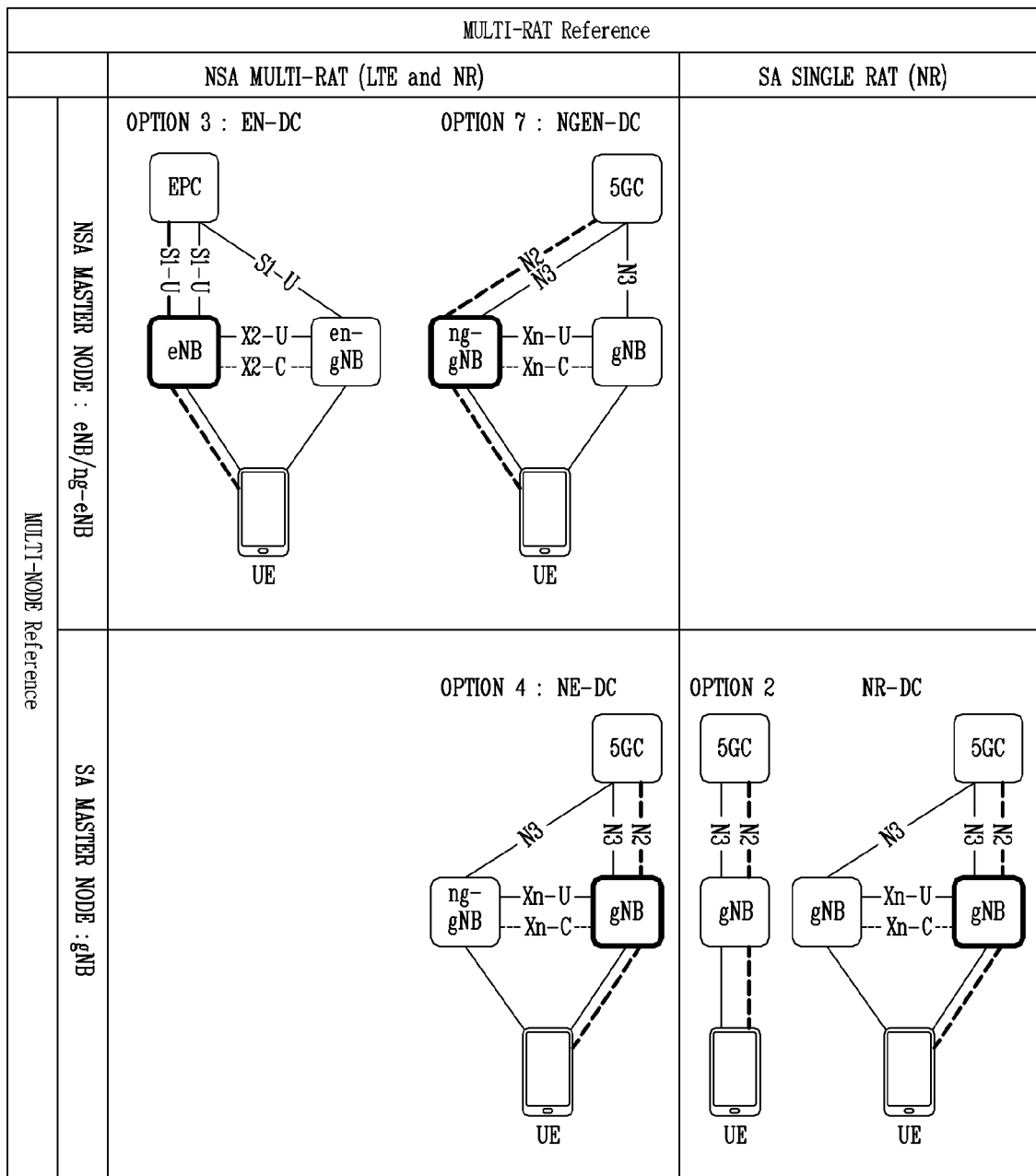
FIG. 1C is a view illustrating a configuration in which the electronic device according to the one embodiment is interfaced with a plurality of base stations or network entities.

Referring to FIG. 1C, 4G/5G deployment options are shown. With regard to 4G/5G deployment, when multi-RAT of 4G LTE and 5G NR is supported in a non-standalone (NSA) mode, it may be implemented as EN-DC in option 3 or NGEN-DC in option 5. On the other hand, when multi-RAT is supported in a standalone (SA) mode, it may be implemented as NE-DC in option 4. In addition, when single RAT is supported in a standalone (SA) mode, it may be implemented as NR-DC in option 2.

With regard to the base station type, the eNB is a 4G base station, which is also called an LTE eNB, and is based on the Rel-8-Rel-14 standard. On the other hand, ng-eNB is an eNB capable of interworking with a 5GC and gNB, which is also called an eLTE eNB, and is based on the Rel-15 standard. Furthermore, the gNB is a 5G base station interworking with a 5G NR and 5GC, which is also called an NR gNB, and is based on the Rel-15 standard. In addition, the en-gNB is a gNB capable of interworking with an EPC and an eNB, also called an NR gNB, and is based on the Rel-15 standard. With regard to the Dual Connectivity (DC) type, option 3 represents E-UTRA-NR Dual Connectivity (EN-DC). Option 7 represents NG-RAN E-UTRA-NR Dual Connectivity (NGEN-DC). Furthermore, option 4 represents NR-E-UTRA Dual Connectivity (NE-DC). Furthermore, option 2 represents NR-NR Dual Connectivity (NR-DC). In this regard, the technical features of double connection according to option 2 through option 7 are as follows.

Option 2: Independent 5G services may be provided with only a 5G system (5GC, gNB). In addition to enhanced Mobile Broadband (eMBB), Ultra-Reliable Low-Latency Communication (URLLC) and Massive Machine Type Communication (mMTC) may be possible, and 5GC features such as network slicing, MEC support, mobility on demand, and access-agnostic may be available to provide a full 5G service. Initially, due to coverage limitations, it may be used as a hot spot, an enterprise or overlay network, and when it is out of a 5G NR coverage, EPC-5GC interworking is required. A 5G NR full coverage may be provided, and dual connectivity (NR-DC) may be supported between gNBs using a plurality of 5G frequencies.

Option 3: This is a case where only a gNB is introduced into the existing LTE infrastructure. The core is an EPC and the gNB is an en-gNB that can interwork with the EPC and the eNB. The dual connectivity (EN-DC) is supported between the eNB and the en-gNB, and the master node is an eNB. An eNB, which is a control anchor of an en-gNB, processes control signaling for network access, connection configuration, handover, etc. of a UE, and user traffic may be transmitted through the eNB and/or the en-gNB. It is an option that is mainly applied to a first stage of 5G migration, as an operator operating an LTE nationwide network is able to quickly build a 5G network with the introduction of the en-gNB and minimal LTE upgrade without 5GC.

There are three types of option 3, which are options 3/3a/3x, depending on the user traffic split schemes. Bearer split is applied to options 3/3x, but is not applied to option 3a. The main scheme is option 7x.

Option 3: Only an eNB is connected to an EPC and an en-gNB is connected only to the eNB. User traffic may be split at a master node (eNB) and transmitted simultaneously to LTE and NR.

Option 3a: Both the eNB and the gNB are connected to the EPC, and thus user traffic is directly transferred from the EPC to the gNB. User traffic is transmitted to LTE or NR.

Option 3x: It is a combination of option 3 and option 3a, which differs from Option 3 in that user traffic is split at the secondary node (gNB).

The advantages of option 3 are i) that LTE can be used as a capacity booster for eMBB services, and ii) the terminal is always connected to LTE to provide service continuity through LTE even if it is out of 5G coverage or NR quality deteriorates so as to provide stable communication.

Option 4: 5GC is introduced, and still interworking with LTE, but independent 5G communication is possible. Core is 5GC, and the eNB is an ng-eNB capable of interworking with 5GC and a gNB. Dual connectivity (NE-DC) is supported between an ng-eNB and a gNB, and the master node is the gNB. LTE may be used as a capacity booster when 5G NR coverage is fully extended. There are two types of option 4, which are option 4/4a. The main scheme is option 7x.

Option 7: 5GC is introduced, and still intwerworking with LTE, and 5G communication relies on LTE. Core is 5GC, and the eNB is an ng-eNB capable of interworking with 5GC and a gNB. Dual connectivity (NGEN-DC) is supported between an ng-eNB and a gNB, and the master node is a gNB. 5GC features may be used, and when 5G coverage is insufficient yet, service continuity may be provided using an eNB as the master node similar to option 3. There are three types of option 7, which are options 7/7a/7x, depending on the user traffic split schemes. Bearer split is applied to options 7/7x, but is not applied to option 7a. The main scheme is option 7x.

Referring to FIGS. 2B and 2C, the disclosed electronic device 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of electronic device. However, such teachings with regard to a particular type of electronic device will generally be applied to other types of electronic devices as well.

Here, considering the electronic device 100 as at least one assembly, the terminal body may be understood as a conception referring to the assembly.

The electronic device 100 will generally include a case (for example, frame, housing, cover, and the like) forming the appearance of the terminal. In this embodiment, the electronic device 100 may include a front case 101 and a rear case 102. Various electronic components are interposed into a space formed between the front case 101 and the rear case 102. At least one middle case may be additionally positioned between the front case 101 and the rear case 102.

A display 151 may be disposed on a front surface of the terminal body to output information. As illustrated, a window 151a of the display 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted on the rear case 102 are exposed to the outside. Meanwhile, part of a side surface of the rear case 102 may be implemented to operate as a radiator.

As illustrated, when the rear cover 103 is coupled to the rear case 102, a side surface of the rear case 102 may be partially exposed. In some cases, upon the coupling, the rear case 102 may also be completely shielded by the rear cover 103. Meanwhile, the rear cover 103 may include an opening for externally exposing a camera 121b or an audio output module 152b.

The electronic device 100 may include a display 151, first and second audio output modules 152a, 152b, a proximity sensor 141, an illumination sensor 152, an optical output module 154, first and second cameras 121a, 121b, first and second manipulation units 123a, 123b, a microphone 152c, a wired communication module 160, and the like.

The display 151 is generally configured to output information processed in the electronic device 100. For example, the display 151 may display execution screen information of an application program executing at the electronic device 100 or user interface (UI) and graphic user interface (GUI) information in response to the execution screen information.

The display 151 may be implemented using two display devices, according to the configuration type thereof. For instance, a plurality of the displays 151 may be arranged on one side, either spaced apart from each other, or these devices may be integrated, or these devices may be arranged on different surfaces.

The display 151 may include a touch sensor which senses a touch onto the display so as to receive a control command in a touching manner. When a touch is input to the display 151, the touch sensor may be configured to sense this touch and the processor 180 may generate a control command corresponding to the touch. The content which is input in the touching manner may be a text or numerical value, or a menu item which can be indicated or designated in various modes.

In this manner, the display 151 may form a flexible touch screen along with the touch sensor, and in this case, the touch screen may function as the user input unit 123 (refer to FIG. 1A). Therefore, the touch screen may replace at least some of the functions of the first manipulation unit 123a.

The first audio output module 152a may be implemented as a receiver for transmitting a call sound to a user's ear and the second audio output module 152b may be implemented as a loud speaker for outputting various alarm sounds or multimedia playback sounds.

The optical output module 154 may output light for indicating an event generation. Examples of the event generated in the electronic device 100 may include a message reception, a call signal reception, a missed call, an alarm, a schedule notice, an email reception, information reception through an application, and the like. When a user's event check is sensed, the processor 180 may control the optical output unit 154 to end the output of light.

The first camera 121a may process video frames such as still or moving images acquired by the image sensor in a video call mode or a capture mode. The processed video frames may be displayed on the display 151 or stored in the memory 170.

The first and second manipulation units 123a and 123b are examples of the user input unit 123, which may be manipulated by a user to provide input to the electronic device 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

On the other hand, the electronic device 100 may include a finger scan sensor which scans a user's fingerprint. The processor 180 may use fingerprint information sensed by the finger scan sensor as an authentication means. The finger scan sensor may be installed in the display 151 or the user input unit 123.

The wired communication module 160 may serve as a path allowing the electronic device 100 to interface with external devices. For example, the wired communication module 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the electronic device 100. The wired communication module 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a. The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained. The flash 125 may be disposed adjacent to the second camera 121b. When an image of a subject is captured with the camera 121b, the flash 125 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication. Furthermore, the microphone 152c may be configured to receive the user's voice, other sounds, and the like. The microphone 152c may be provided at a plurality of places, and configured to receive stereo sounds.

At least one antenna for wireless communication may be disposed on the terminal body. The antenna may be embedded in the terminal body or formed in the case. Meanwhile, a plurality of antennas connected to the 4G wireless communication module 111 and the 5G wireless communication module 112 may be arranged on a side surface of the terminal. Alternatively, an antenna may be formed in a form of film to be attached onto an inner surface of the rear cover 103 or a case including a conductive material may serve as an antenna.

Meanwhile, the plurality of antennas arranged on a side surface of the terminal may be implemented with four or more antennas to support MIMO. In addition, when the 5G wireless communication module 112 operates in a millimeter wave (mmWave) band, as each of the plurality of antennas is implemented as an array antenna, a plurality of array antennas may be arranged in the electronic device.

The terminal body is provided with a power supply unit 190 (see FIG. 1A) for supplying power to the electronic device 100. The power supply unit 190 may include a batter 191 which is mounted in the terminal body or detachably coupled to an outside of the terminal body.

Hereinafter, a multi-communication system structure and an electronic device including the same according to an embodiment, particularly embodiments related to an antenna and an electronic device including the same in a heterogeneous radio system, will be described with reference to the accompanying drawings. It will be apparent to those skilled in the art that the present disclosure may be embodied in other specific forms without departing from the spirit or essential characteristics thereof.

Meanwhile, a detailed operation and function of an electronic device having a plurality of antennas according to an embodiment provided with the 4G/5G wireless communication module as shown in FIG. 2A will be described below.

In a 5G communication system according to an embodiment, a 5G frequency band may be a higher frequency band than a sub-6 band. For example, the 5G frequency band may be a millimeter wave band, but the present disclosure is not limited thereto and may be changed according to an application.

Figure 3A:
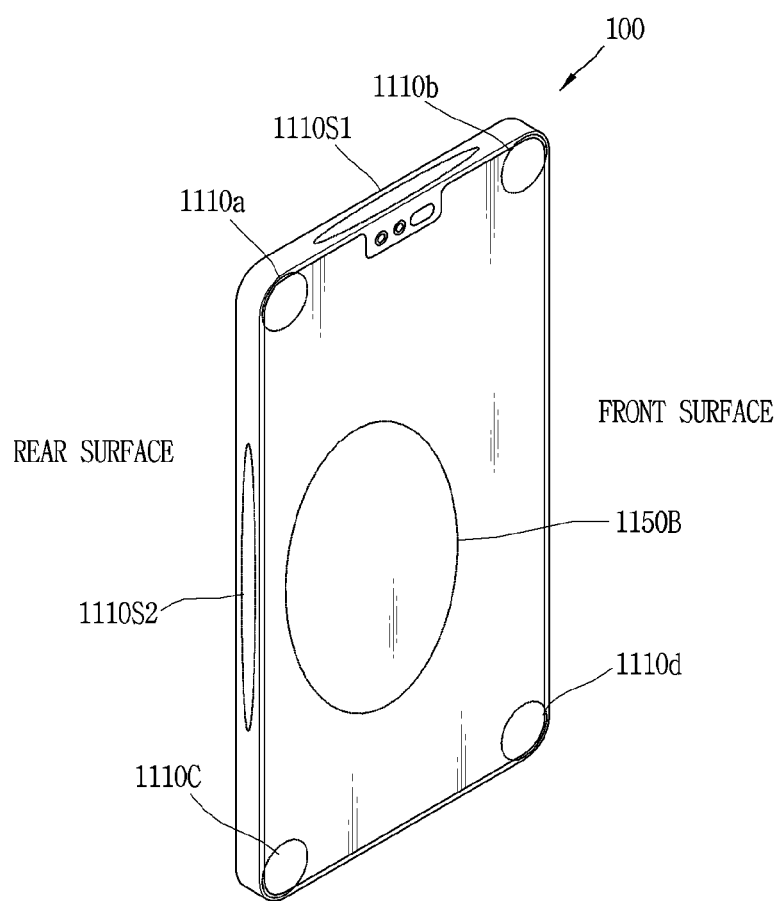
FIG. 3A illustrates an example of a configuration in which a plurality of antennas in an electronic device according to an embodiment can be arranged.

FIG. 3A illustrates an example of a configuration in which a plurality of antennas in an electronic device according to an embodiment can be arranged. Referring to FIG. 3A, a plurality of antennas 1110a to 1110d may be arranged on an inner side of or a front surface of the electronic device 100. In this regard, the plurality of antennas 1110a to 1110d may be implemented in a form printed on a carrier in an electronic device or in a system-on-chip (Soc) form along with an RFIC. Meanwhile, the plurality of antennas 1110a to 1110d may be disposed on a front surface of the electronic device in addition to an inner side of the electronic device. In this regard, the plurality of antennas 1110a to 1110d disposed on a front surface of the electronic device 100 may be implemented as transparent antennas embedded in a display.

On the other hand, a plurality of antennas 1110S1 and 1110S2 may be disposed on a side surface of the electronic device 100. In this regard, a 4G antenna may be disposed on a side surface of the electronic device 100 in the form of a conductive member, and a slot may be disposed in a conductive member region, and the plurality of antennas 1110a to 1110d may be configured to radiate 5G signals through the slot. Furthermore, antennas 1150b may be arranged on a rear surface of the electronic device 100 to radiate 5G signals to the back.

Meanwhile, the present disclosure may transmit or receive at least one signal through the plurality of antennas 1110S1 and 1110S2 on a side surface of the electronic device 100. In addition, the present disclosure may transmit or receive at least one signal through the plurality of antennas 1110a to 1110d, 1150B, 1110S1, and 1110S2 on a front and/or side surface of the electronic device 100. The electronic device may communicate with a base station through any one of the plurality of antennas 1110a to 1110d, 1150B, 1110S1, and 1110S2. Alternatively, the electronic device may perform multi-input multi-output (MIMO) communication with the base station through two or more antennas among the plurality of antennas 1110a to 1110d, 1150B, 1110S1, and 1110S2.

Figure 3B:
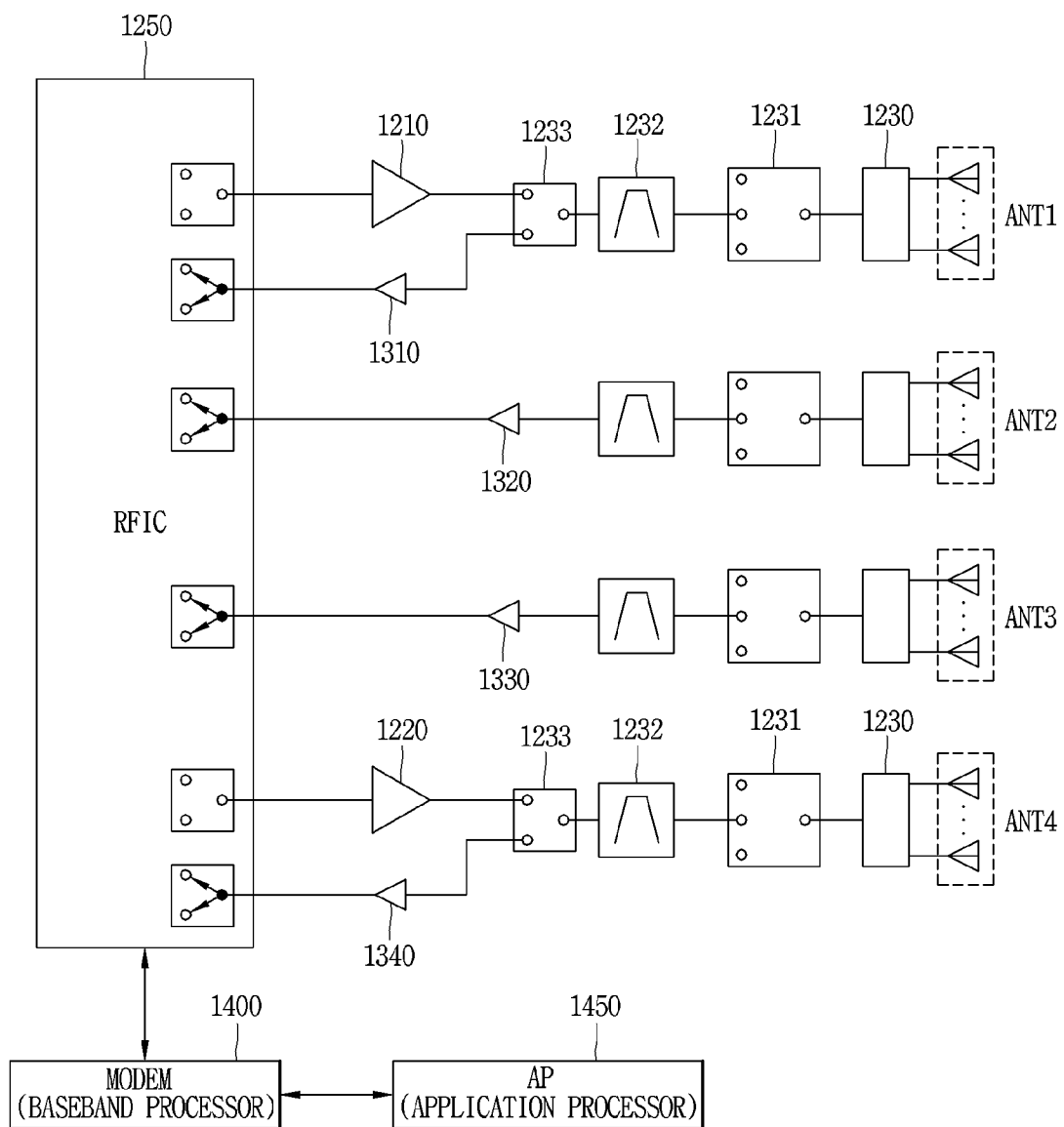
FIG. 3B is a block diagram illustrating a configuration of a wireless communication module of an electronic device operable in a plurality of wireless communication systems according to an embodiment.
Figure 4:
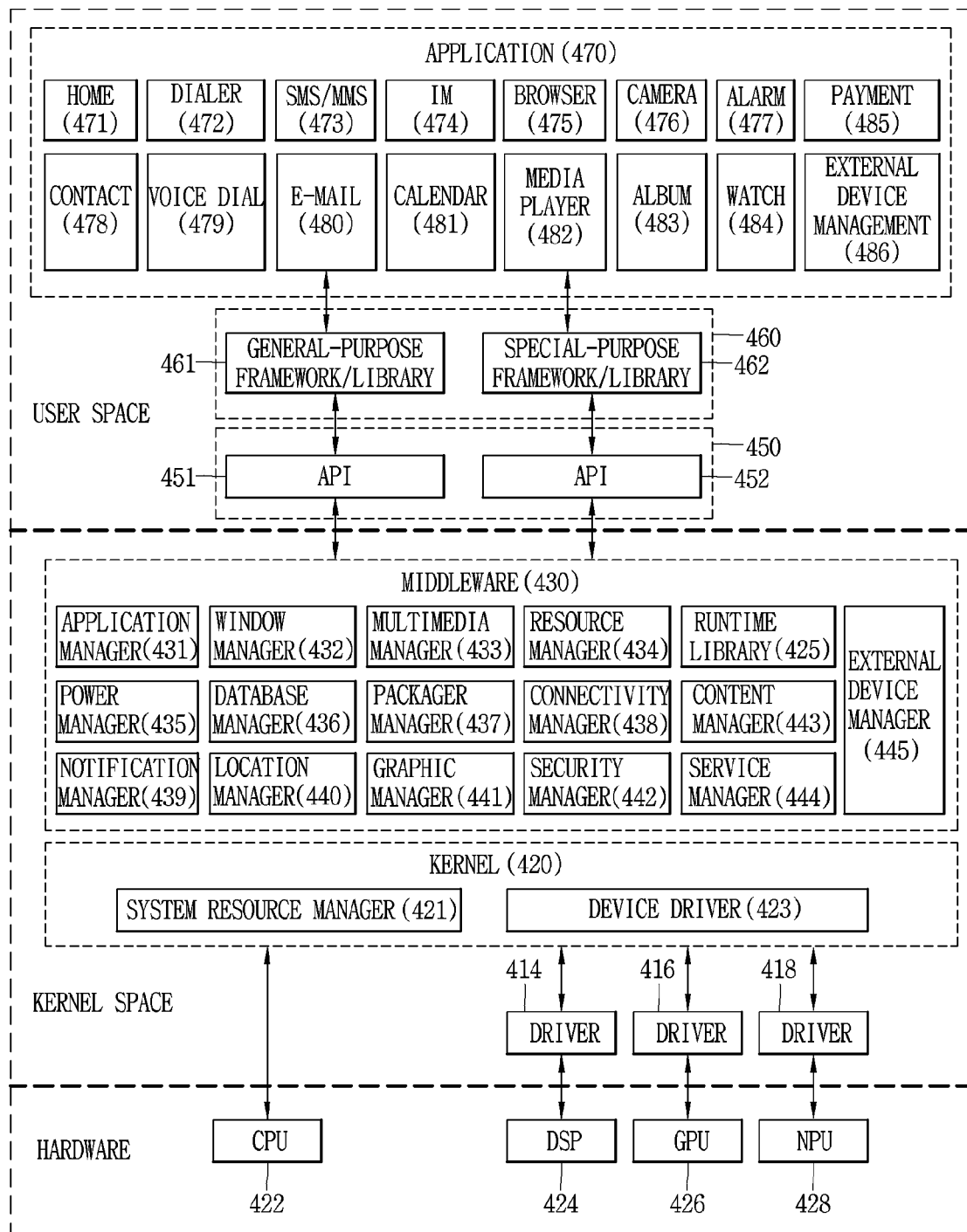
FIG. 4 is a view illustrating a framework structure related to an application program operating in an electronic device according to one embodiment.

FIG. 3B is a block diagram illustrating a configuration of a wireless communication module of an electronic device operable in a plurality of wireless communication systems according to an embodiment. Referring to FIG. 3B, the electronic device includes a first power amplifier 1210, a second power amplifier 1220, and an RFIC 1250. In addition, the electronic device may further include a modem 400 and an application processor (AP) 500. Here, the modem 400 and the application processor (AP) 500 may be physically implemented on a single chip, and may be implemented in a logical and functionally separated form. However, the present disclosure is not limited thereto and may be implemented in the form of a chip that is physically separated according to an application.

Meanwhile, the electronic device includes a plurality of low noise amplifiers (LNAs) 1310 to 1340 in the receiver. Here, the first power amplifier 1210, the second power amplifier 1220, the RFIC 1250, and the plurality of low noise amplifiers 310 to 340 are all operable in a first communication system and a second communication system. In this case, the first communication system and the second communication system may be a 4G communication system and a 5G communication system, respectively.

As illustrated in FIG. 2B, the RFIC 1250 may be configured as a 4G/5G integrated type, but the present disclosure is not limited thereto. The RFIC 250 may be configured as a 4G/5G separated type according to an application. When the RFIC 1250 is configured as a 4G/5G integration type, it is advantageous in terms of synchronization between 4G/5G circuits, and also there is an advantage that control signaling by the modem 1400 can be simplified.

On the other hand, when the RFIC 1250 is configured as the 4G/5G separated type, the separated RFIDs may be referred to as 4G RFIC and 5G RFIC, respectively. In particular, when there is a great difference between a 5G band and a 4G band, such as a case where the 5G band is configured as a mmWave band, the RFIC 1250 may be configured as the 4G/5G separated type. As such, when the RFIC 1250 is configured as a 4G/5G separation type, there is an advantage that the RF characteristics can be optimized for each of the 4G band and the 5G band.

Meanwhile, even when the RFIC 1250 is configured as a 4G/5G separation type, the 4G RFIC and the 5G RFIC may be logically and functionally separated but physically implemented on a single chip.

On the other hand, the application processor (AP) 1450 is configured to control the operation of each component of the electronic device. Specifically, the application processor (AP) 1450 may control the operation of each component of the electronic device through the modem 1400.

For example, the modem 1400 may be controlled through a power management IC (PMIC) for low power operation of the electronic device. Accordingly, the modem 1400 may control power circuits of a transmitter and a receiver to operate in a low power mode through the RFIC 1250.

In this regard, when it is determined that the electronic device is in an idle mode, the application processor (AP) 500 may control the RFIC 1250 through the modem 300 as follows. For example, when the electronic device is in an idle mode, the application processor 280 may control the RFIC 1250 through the modem 300, such that at least one of the first and second power amplifiers 110 and 120 operates in the low power mode or is turned off.

According to another embodiment, the application processor (AP) 500 may control the modem 300 to provide wireless communication capable of performing low power communication when the electronic device is in a low battery mode. For example, when the electronic device is connected to a plurality of entities among a 4G base station, a 5G base station, and an access point, the application processor (AP) 1450 may control the modem 1400 to enable wireless communication at the lowest power. Accordingly, the application processor (AP) 500 may control the modem 1400 and the RFIC 1250 to perform short-range communication using only the short-range communication module 113, even at the expense of throughput.

According to another embodiment, when the remaining battery level of the electronic device is above the threshold, the modem 300 may be controlled to select an optimal wireless interface. For example, the application processor (AP) 1450 may control the modem 1400 to receive data through both the 4G base station and the 5G base station according to the remaining battery level and the available radio resource information. In this case, the application processor (AP) 1450 may receive the remaining battery information from the PMIC, and the available radio resource information from the modem 1400. Accordingly, when the remaining battery level and the available radio resources are sufficient, the application processor (AP) 500 may control the modem 1400 and the RFIC 1250 to receive data through both the 4G base station and 5G base station.

Meanwhile, the multi-transceiving system of FIG. 3B may integrate a transmitter and a receiver of each radio system into a single transceiver. Accordingly, there is an advantage in that a circuit portion for integrating two types of system signals may be eliminated at a RF front-end.

Furthermore, since the front-end parts can be controlled by an integrated transceiver, the front-end parts may be more efficiently integrated than when the transceiving system is separated by communication systems.

In addition, when separated by communication systems, it may be impossible to control other communication systems as required, or impossible to perform efficient resource allocation since system delay increases due to this. On the other hand, the multi-transceiving system as illustrated in FIG. 2 has advantages of controlling different communication systems according to necessity and minimizing system delay, which may result in enabling efficient resource allocation.

Meanwhile, the first power amplifier 1210 and the second power amplifier 1220 may operate in at least one of the first and second communication systems. In this regard, when the 5G communication system operates in a 4G band or a sub-6 band, the first and second power amplifiers 1210 and 1220 may operate in both the first and second communication systems.

On the contrary, when the 5G communication system operates in a millimeter wave (mmWave) band, the first and second power amplifiers 1210, 1220 may operate in either the 4G band and the other in the millimeter wave band.

On the other hand, a transmitter and a receiver may be integrated to implement two different wireless communication systems using a single antenna using a dual transmit/receive antenna. In this case, 4×4 MIMO may be implemented using four antennas as illustrated in FIG. 2. In this case, 4×4 DL MIMO may be performed through downlink (DL).

Meanwhile, when the 5G band is a sub-6 band, first to fourth antennas (ANT1 to ANT4) may be configured to operate in both the 4G band and the 5G band. On the contrary, when the 5G band is a millimeter wave (mmWave) band, the first to fourth antennas (ANT1 to ANT4) may be configured to operate in either one of the 4G band and the 5G band. In this case, when the 5G band is the mmWave band, a plurality of antennas may be configured as an array antenna in the mmWAve band.

Meanwhile, 2×2 MIMO may be implemented using two antennas connected to the first power amplifier 1210 and the second power amplifier 1220 among four antennas. At this time, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented with 1 Tx, only one of the first and second power amplifiers 1210, 1220 may operate in the 5G band. Meanwhile, when the 5G communication system is implemented using 4Tx, an additional power amplifier operating in the 5G band may be further provided. Alternatively, a transmission signal may be branched in each of one or two transmission paths, and the branched transmission signals may be connected to the plurality of antennas.

On the other hand, a switch-type splitter or power divider is embedded in an RFIC corresponding to the RFIC 1250. Accordingly, a separate external component is not needed, thereby improving a component mounting configuration. In more detail, a single pole double throw (SPDT) type switch may be provided in the RFIC corresponding to the controller 1250 to select transmitters (TXs) of two different communication systems.

In addition, the electronic device that is operable in the plurality of wireless communication systems according to an embodiment may further include a duplexer (1231), a filter 1232 and a switch 1233.

The duplexer 1231 is configured to separate signals in a transmission band and a reception band from each other. In this case, signals in a transmission band transmitted through the first and second power amplifiers 1210, 1220 are applied to the antennas (ANT1, ANT4) through a first output port of the duplexer 1231. On the contrary, a signal in a reception band received through the antennas (ANT1, ANT4) are received by the low noise amplifiers 310, 340 through a second output port of the duplexer 1231.

The filter 1232 may be configured to pass signals in a transmission band or a reception band and block signals in the remaining bands. In this case, the filter 1232 may include a transmission filter connected to the first output port of the duplexer 1231 and a reception filter connected to the second output port of the duplexer 1231. Alternatively, the filter 1232 may be configured to pass only signals in the transmission band or only signals in the reception band according to a control signal.

The switch 1233 is configured to transmit only one of the transmission signal and the reception signal. In one implementation of the present disclosure, the switch 1233 may be configured as a single pole double throw (SPDT) type switch to isolate a transmission signal and a reception signal from each other using a time division duplex (TDD) scheme. Here, the transmission signal and the reception signal are signals of the same frequency band, and thus the duplexer 1231 may be implemented in the form of a circulator.

Meanwhile, in another implementation of the present invention, the switch 1233 may also be applied to a frequency division multiplex (FDD) scheme. In this case, the switch 1233 may be configured in the form of a double-pole double-throw (DPDT) to connect or block a transmission signal and a reception signal, respectively. On the other hand, since the transmission signal and the reception signal can be isolated by the duplexer 1231, the switch 1233 is not always necessary.

Meanwhile, the electronic device according to an embodiment may further include a modem 1400 corresponding to the controller. In this case, the RFIC 1250 and the modem 1400 may be referred to as a first controller (or a first processor) and a second controller (a second processor), respectively. Meanwhile, the RFIC 1250 and the modem 1400 may be implemented as physically isolated circuits. Alternatively, the RFIC 1250 and the modem 1400 may be logically or functionally distinguished from each other on one physical circuit.

The modem 1400 may perform control of signal transmission and reception through different communication systems using the RFID 1250 and processing of those signals. The modem 1400 may be acquired through control information received from the 4G base station and/or the 5G base station. Here, the control information may be received through a physical downlink control channel (PDCCH), but the present disclosure is not limited thereto.

The modem 1400 may control the RFIC 1250 to transmit and/or receive signals through the first communication system and/or the second communication system at a specific time and frequency resources. Accordingly, the RFIC 1250 may control transmission circuits including the first and second power amplifiers 1210 and 1220 to transmit a 4G signal or a 5G signal at a specific time interval. In addition, the RFIC 1250 may control reception circuits including the first to fourth low noise amplifiers 310 to 340 to receive a 4G signal or a 5G signal at a specific time interval.

Meanwhile, as shown in FIG. 5, an application program operating in the electronic device described herein may be executed by interworking with a user space, a kernel space, and hardware. In this regard, the program module 410 may include a kernel 420, middleware 430, an API 450, a framework/library 460, and/or an application 470. At least part of the program module 410 may be pre-loaded on an electronic device or downloaded from an external device or a server.

The kernel 420 may include a system resource manager 421 and/or a device driver 423. The system resource manager 421 may perform control, allocation, or retrieval of system resources. According to one embodiment, the system resource manager 421 may include a process manager, a memory manager, or a file system manager. The device driver 423 may include a display driver, a camera driver, a Bluetooth driver, a shared memory driver, a USB driver, a keypad driver, a WiFi driver, an audio driver, or an inter-process communication (IPC) driver. The middleware 430 may provide functions commonly required by the application 470 or provide various functions to the application 470 through the API 460, for example, to allow the application 470 to use limited system resources inside the electronic device.

The middleware 430 may include at least one of a runtime library 425, an application manager 431, a window manager 432, a multimedia manager 433, a resource manager 434, a power manager 435, a database manager 436, a package manager 437, a connectivity manager 438, a notification manager 439, a location manager 440, a graphic manager 441, a security manager 442, a content manager 443, a service manager 444 and an external device manager 445.

The framework/library 460 may include a general-purpose framework/library 461 and a special-purpose framework/library 462. Here, the general-purpose framework/library 461 and the special-purpose framework/library 462 may be referred to as a first framework/library 451 and a second framework/library 452, respectively. The first framework/library 461 and the second framework/library 462 may be interfaced with a kernel space and hardware through the first API 451 and the second API 452, respectively. Here, the second framework/library 452 may be an exemplary software architecture capable of modularizing artificial intelligence (AI) functions. Using the architecture, the various processing blocks of hardware implemented with a System on Chip (SoC) (e.g., CPU 422, DSP 424, GPU 426, and/or NPU 428) may perform functions for supporting operations during the runtime operation of the application 470.

The application 470 may include a home 471, a dialer 472, an SMS/MMS 473, an instant message 474, a browser 475, a camera 476, an alarm 477, a contact 478, a voice dial 479, an email 480, a calendar 481, a media player 482, an album 483, a watch 484, a payment 485, an accessory management 486, a health care, or an environmental information providing application.

An AI application may be configured to call functions defined in a user space capable of allowing the electronic device to provide for detection and recognition of a scene indicating a location at which the electronic device is currently operating. The AI application may configure a microphone and a camera differently depending on whether the recognized scene is an indoor space or an outdoor space. The AI application may make a request for compiled program codes associated with a library defined in a scene detect application programming interface (API) to provide an estimate of the current scene. This request may rely on the output of a deep neural network configured to provide scene estimates based on video and location data.

The framework/library 462, which may be compiled codes of the Runtime Framework, may be further accessible by the AI application. The AI application may cause a runtime framework engine to request scene estimation triggered at specific time intervals or by events detected by the application's user interface. When estimating a scene, the runtime engine may then send a signal to an operating system such as a Linux kernel running on the SoC. The operating system may cause the operation to be performed on the CPU 422, the DSP 424, the GPU 426, the NPU 428, or some combination thereof. The CPU 422 may be accessed directly by the operating system and other processing blocks may be accessed via a driver such as a driver 414 to 418 for the DSP 424, the GPU 426, or the NPU 428. In an illustrative example, a deep neural network and an AI algorithm may be configured to run on a combination of processing blocks, such as the CPU 422 and the GPU 426, or an AI algorithm such as a deep neural network may run on the NPU 428.

The AI algorithm performed through the special-purpose framework/library as described above may be performed only by the electronic device or by a server supported scheme. When the AI algorithm is performed by the server supported scheme, the electronic device may receive and transmit information associated AI processing with the AI server through the 4G/5G communication system.

Meanwhile, referring to FIGS. 1A and 2A, a 5G wireless communication system, that is, 5G new radio access technology (NR) may be provided. In this regard, as more communication devices demand larger communication capacities, there is a need for improved mobile broadband communication as compared to radio access technology in the related art. In addition, massive MTC (Machine Type Communications), which connects multiple devices and objects to provide various services anytime and anywhere, is also one of major issues to be considered in next-generation communication. In addition, communication system design in consideration of services/terminals that are sensitive to reliability and latency is being discussed. As described above, introduction of next-generation radio access technology in consideration of enhanced mobile broadband communication (eMBB), massive MTC (mMTC), ultra-reliable and low latency communication (URLLC), and the like, is being discussed, and the relevant technology is referred to herein as NR for the sake of convenience. The NR is an expression showing an example of 5G radio access technology (RAT).

A new RAT system including the NR uses an OFDM transmission scheme or a similar transmission scheme. The new RAT system may follow OFDM parameters different from the OFDM parameters of LTE. Alternatively, the new RAT system may follow the existing numerology of LTE/LTE-A as it is but have a larger system bandwidth (e.g., 100 MHz). Alternatively, a single cell may support a plurality of numerologies. In other words, electronic devices operating with different numerologies may coexist in a single cell.

In this regard, in the case of 4G LTE, since the maximum bandwidth of the system is limited to 20 MHz, a single sub-carrier spacing (SCS) of 15 KHz is used. However, since 5G NR supports a channel bandwidth between 5 MHz and 400 MHz, FFT processing complexity may increase to process the entire bandwidth through a single subcarrier spacing. Accordingly, the subcarrier spacing used for each frequency band may be extended and applied.

Figure 5A:
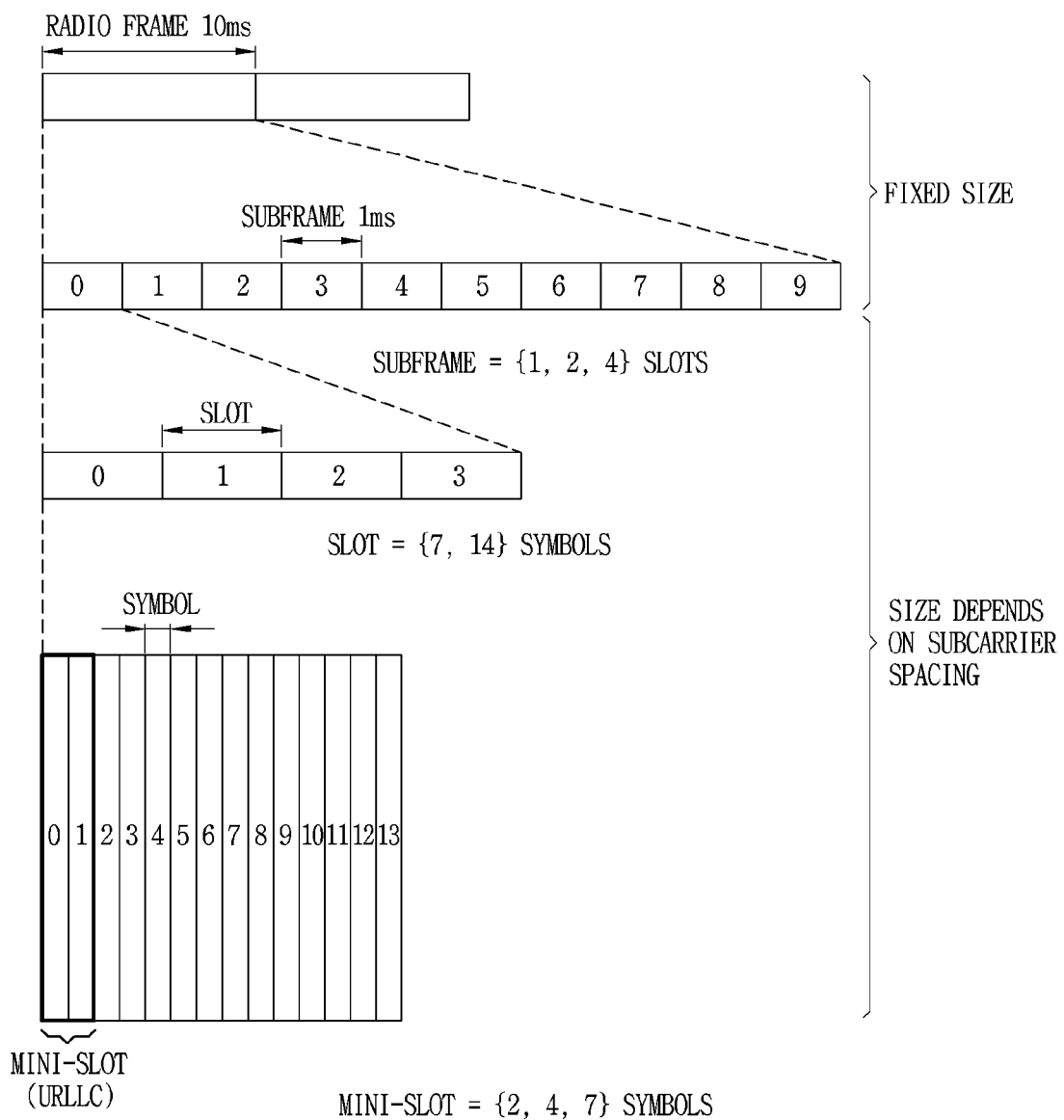
FIG. 5A is a view illustrating an example of a frame structure in NR.

A numerology corresponds to one subcarrier spacing in the frequency domain. By scaling a reference subcarrier spacing to an integer N, different numerologies may be defined. In this regard, FIG. 5A shows an example of a frame structure in NR. FIG. 5B is a view illustrating a change in a slot length in accordance with a change in a subcarrier spacing in the NR.

An NR system may support a number of numerologies. Here, a numerology may be defined by a subcarrier spacing and a cyclic prefix overhead. Here, a plurality of subcarrier spacings may be derived by scaling a basic subcarrier spacing to an integer N. Furthermore, even when it is assumed that a very low subcarrier spacing is not used at a very high carrier frequency, the used numerology may be selected independently of the frequency band. In addition, in an NR system, various frame structures according to a number of numerologies may be supported.

Hereinafter, an Orthogonal Frequency Division Multiplexing (OFDM) numerology and frame structure that can be considered in the NR system will be described. A number of OFDM numerologies supported in the NR system may be defined as shown in Table 1 below.

TABLE 1

| μ | $\Delta f = 2^\mu * 15$ [kHz] | Cyclic prefix (CP) |
|---|---|---|
| 0 | 15 | Normal |
| 1 | 30 | Normal |
| 2 | 60 | Normal, Extended |
| 3 | 120 | Normal |
| 4 | 240 | Normal |

NR supports a number of numerologies (or subcarrier spacings (SCSs)) for supporting various 5G services. For example, NR supports a wide area in traditional cellular bands when the SCS is 15 kHz, and supports a dense-urban, a lower latency and a wider carrier bandwidth when the SCS is 30 kHz/60 kHz, and supports a bandwidth greater than 24.25 GHz to overcome phase noise when the SCS is 60 kHz or higher. The NR frequency band is defined as a frequency range of two types (FR1, FR2). The FR1 is a sub-6 GHz range, and the FR2 is a range of above 6 GHz, which may denote millimeter waves (mmWs). Table 2 below shows the definition of the NR frequency band.

TABLE 2

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, |

With regard to a frame structure in a NR system, the sizes of various fields in the time domain are expressed in multiples of a specific time unit. FIG. 3A illustrates an example of an SCS of 60 kHz, in which one subframe may include four slots. One example of one subframe={1,2,4} slots is shown in FIG. 3, in which the number of slot(s) that can be included in one subframe may be one, two or four. In addition, a mini-slot may include two, four, or seven symbols or may include more or fewer symbols. Referring to FIG. 5B, a subcarrier spacing of 5G NR phase I and a length of an OFDM symbol corresponding to the spacing are shown. Each subcarrier spacing is extended by a multiplier of two, and the symbol length is inversely reduced. In FR1, subcarrier spacings of 15 kHz, 30 kHz, and 60 kHz may be available, depending on a frequency band/bandwidth. In FR2, subcarrier spacings of 60 kHz and 120 kHz may be used for a data channel, and a subcarrier spring of 240 kHz may be used for a synchronization signal. In 5G NR, a basic unit of scheduling is defined as a slot, and the number of OFDM symbols included in one slot may be limited to fourteen, as illustrated in FIG. 5A or 5B, regardless of the subcarrier spacing. Referring to FIG. 3B, when a wide subcarrier spacing is used, the length of one slot may decrease in inverse proportion to the subcarrier spacing, thereby reducing transmission delay in a wireless section. In addition, in order to efficiently support ultra reliable low latency communication (uRLLC), mini-slot (e.g., 2, 4, 7 symbols) unit scheduling may be supported, as described above, in addition to slot-based scheduling. In consideration of the foregoing technical features, slots in 5G NR described herein may be provided at the same interval as those in 4G LTE or may be provided with slots of various sizes. For an example, in 5G NR, the slot interval may be configured to be 0.5 ms equal to that of 4G LTE. For another example, the slot interval in 5G NR may be configured to be 0.25 ms, which is a narrower interval than that in 4G LTE.

In this regard, the 4G communication system and the 5G communication system may be referred to as a first communication system and a second communication system, respectively. Accordingly, a first signal (first information) of the first communication system may be a signal (information) in a 5G NR frame having a slot interval that is scalable to 0.25 ms, 0.5 ms, and the like. On the contrary, a second signal (second information) of the second communication system may be a signal (information) in a 4G LTE frame having a fixed slot interval of 0.5 ms.

Meanwhile, the first signal of the first communication system may be transmitted and/or received through a maximum bandwidth of 20 MHz. On the contrary, the second signal of the second communication system may be transmitted and/or received through a variable channel bandwidth of 5 MHz to 400 MHz. In this regard, the first signal of the first communication system may be FFT-processed at a single sub-carrier spacing (SCS) of 15 KHz.

On the other hand, the second signal of the second communication system may be FFT-processed at subcarrier spacings of 15 kHz, 30 kHz, and 60 kHz according to the frequency band/bandwidth. In this case, the second signal of the second communication system may be modulated and frequency-converted into a FR1 band and transmitted through a 5G sub-6 antenna. Meanwhile, the FR1 band signal received through the 5G sub-6 antenna may be frequency-converted and demodulated. Then, the second signal of the second communication system may be IFFT-processed at subcarrier spacings of 15 kHz, 30 kHz, and 60 kHz according to the frequency band/bandwidth.

On the other hand, the second signal of the second communication system may be FFT-processed at subcarrier spacings of 60 kHz, 120 kHz, and 240 kHz according to the frequency band/bandwidth and data/synchronous channel. In this case, the second signal of the second communication system may be modulated in a FR2 band and transmitted through a 5G mmWave antenna. Meanwhile, the FR2 band signal received through the 5G mmWave antenna may be frequency converted and demodulated. Then, the second signal of the second communication system may be IFFT-processed through subcarrier spacings of 60 kHz, 120 kHz, and 240 kHz according to the frequency band/bandwidth and data/synchronous channel.

In 5G NR, symbol-level time alignment may be used for transmission schemes using various slot lengths, mini-slots, and different subcarrier spacings. Accordingly, the present disclosure provides flexibility to efficiently multiplex various communication services such as enhancement mobile broadband (eMBB) and ultra reliable low latency communication (uRLLC) in the time domain and the frequency domain. In addition, unlike 4G LTE, 5G NR may define uplink/downlink resource allocation at a symbol level within a single slot as shown in FIG. 3. In order to reduce a hybrid automatic repeat request (HARQ) delay, a slot structure capable of directly transmitting HARQ ACK/NACK in a transmission slot may be defined. This slot structure may be referred to as a self-contained structure.

Unlike 4G LTE, 5G NR may support a common frame structure constituting an FDD or TDD frame through a combination of various slots. Accordingly, a dynamic TDD scheme may be adopted to freely dynamically adjust the transmission direction of individual cells according to traffic characteristics.

On the other hand, a detailed operation and function of the electronic device having a plurality of antennas according to an embodiment provided with a multi-transceiving system as shown in FIG. 3B will be discussed below.

Figure 6A:
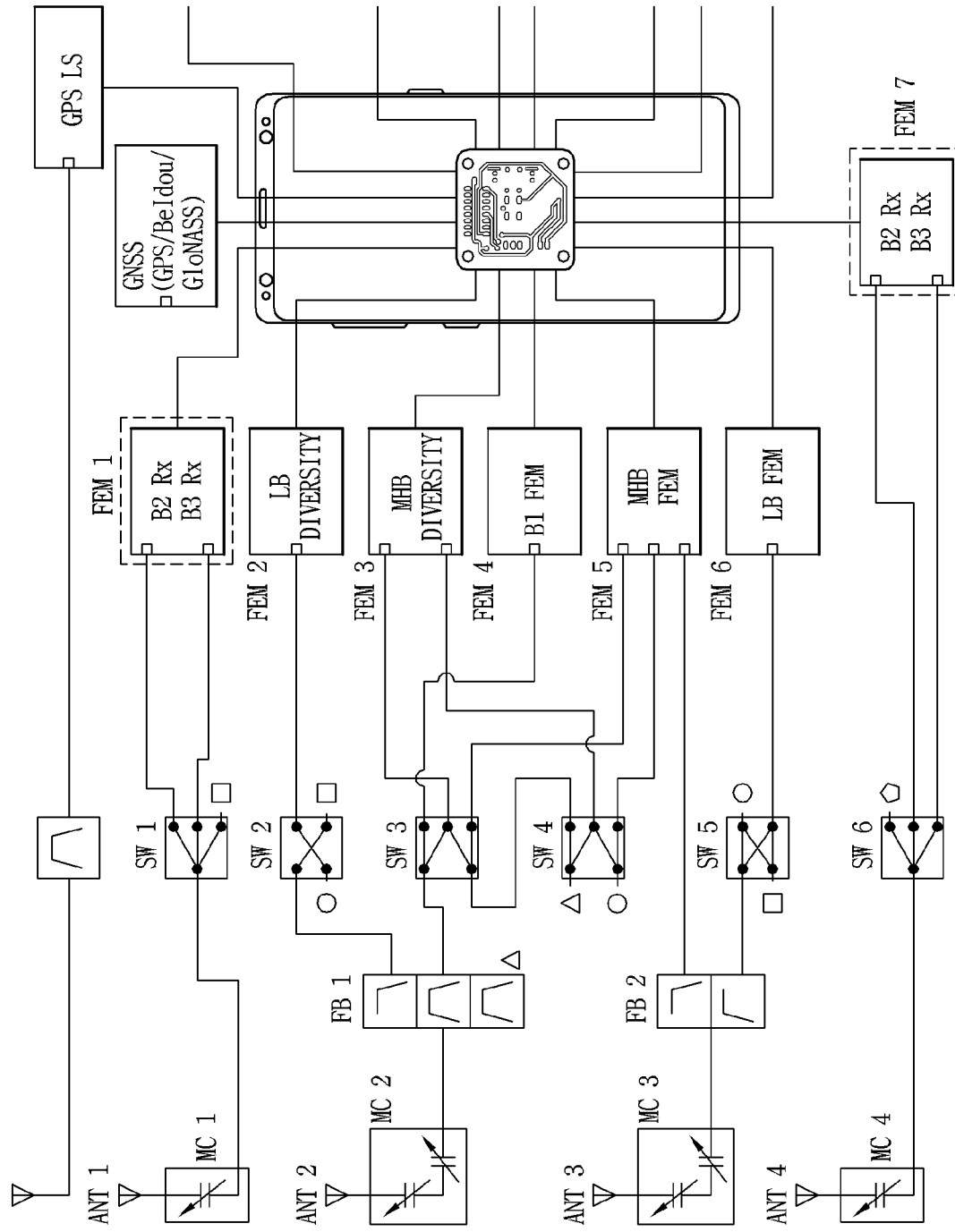
FIG. 6A is a configuration diagram in which a plurality of antennas and transceiver circuits according to an embodiment are coupled to a processor in an operable manner.
Figure 6B:
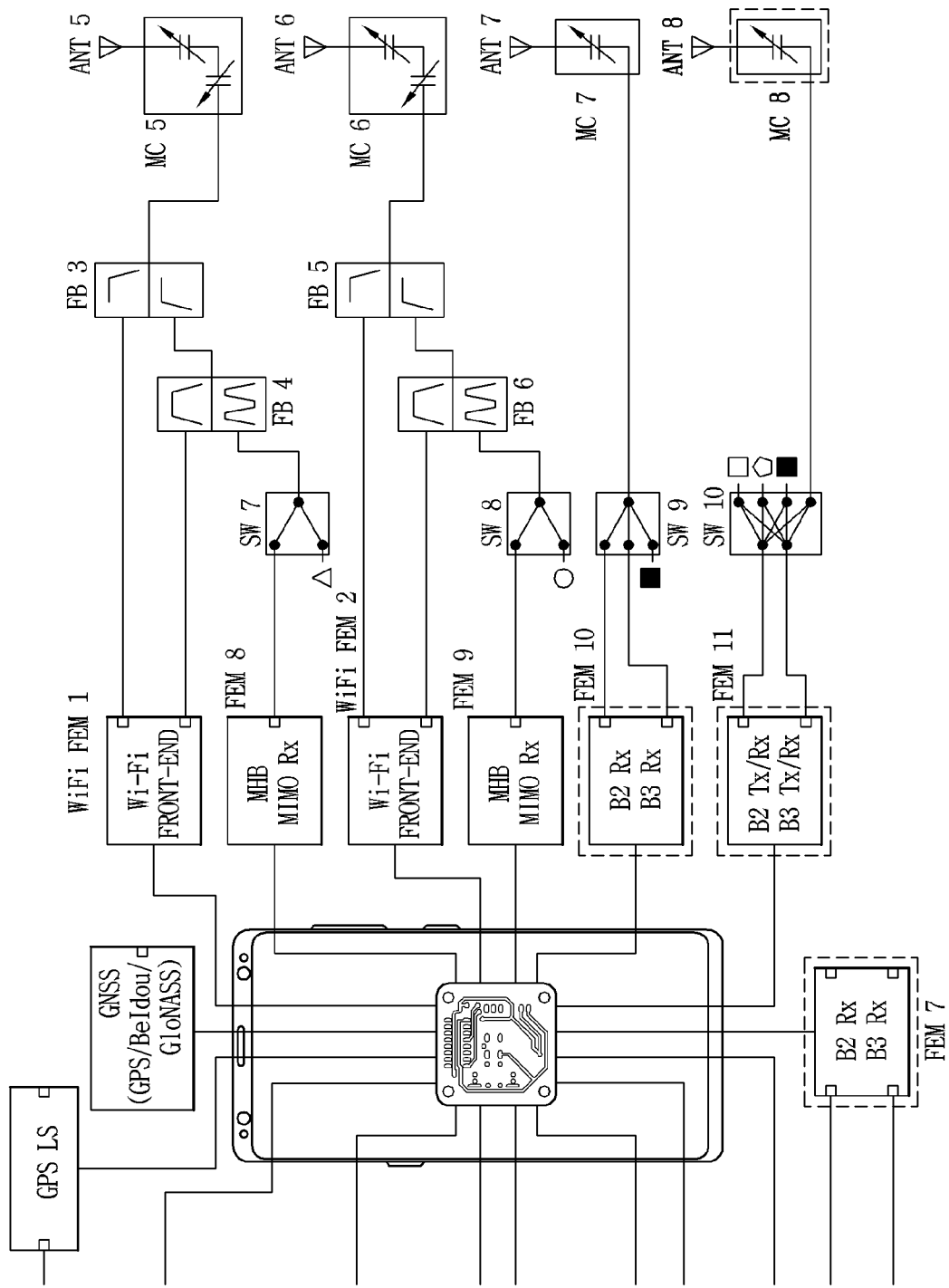
FIG. 6B is a configuration diagram in which antennas and transceiver circuits are additionally coupled to a processor in an operable manner in the configuration diagram in FIG. 6A.

In a 5G communication system according to an embodiment, the 5G frequency band may be a sub-6 band. In this regard, FIG. 6A is a configuration diagram in which a plurality of antennas and transceiver circuits according to an embodiment are coupled to a processor in an operable manner. FIG. 6B is a configuration diagram in which antennas and transceiver circuits are additionally coupled to a processor in an operable manner in the configuration diagram in FIG. 6A.

Referring to FIGS. 6A and 6B, the electronic device may include a plurality of antennas ANT1 to ANT4 and front-end modules FEM1 to FEM7 operating in a 4G band and/or a 5G band. In this regard, a plurality of switches SW1 to SW6 may be arranged between the plurality of antennas ANT1 to ANT4 and the front-end modules FEM1 to FEM7.

Referring to FIGS. 6A and 6B, the electronic device may include a plurality of antennas ANT5 to ANT8 and front-end modules FEM8 to FEM11 operating in a 4G band and/or a 5G band. In this regard, a plurality of switches SW7 to SW10 may be arranged between the plurality of antennas ANT1 to ANT4 and the front-end modules FEM8 to FEM11.

Meanwhile, a plurality of signals that can be branched through the plurality of antennas ANT1 to ANT8 may be transmitted to the input of the front-end modules FEM1 to FEM11 or to the plurality of switches SW1 to SW10 through one or more filters.

For an example, the first antenna ANT1 may be configured to receive signals in a 5G band. In this case, the first antenna ANT1 may be configured to receive a second signal of a second band B2 and a third signal of a third band B3. Here, the second band B2 may be an n77 band and the third band B3 may be an n79 band, but the present disclosure is not limited thereto. The second band B2 and the third band B3 may be changed according to an application. Meanwhile, the first antenna ANT1 may also operate as a transmitting antenna in addition to a receiving antenna.

In this regard, the first switch SW1 may be configured as an SP2T switch or an SP3T switch. When implemented as an SP3T switch, one output port may be used as a test port. The first and second output ports of the first switch SW1 may be connected to the inputs of the first front-end module FEM1.

In one example, the second antenna ANT2 may be configured to transmit and/or receive signals in a 4G band and/or a 5G band. In this case, the second antenna ANT2 may be configured to transmit/receive a first signal of a first band B1. Here, the first band B1 may be an n41 band, but the present is not limited thereto, and the first band B1 may be changed according to an application.

Meanwhile, the second antenna ANT2 may operate in a low band (LB). In addition, the second antenna (ANT2) may be configured to operate in a mid-band (MB) and/or a high band (HB). Here, the middle band (MB) and high band (HB) may be referred to as MHB.

A first output of the first filter bank FB1 connected to the second antenna ANT2 may be connected to the second switch SW2. Meanwhile, a second output of the first filter bank FB1 connected to the second antenna ANT2 may be connected to the third switch SW3. Furthermore, a third output of the first filter bank (FB1) connected to the second antenna (ANT2) may be connected to the fourth switch (SW4).

Accordingly, an output of the second switch (SW2) may be connected to an input of the second front-end module (FEM2) operating in the low band (LB). Meanwhile, a second output of the third switch SW3 may be connected to an input of the third front-end module FEM3 operating in the MHB band. In addition, a first output of the third switch SW3 may be connected to an input of a fourth front-end module FEM4 operating in a first 5G band (B1). Furthermore, a third output of the third switch SW3 may be connected to an input of the fifth front-end module FEM5 operating in the MHB band operating in the first 5G band (B1).

In this regard, a first output of the fourth switch SW4 may be connected to an input of the third switch SW3. Meanwhile, a second output of the fourth switch SW4 may be connected to an input of the third front-end module FEM3. In addition, a third output of the fourth switch SW4 may be connected to an input of the fifth front-end module FEM5.

For an example, the third antenna ANT3 may be configured to transmit and/or receive signals in the LB band and/or the MHB band. In this regard, a first output of the second filter bank FB2 connected to the second antenna ANT2 may be connected to an input of the fifth front-end module FEM5 operating in the MHB band. Meanwhile, a second output of the second filter bank FB2 connected to the second antenna ANT2 may be connected to the fifth switch SW5.

In this regard, an output of the fifth switch SW5 may be connected to an input of the sixth front-end module FEM6 operating in the LB band.

For an example, the fourth antenna ANT4 may be configured to transmit and/or receive a signal in a 5G band. In this regard, the fourth antenna ANT4 may be configured such that the second band B2 that is a transmission band and the third band B3 that is a reception band are frequency-division multiplexed (FDM). Here, the second band B2 may be an n77 band and the third band B3 may be an n79 band, but the present disclosure is not limited thereto. The second band B2 and the third band B3 may be changed according to an application.

In this regard, the fourth antenna (ANT4) may be connected to the sixth switch (SW6), and one of the outputs of the sixth switch (SW6) may be connected to a reception port of the seventh front-end module (FEM7). Meanwhile, another one of the outputs of the sixth switch (SW6) may be connected to the transmission port of the seventh front-end module (FEM7).

For an example, the fifth antenna ANT5 may be configured to transmit and/or receive signals in a WiFi band. Furthermore, the sixth antenna ANT5 may be configured to transmit and/or receive signals in the MHB band.

In this regard, the fifth antenna ANT5 may be connected to the third filter bank FB3, and a first output of the third filter bank FB3 may be connected to a first WiFi module (WiFi FEM1). On the other hand, a second output of the third filter bank FB3 may be connected to a fourth filter bank FB4. In addition, a first output of the fourth filter bank FB4 may be connected to the first WiFi module (WiFi FEM1). Meanwhile, a second output of the fourth filter bank FB4 may be connected to the eighth front-end module FEM8 operating in the MHB band through the seventh switch SW7. Therefore, the fifth antenna ANT5 may be configured to receive WiFi band and 4G/5G band signals.

Similarly, the sixth antenna ANT6 may be configured to transmit and/or receive signals in a WiFi band. Furthermore, the fifth antenna ANT6 may be configured to transmit and/or receive signals in the MHB band.

In this regard, the sixth antenna ANT6 may be connected to a fifth filter bank FB5, and a first output of the fifth filter bank FB5 may be connected to a second WiFi module (WiFi FEM2). On the other hand, a second output of the fifth filter bank FB5 may be connected to a sixth filter bank FB6. In addition, a first output of the sixth filter bank FB6 may be connected to a second WiFi module (WiFi FEM2). A second output of the sixth filter bank FB6 may be connected to the ninth front-end module FEM9 operating in the MHB band through the eighth switch SW8. Therefore, the fifth antenna ANT6 may be configured to receive WiFi band and 4G/5G band signals.

Referring to FIGS. 3B, 6A, and 6B, the baseband processor, that is, the modem 1400 may control antennas and the transceiver circuit (RFIC) 1250 to perform multi-input multi-output (MIMO) or diversity in the MHB band. In this regard, the second antenna ANT2 and the third antenna ANT3 adjacent thereto may be used in a diversity mode for transmitting and/or receiving the same information as a first signal and a second signal. On the contrary, antennas disposed on different side surfaces may be used in the MIMO mode in which first information is included in the first signal and second information is included in the second signal. For an example, the baseband processor 1400 may perform MIMO through the second antenna ANT2 and the fifth antenna ANT5. For an example, the baseband processor 1400 may perform MIMO through the second antenna ANT2 and the fifth antenna ANT6.

For an example, the seventh antenna ANT7 may be configured to receive signals in a 5G band. In this case, the seventh antenna ANT7 may be configured to receive a third signal of a second band B2 and a third signal of a third band B3. Here, the second band B2 may be an n77 band and the third band B3 may be an n79 band, but the present disclosure is not limited thereto. The second band B2 and the third band B3 may be changed according to an application. Meanwhile, the seventh antenna ANT7 may also operate as a transmitting antenna in addition to a receiving antenna.

In this regard, the ninth switch (SW9) may be configured as an SP2T switch or an SP3T switch. When implemented as an SP3T switch, one output port may be used as a test port. On the other hand, the first and second output ports of the ninth switch SW9 may be connected to the inputs of the tenth front-end module FEM10.

In one example, the second antenna ANT8 may be configured to transmit and/or receive signals in a 4G band and/or a 5G band. In this case, the eighth antenna ANT8 may be configured to transmit/receive a signal of the second band B2. In addition, the eighth antenna ANT8 may be configured to transmit/receive a signal of the third band B3. Here, the second band B2 may be an n77 band and the third band B3 may be an n79 band, but the present disclosure is not limited thereto. The second band B2 and the third band B3 may be changed according to an application. In this regard, the eighth antenna ANT8 may be connected to the eleventh front-end module FEM11 through the tenth switch SW10.

Meanwhile, the antennas ANT1 to ANT8 may be connected to impedance matching circuits MC1 to MC8 to operate in a plurality of bands. In this regard, when operating in adjacent bands such as the first antenna ANT1, the fourth antenna ANT4, the seventh antenna ANT7 and the eighth antenna ANT8, only one variable element may be used. In this case, the variable element may be a variable capacitor configured to vary the capacitance by varying the voltage.

On the contrary, when operating in spaced bands such as the second antenna (ANT2), the third antenna (ANT3), the fifth antenna (ANT5), and the sixth antenna (ANTE), only two or more variable elements may be used. In this case, the two or more variable elements may be two or more variable capacitors or a combination of variable inductors and variable capacitors.

Referring to FIGS. 3B, 6A, and 6B, the baseband processor 1400 may perform MIMO through at least one of the second band B2 and the third band B3 in a 5G band. In this regard, the baseband processor 1400 may perform MIMO through at least two of the first antenna (ANT1), the fourth antenna (ANT4), the seventh antenna (ANT7), and the eighth antenna (ANT8) in the second band (B2). On the other hand, the baseband processor 1400 may perform MIMO through at least two of the first antenna ANT1, the fourth antenna ANT4, the seventh antenna ANT7, and the eighth antenna ANT8 in the third band B3. Accordingly, the baseband processor 1400 may control the plurality of antennas and the transceiver circuit 1250 to support MIMO up to 4 RXs as well as 2 RXs in the 5G band.

[Standard End]

Figure 7A:
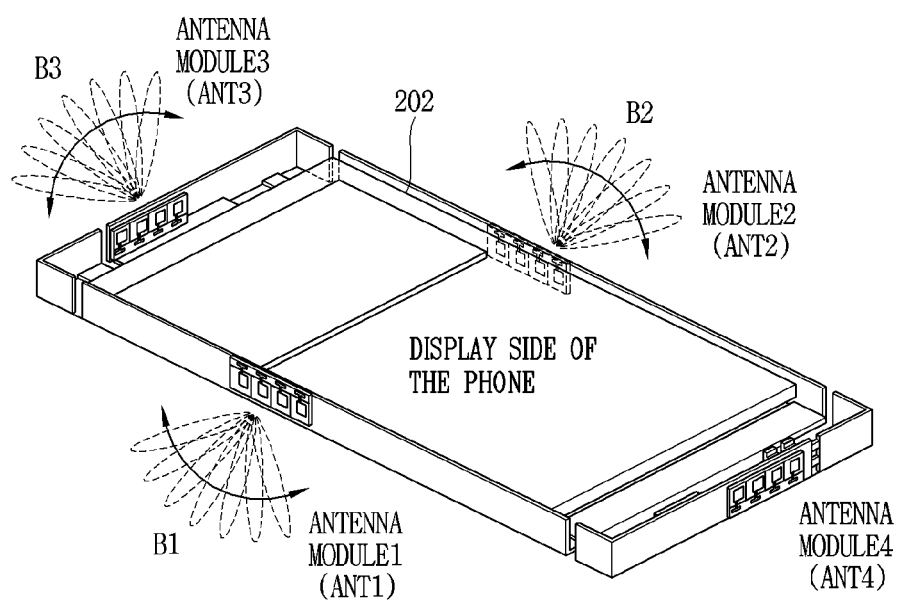
FIG. 7A is a view illustrating a structure in which a plurality of array antennas according to the present disclosure are disposed on an electronic device.

In this regard, FIG. 7A is a view illustrating a structure in which a plurality of array antennas according to the present disclosure are disposed on an electronic device. Referring to FIGS. 3A, 3B, and 7A, a first array antenna ANT1, that is, an antenna module 1 (ANTENNA MODULE 1) is disposed on one of four side surfaces forming an electronic device. Meanwhile, a second array antenna ANT2, that is, an antenna module 2 (ANTENNA MODULE 2) may be disposed on another side surface opposite to the one side surface. Specifically, the first and second array antennas ANT1 and ANT2 may be disposed on a left side surface and a right side surface. However, the present disclosure is not limited to this structure, and the antenna module 2 (ANTENNA MODULE 2) may be any antenna module disposed on a different side surface from the antenna module 1 (ANTENNA MODULE 1) depending on an application.

Meanwhile, a third array antenna ANT3, that is, an antenna module 3 (ANTENNA MODULE 3) may be disposed on a rear surface or still another side surface of the electronic device. Meanwhile, when four array antennas are respectively disposed on four side surfaces of the electronic device, a fourth array antenna ANT4, that is, an antenna module 4 (ANTENNA MODULE 4) may be further provided. At this time, the third and fourth array antennas ANT3 and ANT4 may be disposed on different side surfaces, for example, an upper surface and a lower surface.

The plurality of array antennas ANT1 to ANT4 may be disposed in a region or area where metal is removed from the case 202 made of a metal member. For example, it may be assumed that the first and second array antennas ANT1 and ANT2 are arranged on the left and right side surfaces of the electronic device, and the third and fourth array antennas ANT3 and ANT4 are arranged on the upper and lower surfaces. On the other hand, it is assumed that the first and second array antennas ANT1 and ANT2 are arranged on the upper and lower surfaces of the electronic device, and the third and fourth array antennas ANT3 and ANT4 are arranged on the left and right side surfaces.

The baseband processor (modem) 1400 of the electronic device may perform multiple input/output (MIMO) or diversity operations using the first to fourth array antennas ANT1 to ANT4 configured as described above.

In this regard, a plurality of antenna elements constituting the first to fourth array antennas ANT1 to ANT4 may be patch antenna elements or dipole (or monopole) antenna elements. Alternatively, each of the first to fourth array antennas ANT1 to ANT4 may include a first type array antenna configured as a patch antenna element and a second type array antenna configured as a dipole (or monopole) antenna element.

Meanwhile, the number of array antennas is not limited to four as shown in FIG. 7A. In this regard, three array antennas may be used to cover 270 degrees for the side surfaces of the electronic device. For example, the first, second, and third array antennas ANT1, ANT2, and ANT3 may cover 270 degrees of the side surfaces of the electronic device. As another example, the first, second, and fourth array antennas ANT1, ANT2, and ANT4 may cover 270 degrees of the side surfaces of the electronic device.

Meanwhile, referring to FIGS. 6A to 7A, a plurality of metal rims formed on the case 202 may correspond to 4G/5G antennas, respectively. Here, the 5G antennas formed on the plurality of metal rims may be Sub-6 antennas in a band of 6 GHz or less. On the other hand, the plurality of array antennas ANT1 to ANT4 arranged in a region where a metal is removed from the case 202 made of the metal member may be 5G antennas operating in an mmWave band.

Figure 7B:
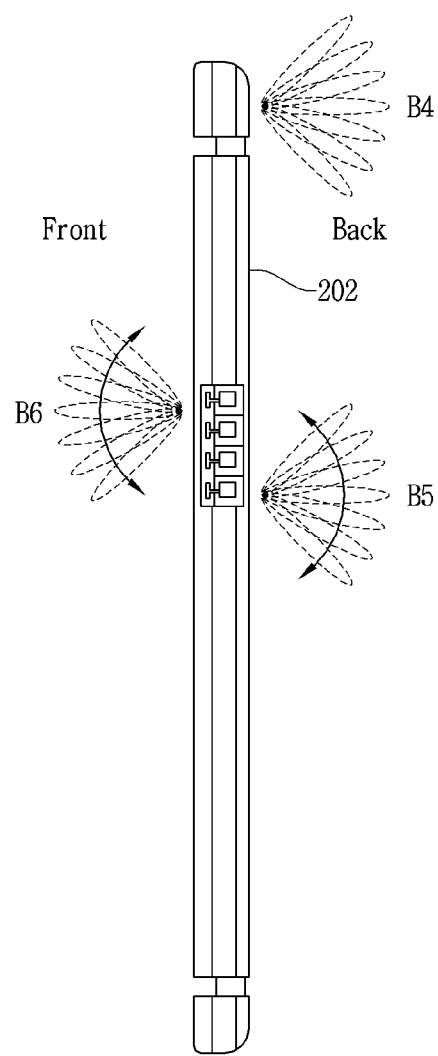
FIG. 7B is a conceptual view illustrating that beamforming is performed through a signal radiated to the front or rear of an electronic device when a second type array antenna according to an embodiment is disposed in an electronic device.

Meanwhile, FIG. 7B is a conceptual view illustrating that beamforming is performed through a signal radiated to the front or rear of an electronic device when a second type array antenna according to an embodiment is disposed in an electronic device. Referring to FIG. 7A, three array antennas, for example, the first, second, and third array antennas ANT1, ANT2, and ANT3 may cover 270 degrees of the side surfaces of the electronic device. Beamforming may be performed through first to third beams B1 to B3 in the 270 degrees of coverage for the side surfaces of the electronic device using the second, third, and fourth array antennas ANT2, ANT3, and ANT4.

Referring to FIG. 7B, beamforming may be performed through fourth to sixth beams B4 to B6 at the front or rear (back) of the electronic device using second type array antennas configured as dipole (or monopole) antenna elements. In this regard, the second type array antennas forming the fourth to sixth beams B4 to B6 at the rear surface may be referred to as fourth to sixth array antennas, respectively.

Figure 8:
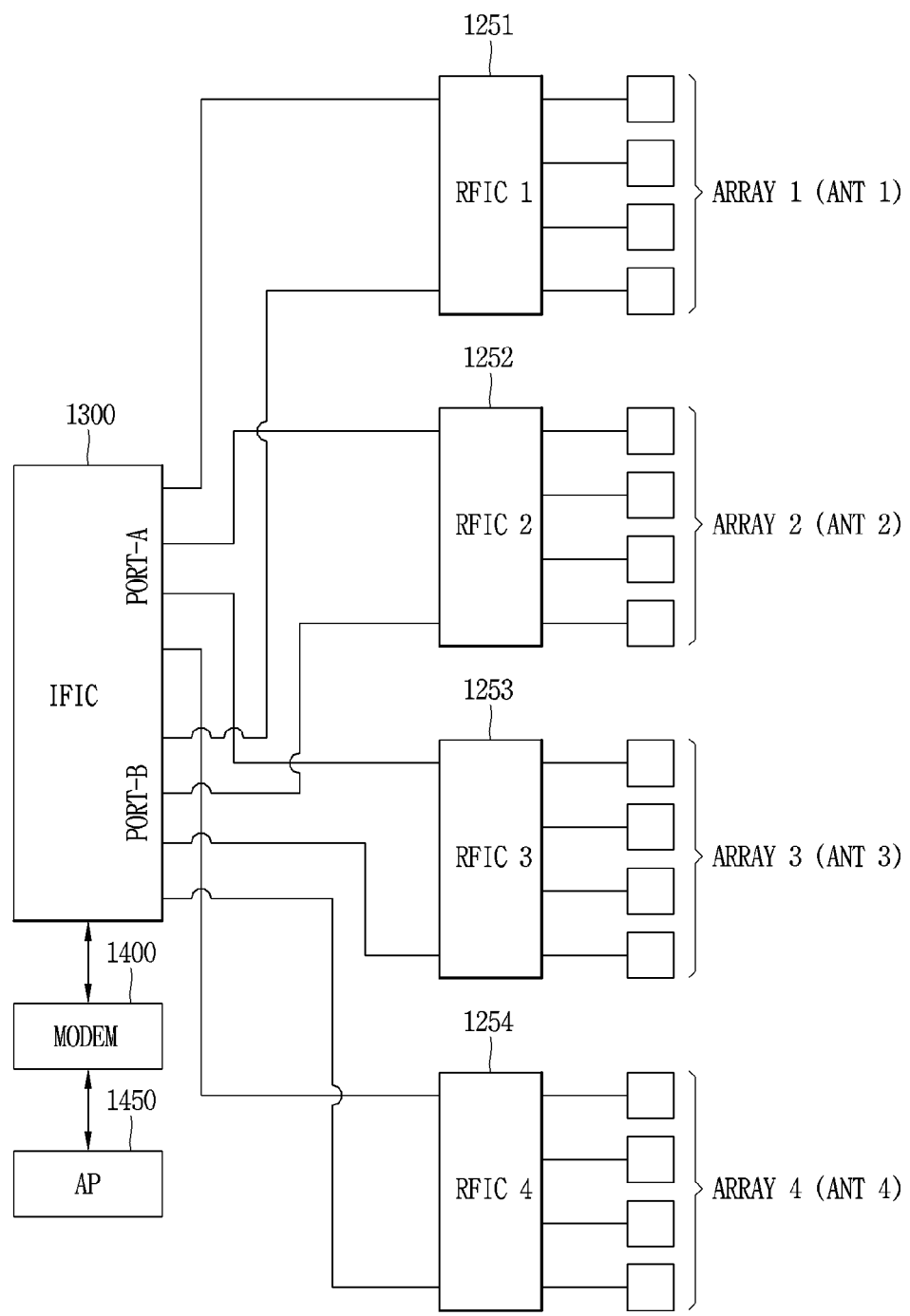
FIG. 8 is a view illustrating a configuration of array antennas and a plurality of wireless communication circuits that can be implemented in an electronic device according to the present disclosure.

Meanwhile, FIG. 8 is a view illustrating a configuration of array antennas and a plurality of wireless communication circuits that can be implemented in an electronic device according to the present disclosure.

Referring to FIGS. 3B, 7A, 7B, and 8, the electronic device according to an embodiment of the present disclosure may include an Intermediate Frequency IC (IFIC) 1300, a plurality of RFICs 1125 to 1254, and a plurality of array antennas ANT1 to ANT4 each including a plurality of antennas. In addition, the electronic device may further include a modem 1400 and an application processor (AP) 1450.

First, each of the array antennas ANT1 to ANT4 may be provided with a plurality of antenna elements configured to transmit and receive signals. The array antennas ANT1 to ANT4 may be antennas operating in a frequency band for 5G communication, and may be antennas supporting millimeter wave (mmWave) communication.

Meanwhile, each of the array antennas ANT1 to ANT4 may be configured to include a power amplifier (PA) and a low-noise amplifier. In addition, each of the power amplifier and the low-noise amplifier may be operable in a 5G communication system.

Each of the array antennas ANT1 to ANT4 may be configured to transmit or receive vertical polarization V and horizontal polarization H. Here, each of the array antennas ANT1 to ANT4 may operate as a transmitting antenna radiating a transmission signal amplified in the power amplifier and a receiving antenna transferring a reception signal to the low-noise amplifier.

Meanwhile, the plurality of RFICs 1251 to 1254 may each include a phase shifter (not shown). The phase shifter may be provided for each antenna element constituting an array antenna. In addition, beamforming may be performed using a phase difference between the antenna elements.

On the other hand, by operating only one of the plurality of RFICs 1251 to 1254, the electronic device may perform transmission and reception of signals with a base station in one of four divided azimuth regions. Alternatively, the plurality of RFICs 1251 to 1254 may all be operated and individually controlled to transmit and receive signals to and from a base station at different angles for each array antenna ANT1 to ANT4.

Meanwhile, when the IFIC 1300 has eight ports, the RFIC may supply four pairs of vertical polarization signals and horizontal polarization signals to different BFICs. For example, first to fourth vertical polarization signals may be transmitted and received through PORT-A including first to fourth ports of the IFIC 1300. Further, first to fourth horizontal polarization signals may be transmitted and received through PORT-B including fifth to eighth ports of the IFIC 1300.

Meanwhile, those signals transmitted and received through the PORT-A and the PORT-B are not necessarily limited to polarization signals orthogonal to each other. For example, signals transmitted and received through the PORT-A and the PORT-B may be time-division or frequency-division signals. In addition, signals transmitted and received through the PORT-A and the PORT-B may be an IF signal and a control signal, respectively. At this time, the signals transmitted and received through the PORT-B may further include a reference signal in addition to the control signal. Here, the reference signal may be a reference signal for a local oscillator in the RFICs 1251 to 1254.

On the other hand, the application processor (AP) 1450 may perform beamforming by referring to arrangement or rotation state information regarding the electronic device using a sensor module (sensor module 140 of FIG. 2A) provided in the electronic device. Therefore, beamforming may be performed by considering the arrangement or rotation state regarding the electronic device, thereby shortening a beam search time.

Figure 9A:
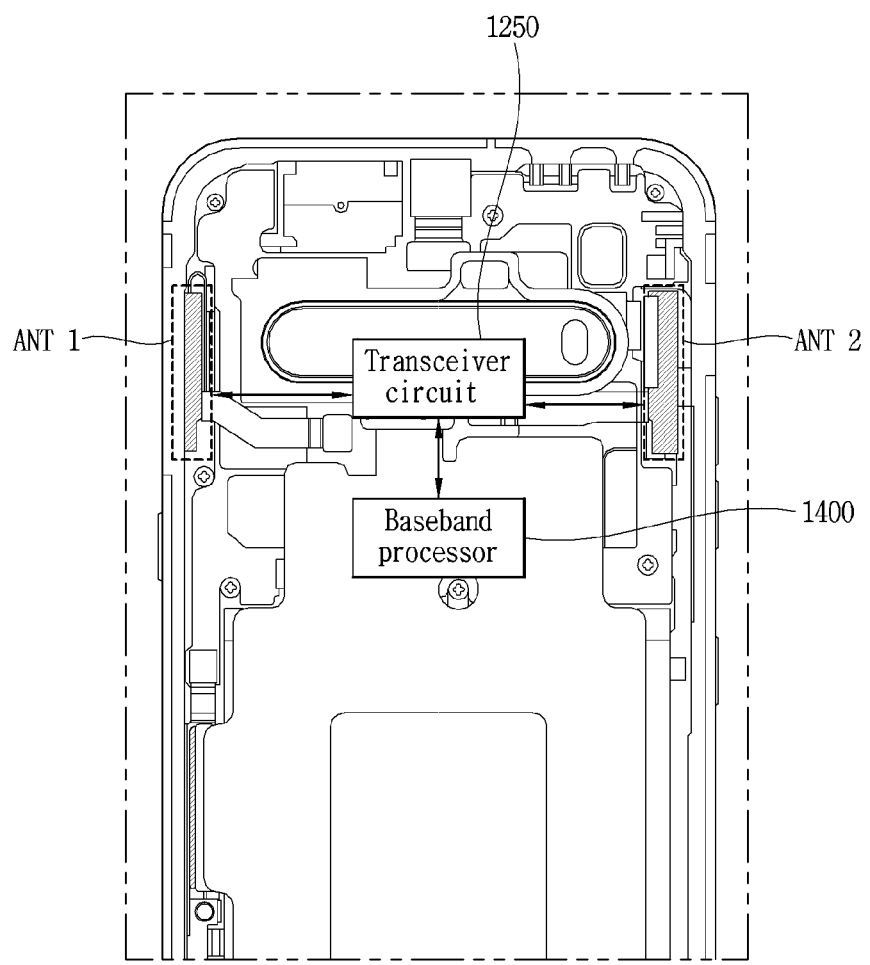
FIG. 9A is a view illustrating a configuration in which two array antenna modules are arranged on side surfaces of an electronic device in accordance with one embodiment.
Figure 9B:
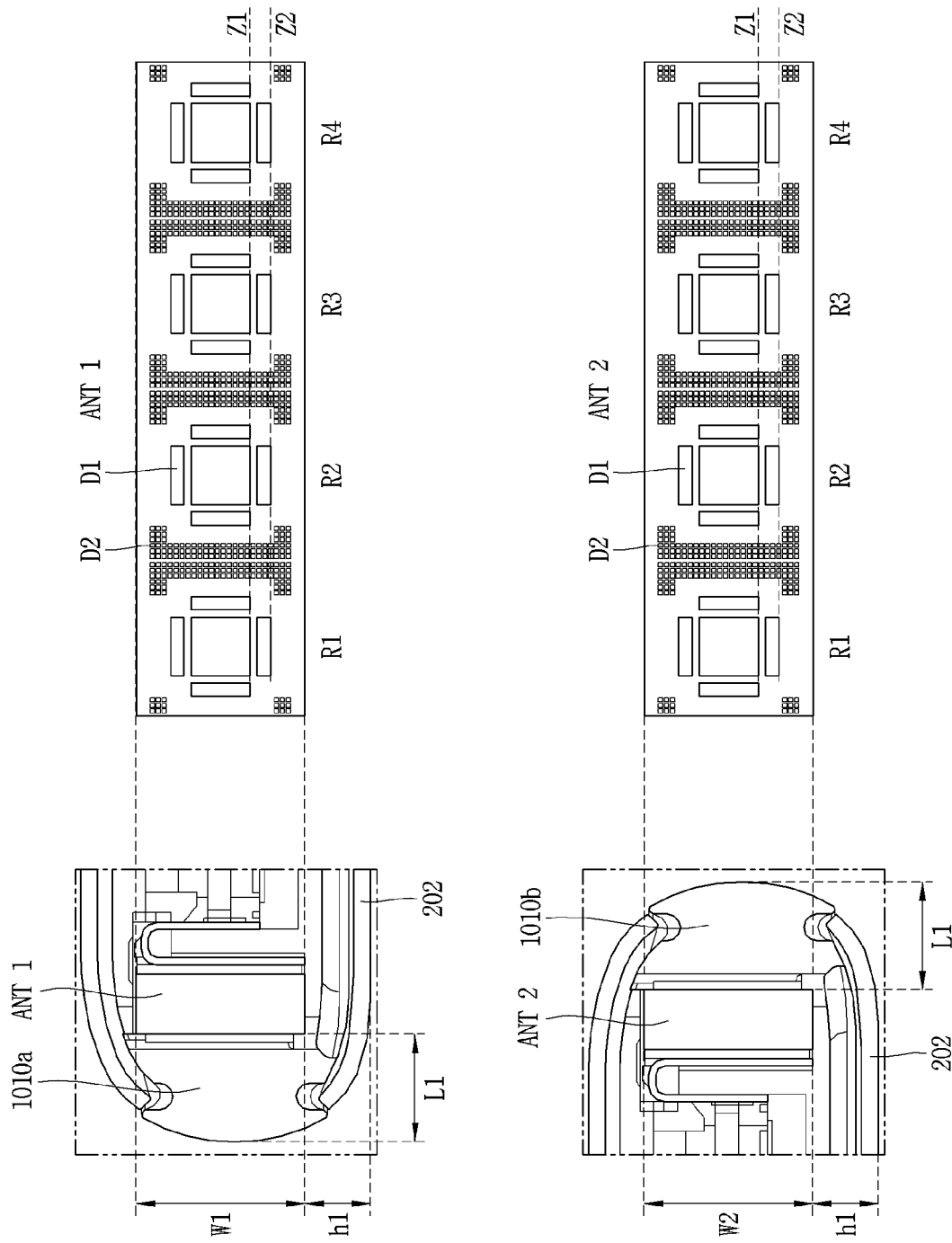
FIG. 9B is a view illustrating a configuration in which two array antenna modules are arranged to be perpendicular to a baseline of the electronic device, and an array antenna configuration including a plurality of antenna elements.

The number of the plurality of array antennas disposed in the electronic device may be changed according to various embodiments, and may be 2 to 4, for example. In this regard, FIG. 9A illustrates a configuration in which two array antenna modules are arranged on side surfaces of the electronic device according to one embodiment. FIG. 9B is a view illustrating a configuration in which two array antenna modules are arranged to be perpendicular to a baseline of the electronic device, and an array antenna configuration including a plurality of antenna elements.

Referring to FIG. 9A, a metal rim may be removed from front surfaces of the first array antenna module ANT1 and the second array antenna module ANT2. Referring to FIG. 9B, the first array antenna module ANT1 and the second array antenna module ANT2 may be disposed substantially perpendicular to the baseline (BL) of the electronic device. Accordingly, a first signal and a second signal radiated through the first array antenna module ANT1 and the second array antenna module ANT2 may be radiated through side surfaces of the electronic device.

A cover glass 501 may be disposed on a top (upper portion) of the electronic device to transmit electromagnetic waves. Dielectric mold portions 1010a and 1010b may be disposed between the cover glass 501 disposed on the top and a case 202 disposed on the bottom (lower portion). In this regard, the case 202 disposed on the bottom may be the metal frame 202.

A first signal and a second signal beam-formed through the first array antenna module ANT1 and the second array antenna module ANT2 may be radiated through the dielectric mold portions 1010a and 1010b disposed on the side surfaces. In this regard, some of the beam-formed first and second signals may be radiated through the cover glass 501 formed on the top. Meanwhile, the arrangement structure of the cover glass 501 and the case 202 is not limited to that illustrated FIG. 9B. As another example, the cover glass 501 may be disposed on the bottom of the electronic device and the case 202 may be disposed on the top of the electronic device.

A width of the first array antenna module ANT1 may be indicated by W1, and a width of the second array antenna module ANT2 may be indicated by W2. In this regard, the width W1 of the first array antenna module ANT1 and the width W2 of the second array antenna module ANT2 may have the same dimension.

Meanwhile, a vertical distance from a lower end of the first array antenna module ANT1 to an end portion of the case 202 may be indicated by h1. A vertical distance from a lower end of the second array antenna module ANT2 to the end portion of the case 202 may be indicated by h2. In this regard, since the first array antenna module ANT1 and the second array antenna module ANT2 have the same configuration and arrangement, the vertical distances h1 and h2 may have the same dimension. In addition, a distance from an end portion of the first array antenna module ANT1 to an end portion of the dielectric mold portion 1010a may be indicated by L1. A distance from an end portion of the second array antenna module ANT2 to the end portion of the dielectric mold portion 1010b may be indicated by L2. In this regard, since the first array antenna module ANT1 and the second array antenna module ANT2 have the same configuration and arrangement, the distances L1 and L2 up to the end portions may have the same dimension.

Meanwhile, each of the first array antenna module ANT1 and the second array antenna module ANT2 may include a plurality of antenna elements R1 to R4. The first array antenna module ANT1 and the second array antenna module ANT2 may be formed in a multi-layered substrate structure in which a plurality of substrates is stacked.

The number of the plurality of antenna elements R1 to R4 is not limited to four. Depending on an application in consideration of beamforming resolution, the number of the plurality of antenna elements may be changed to 4, 6, 8, and the like. Meanwhile, the first array antenna module ANT1 and the second array antenna module ANT2 configured in the multi-layered substrate structure may include two or more antenna elements arranged in a perpendicular direction. Accordingly, the first array antenna module ANT1 and the second array antenna module ANT2 may operate in a wide band. For example, the first array antenna module ANT1 and the second array antenna module ANT2 may operate in a first band corresponding to a 28 GHz band and a second band corresponding to a 39 GHz band.

Dummy structures D1 and D2 for reducing mutual interference may be disposed among the antenna elements R1 to R4. In this regard, the dummy structure may be a conductive plate structure configured in a stacked form on the multi-layered substrate. The mutual interference among the antenna elements R1 to R4 may be reduced through the dummy structures D1 and D2 such as the conductive plate structure. Accordingly, the dummy structures D1 and D2 may be referred to as electronic band gaps (EBGs). In addition, structural stability such as rigidities of the first array antenna module ANT1 and the second array antenna module ANT2 may be improved through the dummy structures D1 and D2 such as the conductive plate structure.

Meanwhile, the array antenna module disposed inside the electronic device described herein may be subjected to an offset arrangement in the perpendicular (vertical) direction. In this regard, FIG. 10 is a view illustrating an offset arrangement of array antenna modules inside an electronic device according to one embodiment.

Figure 10:
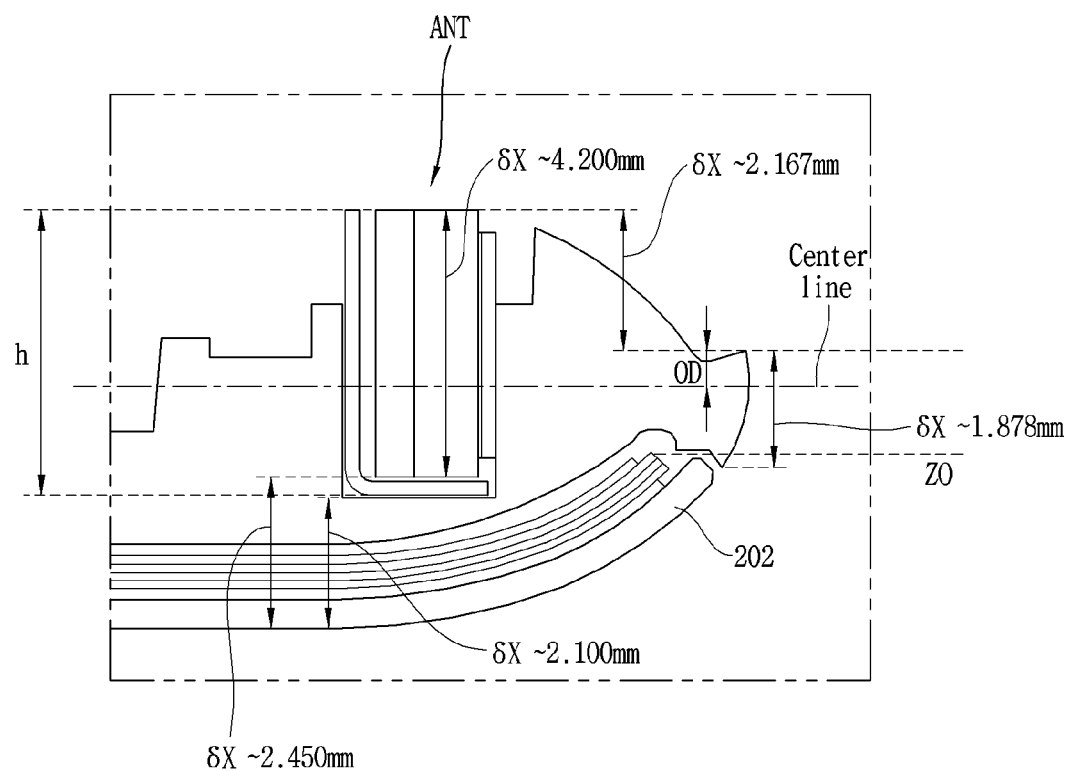
FIG. 10 is a view illustrating an offset arrangement of array antenna modules inside an electronic device according to one embodiment.

Referring to FIG. 10, an offset distance OD between a center line of an array antenna module ANT having a height h and a center line of the electronic device may be generated. Meanwhile, a position of an upper end of the case 202 formed on the bottom of the electronic device may be higher than a position of a lower end of the array antenna module ANT. Accordingly, when the case 202 is a metal frame, a blocking phenomenon of a signal radiated by the array antenna module ANT may occur.

In this regard, referring to FIGS. 9B and 10, the signal blocking phenomenon can be minimized by allowing a position z1 of a lower end of an antenna element to be higher than a position z0 of an upper end of the case. As another example, the signal blocking phenomenon can be minimized by allowing a position z2 of a lower end of the dummy structure D1 to be higher than the position z0 of the upper end of the case 202.

Hereinafter, the aforementioned configuration in which the plurality of array antenna modules is arranged in the electronic device will be described in detail. In this regard, FIG. 11 is a view illustrating a configuration of a plurality of array antennas disposed on different side surfaces of an electronic device.

Figure 11:
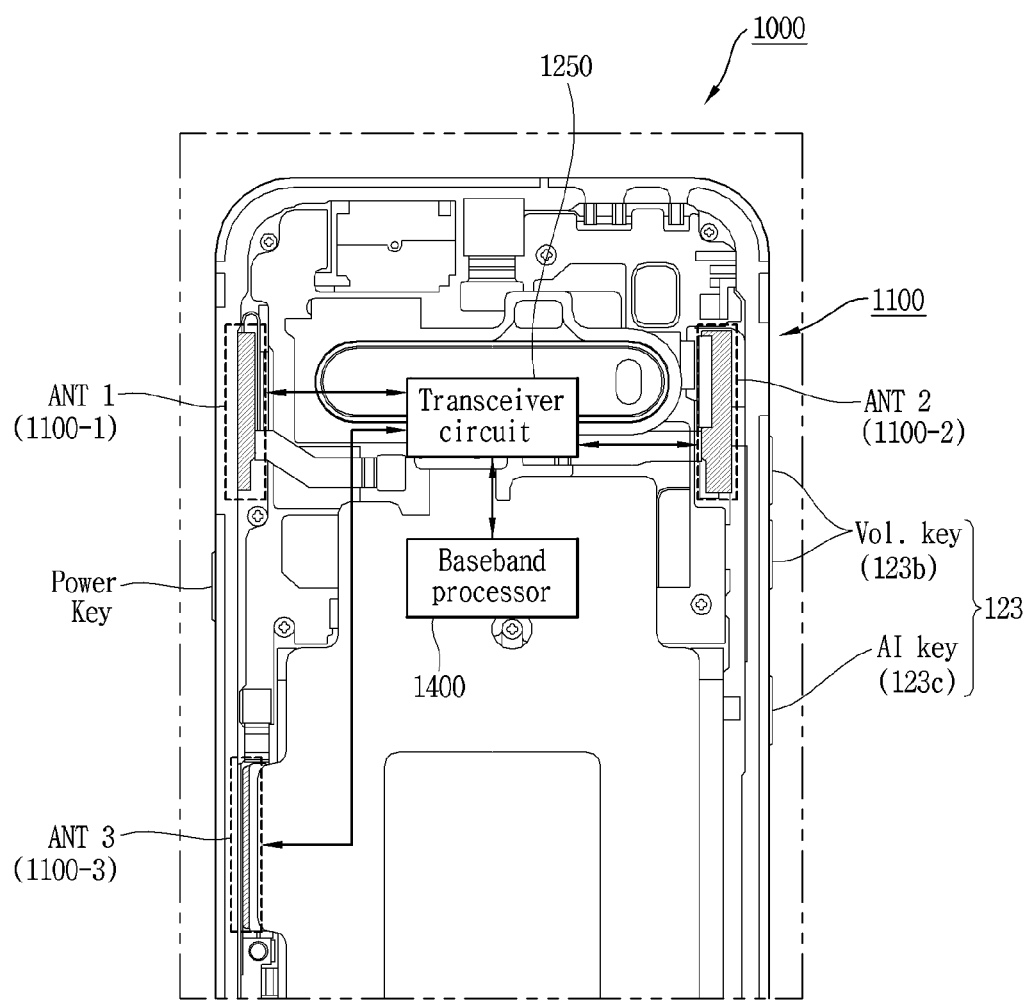
FIG. 11 is a view illustrating a configuration of a plurality of array antennas disposed on different side surfaces of an electronic device.

Referring to FIG. 11, the case 202 having metal rims formed on side surfaces of the electronic device 1000 may be disposed. A plurality of manipulation buttons may be provided on the case 202 formed on the side surfaces of the electronic device 1000. In this regard, the manipulation buttons may be a touch-sensitive button based on touch position recognition in addition to a physical key button. The plurality of manipulation buttons may include a power key 123a, volume keys 123b, and an AI key 123c all provided on both side surfaces of the case. The power key 123a, the volume keys 123b, and the AI key 123c may be referred to as side keys (buttons) 123 because they are provided on the side surfaces of the electronic device.

The first antenna module (ANT1) 1100-1 and the second antenna module (ANT2) 1100-2 may be disposed on the side surfaces of the electronic device to radiate a first signal and a second signal to the side surfaces of the electronic device. Meanwhile, a third antenna module (ANT3) 1100-3 may be disposed on a side or rear surface of the electronic device to emit a third signal to the side or rear surface of the electronic device. Accordingly, the antenna module 1100 such as the first antenna module (ANT1) 1100-1 to the third antenna module (ANT3) 1100-3 may be configured to transmit or receive beam-formed signals through a plurality of antenna elements.

The electronic device 1000 described herein may further include a transceiver circuit 1250 and a baseband processor 1400. The transceiver circuit 1250 may be operatively coupled to the first antenna module ANT1 and the second antenna module ANT2. The transceiver circuit 1250 may be configured to transmit or receive the first signal through the first antenna module ANT1 and the second signal through the second antenna module ANT2. Meanwhile, the transceiver circuit 1250 may be operatively coupled to the first antenna module ANT1 to the third antenna module ANT3. The transceiver circuit 1250 may be configured to transmit or receive the first signal through the first antenna module ANT1, the second signal through the second antenna module ANT2, and a third signal through the third antenna module ANT3.

Also, the transceiver circuit 1250 may be configured to transmit or receive four or more signals through other antenna modules in addition to the first antenna module ANT1 to the third antenna module ANT3. Referring to FIGS. 7B and 11, the transceiver circuit 1250 may emit a signal through a front or rear surface of the electronic device through a second-type array antenna such as a dipole (monopole) antenna. Accordingly, the transceiver circuit 1250 may transmit and receive signals through at least one of the first antenna module ANT1 to the third antenna module ANT3 and at least one of the second type array antenna modules.

The baseband processor 1400 may be operatively coupled to the transceiver circuit 1250. The baseband processor 1400 may be configured to perform multiple input/output (MIMO) or diversity using first and second signals transmitted or received through the transceiver circuit 1250. The baseband processor 1400 may be configured to perform multiple input/output (MIMO) or diversity using first to third signals transmitted or received through the transceiver circuit 1250. The baseband processor 1400 may be configured to perform multiple input/output (MIMO) or diversity through first to fourth signals transmitted or received through the transceiver circuit 1250. Here, the fourth signal may be a signal transmitted or received through the second-type array antenna module.

Referring to FIGS. 9A to 11, the first antenna module (ANT1) 1100-1 may be disposed substantially perpendicular to a center line or a baseline of the electronic device. That is, the first antenna module (ANT1) 1100-1 may be disposed at an angle of a substantially 90 degrees with respect to the center line or the baseline.

Meanwhile, the second antenna module (ANT2) 1100-2 may be arranged in a tilted (slanted, inclined) form at a predetermined slant angle based on the center line or baseline of the electronic device. For example, the second antenna module (ANT2) 1100-2 may be disposed in a tilted form at an angle of 55 degrees. The second antenna module (ANT2) 1100-2 may also be arranged with being tilted in a predetermined angle range from 55 degrees. That is, the second antenna module (ANT2) 1100-2 may be disposed at an angle of substantially 55 degrees based on the center line or the baseline.

The third antenna module (ANT3) 1100-3 may be disposed to be substantially in parallel to the center line or baseline of the electronic device. That is, the first antenna module (ANT3) 1100-3 may be disposed at an angle of a substantially 0 degree with respect to the center line or the baseline.

Figure 12A:
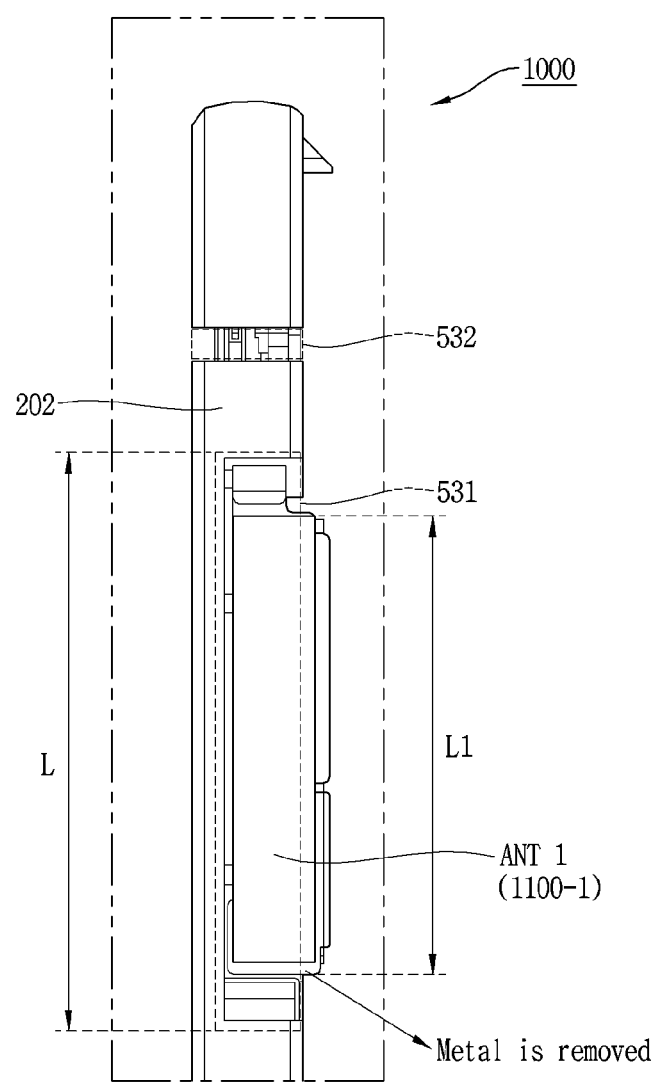
FIGS. 12A and 12B are side views of a vertically (perpendicularly) arranged antenna module.
Figure 12B:
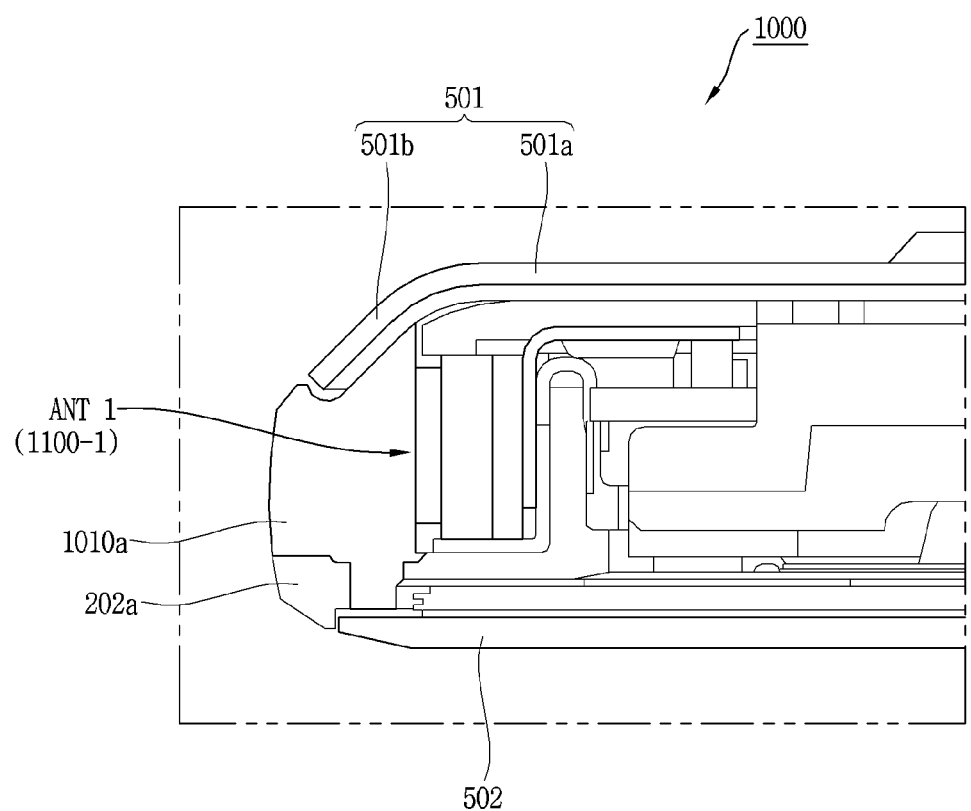

Hereinafter, the arrangement structure of the plurality of antenna modules disposed on the side surfaces of the electronic device will be described in detail. In this regard, FIGS. 12A and 12B are side views of a vertically (perpendicularly) arranged antenna module. Specifically, FIG. 12A illustrates a configuration in which a metal in a case region corresponding to perpendicularly arranged antenna modules has been removed. In this regard, a length L of an aperture region of the metal case 202 may be equal to or longer than a length L1 of the antenna module (ANT1) 1100-1.

Referring to FIGS. 9B and 12A, a fringing field may be generated by the antenna element R1 or R4 disposed at the outermost side. Therefore, the length L of the aperture region may be equal to or longer than the length L1 of the antenna module (ANT1) 1100-1, thereby minimizing blocking of the fringing field by the metal case 202. Meanwhile, an opening region or a partial region of the case 202 configured as the metal member may be configured as a non-metal member 531, 532.

FIG. 12B is a cross-sectional view of a structure in which the antenna module of FIG. 12A is disposed in the electronic device. Referring to FIGS. 12A and 12B, the antenna module (ANT1) 1100-1 disposed in the electronic device 1000 may be configured not to overlap a metal member at any region. In this regard, the cover glass 501 through which electromagnetic waves are transmitted may be provided on the top or bottom of the electronic device 1000.

The electronic device 1000 according to one embodiment may include a case 202 defining external appearance of the body. The cover glass 501 may be the window 151a of the display unit 151 of FIG. 2B and may define a front surface of a terminal body. The cover glass 501 may be formed of tempered glass. However, the present disclosure is not limited thereto, and any other material such as a synthetic resin may be used as long as it is transparent to display visual information while covering the display.

The cover glass 501 may include a planar portion 501a disposed on the front surface of the electronic device, and a bent portion 501b configured to be bent at at least one end of the planar portion 501a so that a transmission signal of the antenna can be radiated through the cover glass 501. In this regard, the planar portion 501a may be formed parallel to the baseline BL.

The bent portion 501b may be configured as a non-transparent region. However, the present disclosure is not limited thereto, and at least part of the bent portion 501b may be configured as a transparent region to display visual information through the bent portion 501b. Therefore, in this example, an edge portion of the window that is curved or bent toward a side surface from the front of the electronic device to form at least part of the side surface may be used as a display. Alternatively, the cover glass 501a may be bent at each of the top and the bottom of the electronic device, and the bent portions may form an opaque bezel area.

Meanwhile, the electronic device may further include a dielectric mold portion 1010a formed between the metal rim 202a and the cover glass 501.

Figure 13A:
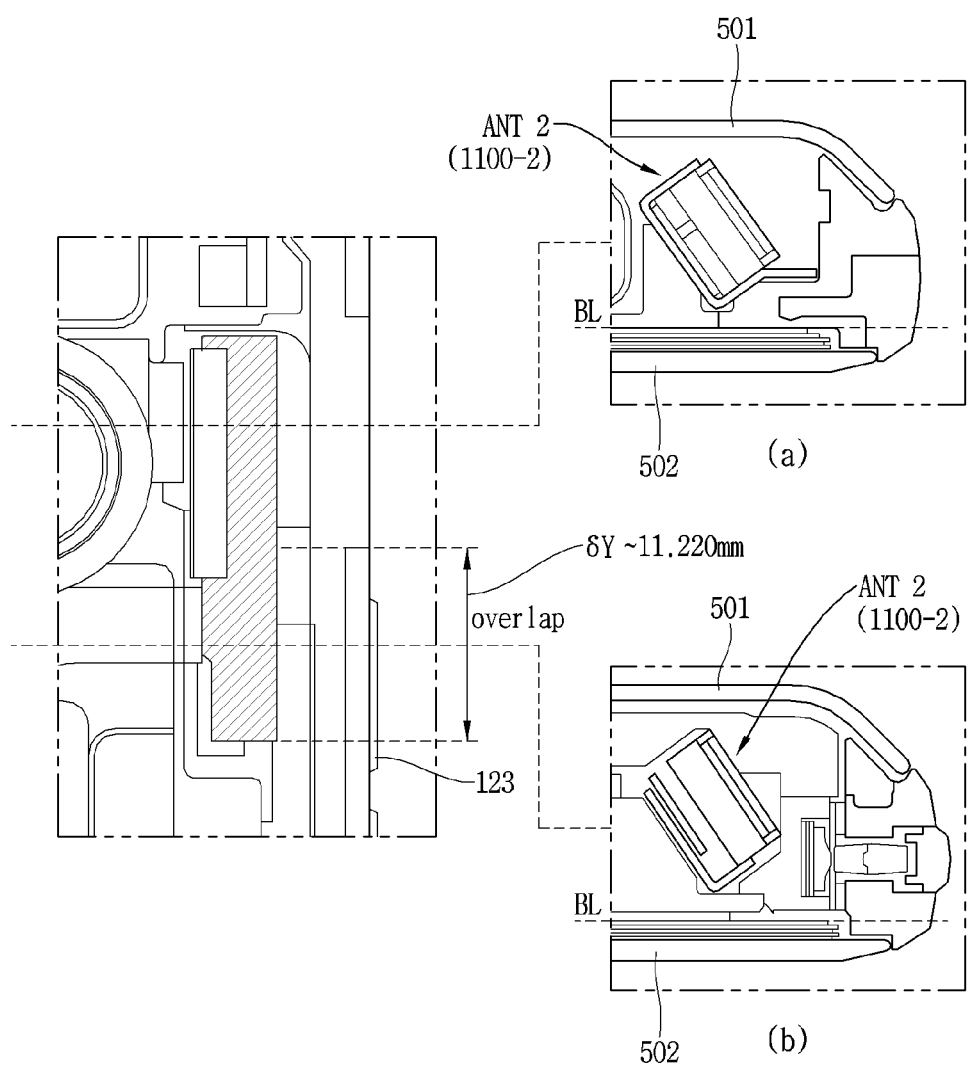
FIGS. 13A and 13B are views of an antenna module disposed in a tilted form on a side surface of an electronic device according to another embodiment.
Figure 13B:
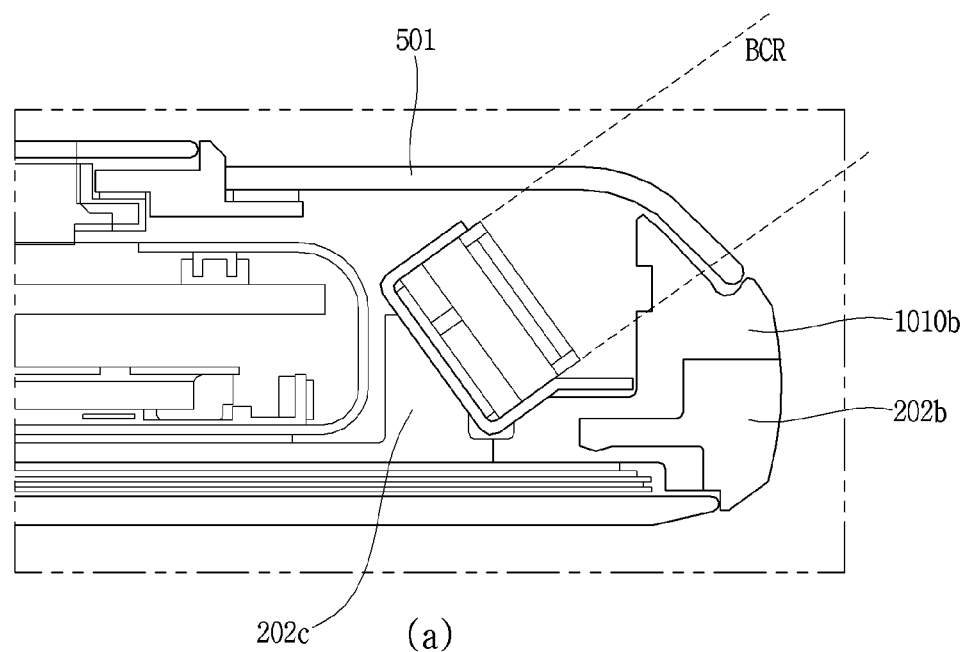
Figure 13B:
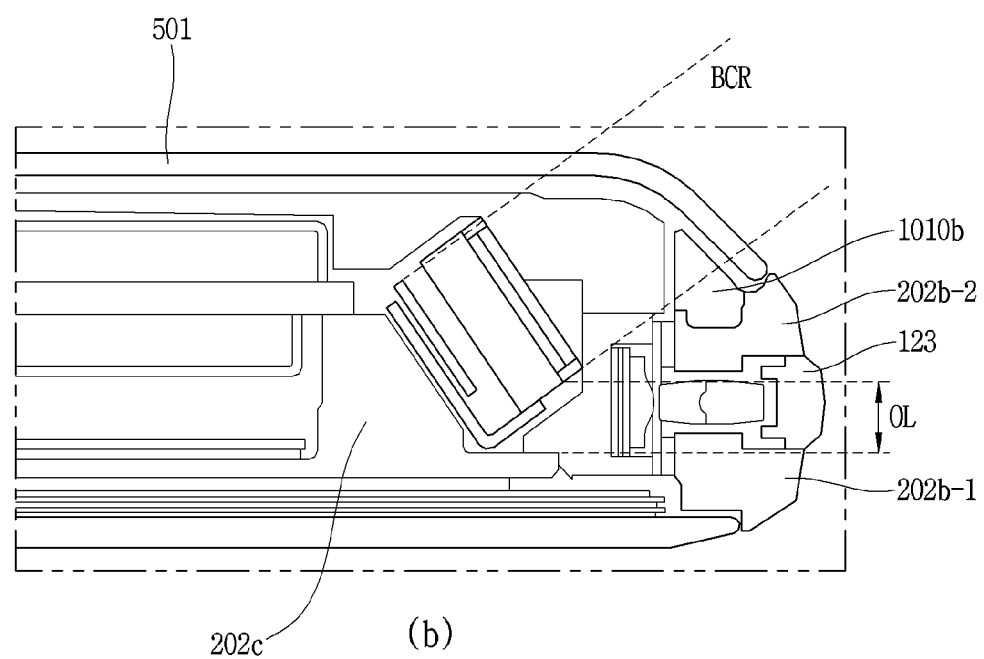

FIGS. 13A and 13B are views of an antenna module disposed in a tilted form on a side surface of an electronic device according to another embodiment. Specifically, FIG. 13A is a cross-sectional view of a configuration including an antenna module disposed on a module bracket in a tilted form with respect to one side surface of the electronic device, viewed from different positions. FIG. 13B illustrates an enlarged view of the configuration including the antenna module of FIG. 13A and a radiation region.

Referring to FIGS. 13A and 13B, the electronic device 1000 may include a cover glass 501, a case 202, and an antenna module (ANT2) 1100-2. In this regard, the antenna module perpendicularly arranged as illustrated in FIGS. 12A and 12B may be referred to as the first antenna module (ANT1) 1100-1. On the other hand, the antenna module disposed in the tilted form as illustrated in FIGS. 13A and 13B may be referred to as the second antenna module (ANT2) 1100-2.

The cover glass 501 may be disposed on the front surface or the rear surface of the electronic device. The cover glass 501 may include a planar portion 501*a* disposed on the front surface of the electronic device, and a bent portion 501*b* configured to be bent at at least one end of the planar portion 501*a* so that a transmission signal of the antenna can be radiated through the cover glass 501. In this regard, the planar portion 501*a* may be formed parallel to the baseline BL.

The case 202 may have a metal rim 202*b* formed on each of side surfaces of the electronic device. The antenna module (ANT2) 1100-2 may be configured to transmit or receive beam-formed signals through the plurality of antenna elements R1 to R4 of FIG. 9B.

On the other hand, the antenna module (ANT2) 1100-2 may be configured to be coupled to a module bracket 1020 with being tilted by a predetermined slant angle from the baseline. Accordingly, the antenna module (ANT2) 1100-2 may emit or radiate beam-formed signals through the cover glass 501.

A part of a lower region of the antenna module (ANT2) 1100-2 may be located lower than the metal rim 202*b*. In this regard, the antenna module (ANT2) 1100-2 and the metal rim 202*b* may overlap each other up to a predetermined height OH in a perpendicular direction.

The electronic device may further include a dielectric mold portion 1010*a* formed between the metal rim 202*b* and the cover glass 501. On the other hand, despite the overlap between the antenna module (ANT2) 1100-2 and the metal rim 202*b* by a predetermined length OL, blocking of radiated signals may not occur. In this regard, the predetermined slant angle may be determined so that a beam coverage region by the antenna module (ANT2) 1100 1100-2 is not blocked by the metal rim 202*b*.

In this regard, the antenna module (ANT2) 1100-2 may be arranged in a tilted form at the predetermined slant angle based on the center line or baseline of the electronic device. For example, the antenna module (ANT2) 1100-2 may be disposed in a tilted form at an angle of 55 degrees. The antenna module (ANT2) 1100-2 may be arranged with being tilted in a predetermined angle range from 55 degrees. That is, the antenna module (ANT2) 1100-2 may be disposed at an angle of substantially 55 degrees based on the center line or the baseline.

The electronic device may further include a side key 123 disposed between metal rims 202*b* (i.e., 202*b*-1 and 202*b*-2) in a lengthwise direction of the antenna module (ANT2) 1100-2 or inside the metal rim 202*b*. In this regard, referring to (b) of FIG. 13A and (b) of FIG. 13B, the metal rim 202*b* may include a lower metal rim 202*b*-1 disposed on a bottom of the side key 123, and an upper metal rim 202*b*-2 disposed on a top of the side key 123. Here, the side key 123 may be one of a power key 123*a*, a volume key 123*b*, and an AI key 123*c*. Referring to FIG. 13A, the volume key 123*b* may overlap the antenna module (ANT2) 1100-2 in the lengthwise direction by the predetermined length OL.

Referring to (a) of FIG. 13A and (a) of FIG. 13B, the dielectric mold portion 1010*b* may be provided inside the cover glass 501 in a first region where the side key is not disposed, so as to support a lower portion of the module bracket 1020. In this case, the beam coverage region (BCR) by the antenna module (ANT2) 1100-2 may be defined in a region of the dielectric mold portion 1010*b* and the cover glass 501, so as not to be blocked by the metal rim 202*b*. In particular, the beam coverage region (BCR) by the antenna module (ANT2) 1100-2 may be mainly formed in a region of the dielectric mold portion 1010*b* and the bent portion 501*b*, so as not to be blocked by the metal rim 202*b*.

Referring to (b) of FIG. 13A and (b) of FIG. 13B, the dielectric mold portion 1010*b* may be disposed on an upper portion of the upper metal rim 202*b*-2 in a second region where the side key 123 is disposed, to be located inside the cover glass 501. In this case, the beam coverage region (BCR) by the antenna module (ANT2-2) 1100-2 may be defined in a region of the dielectric mold portion 1010*b* and the cover glass 501, so as not to be blocked by the upper metal rim 202*b*-2. In particular, the beam coverage region (BCR) by the antenna module (ANT2) 1100-2 may be mainly formed in a region of the dielectric mold portion 1010*b* and the bent portion 501*b*, so as not to be blocked by the upper metal rim 202*b*-2.

Figure 14A:
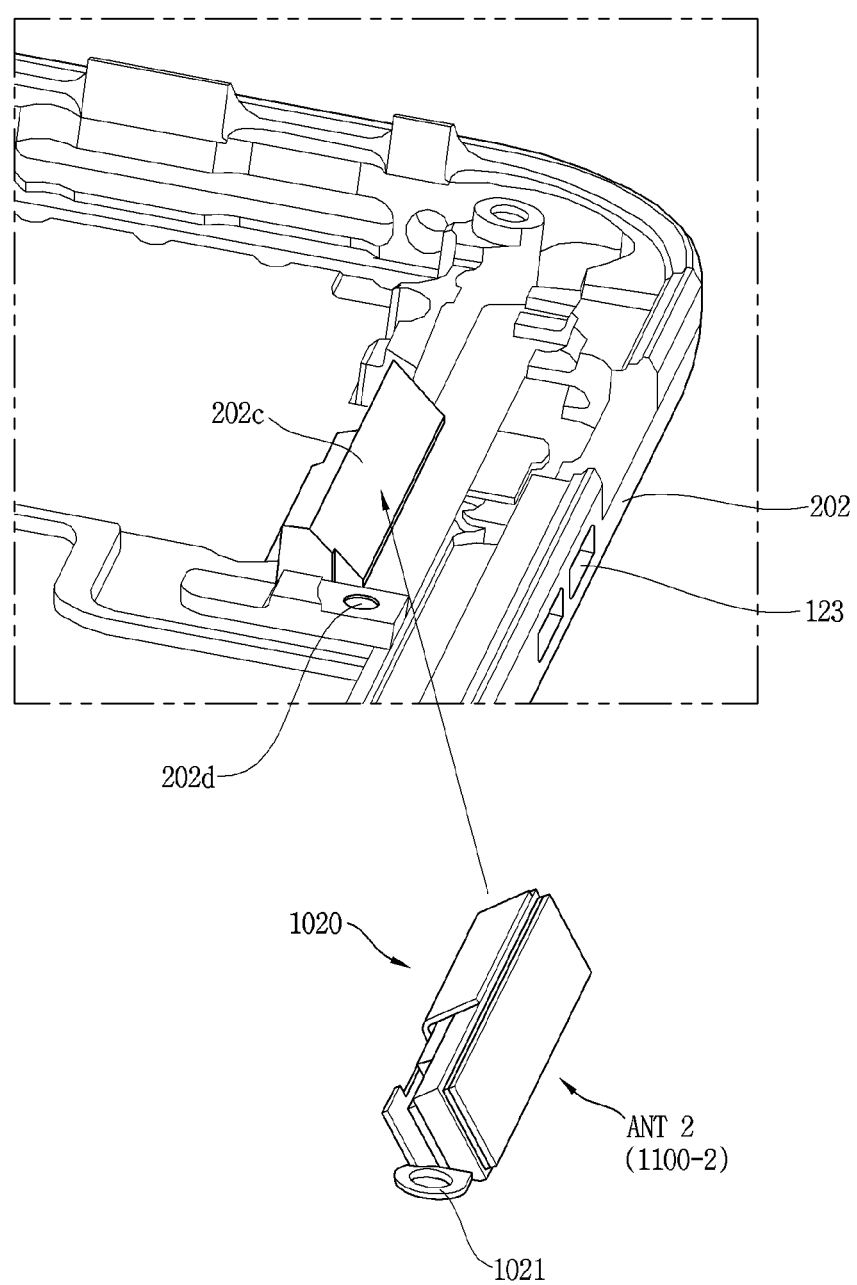
FIGS. 14A to 14C are views illustrating a structure in which an antenna module is mounted on a slanted surface of a case of a metal member.
Figure 14B:
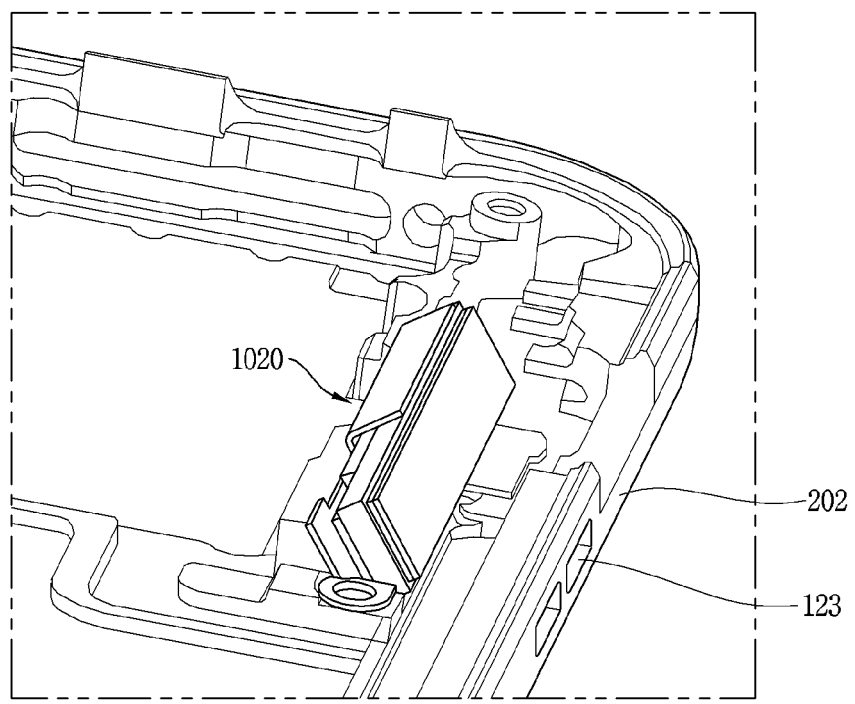
Figure 14C:
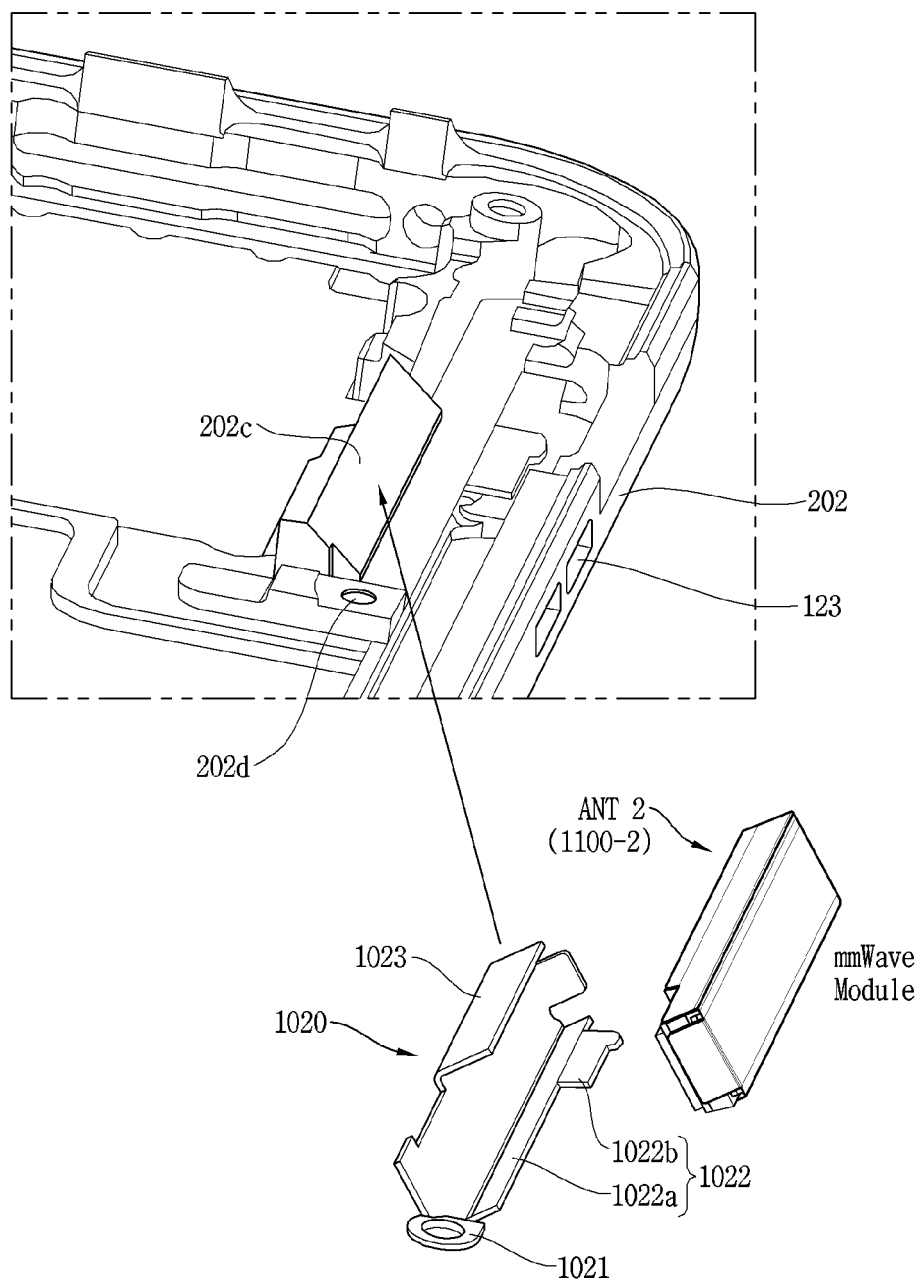

Hereinafter, the mounting structure of the aforementioned antenna module (ANT2) 1100-2 will be described in detail. In this regard, FIGS. 14A to 14C are views illustrating a structure in which an antenna module is mounted on a slanted surface of a case of a metal member. FIG. 14A illustrates a configuration before the antenna module is mounted on a slanted surface of a case of a metal member. FIG. 14B illustrates a configuration in which the antenna module has been mounted on the slanted surface of the case of the metal member. On the other hand, FIG. 14C illustrates a configuration in which a module bracket and the antenna module to be mounted on the case of the metal member have been separated.

Referring to FIGS. 14A to 14C, the module bracket 1020 may be configured to be mounted on a slanted surface 202*c* of a metal frame corresponding to the case 202. The module bracket 1020 may be configured as a metal member for coupling with the case 202 of the metal member. On the other hand, the module bracket 1020 may be configured as a metal member to operate as a ground for the antenna module (ANT2) 1100-2.

Referring to FIGS. 3A, 14A, and 14B, the case 202 may be a middle case 202 formed between the rear case 203 of the electronic device and the front case corresponding to the cover glass 501.

The metal frame corresponding to the middle case 202 may include a hole reception portion 202*d* formed integrally with the slanted surface 202*c*. Meanwhile, the home reception portion 202*d* may be coupled with a screw hole 1021, which is integrally formed with the module bracket 1020, through a screw for fixing the module bracket 1020.

The side key 123 may be configured to be inserted into the electronic device through a side key bracket disposed inside the electronic device. In this regard, FIG. 15 is a view illustrating a configuration in which a side key is mounted through a side key bracket according to one embodiment.

Figure 15:
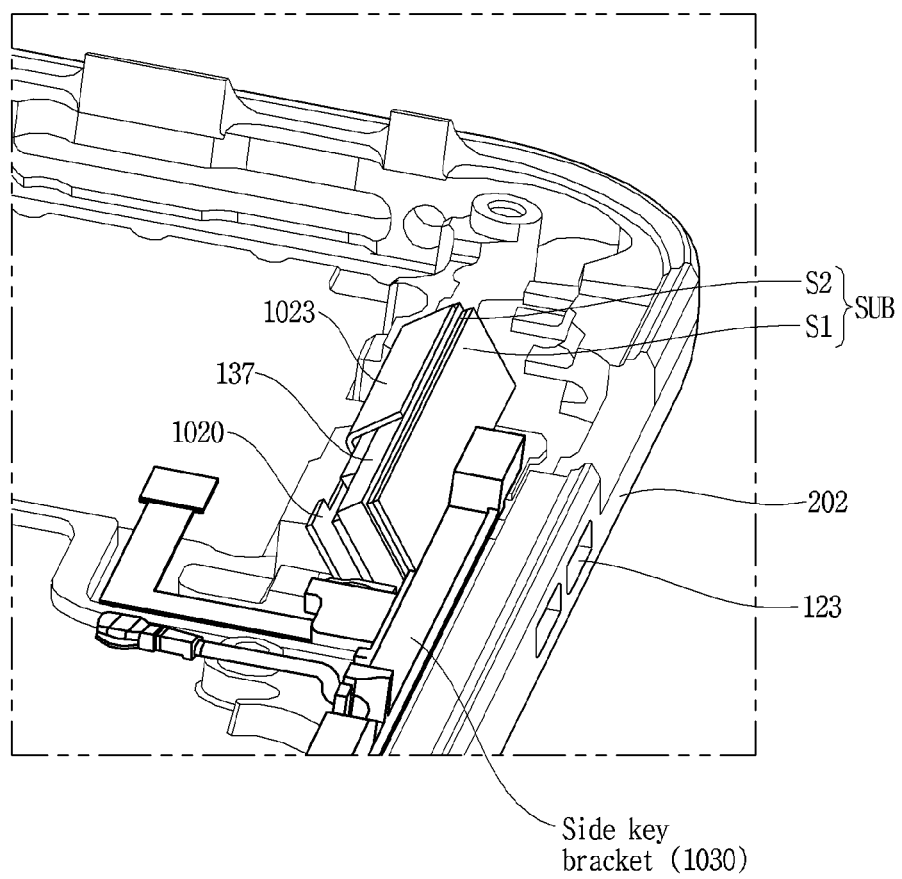
FIG. 15 is a view illustrating a configuration in which a side key is mounted through a side key bracket according to one embodiment.

Referring to FIG. 15, the electronic device may further include a side key bracket 1030 having a hole formed therein to receive (accommodate) the side key 123 and configured to support the antenna module (ANT2) 1100-2. Referring to FIGS. 13B and 15, the side key bracket 1030 may be formed of a dielectric, and signals radiated through the antenna module (ANT2) 1100-2 may be radiated through the side key bracket 1030 and the cover glass 501.

Referring to FIGS. 13B, 14C, and 15, the module bracket 1020 may be provided with a lower end support portion 1022 formed on a lower end thereof to support a lower portion of the antenna module (ANT2) 1100-2. The lower end support portion 1022 may include a first support portion 1022*a* configured to support the antenna module (ANT2) 1100-2 at the bottom and a second support portion 1022*b* configured to be disposed on a top of the dielectric mold portion 1010*b*. The first support portion 1022*a* may be formed at a predetermined angle to cover a side surface of the antenna module (ANT2) 1100-2. The second support portion 1022*b* may be formed to be in parallel with a horizontal portion of the dielectric mold portion 1010*b* and horizontal to the baseline.

On the other hand, the side key bracket 1030 may be disposed on a top of the lower support portion 1022, and the antenna module (ANT2) 1100-2 and the side key bracket 1030 may partially overlap each other. For example, the side key bracket 1030 may be disposed on a top of the second support portion 1022*b* which is parallel to the horizontal portion, and the antenna module (ANT2) 1100-2 and the side key bracket 1030 may partially overlap each other.

The module bracket 1020 may be provided with an upper end support portion 1023 formed on an upper end thereof and configured to support an upper portion of the antenna module (ANT2) 1100-2. One end of the upper end support portion 1023 may be configured not to cover a substrate SUB of the antenna module (ANT2) 1100-2 to prevent blocking of signals radiated through the antenna module (ANT2) 1100-2. In this regard, the substrate SUB of the antenna module (ANT2) 1100-2 may be a multi-layered substrate including a plurality of substrates S1 and S2.

Referring to FIGS. 9B and 12, each of the first antenna module ANT1 and the second antenna module ANT2 may include a plurality of antenna elements R1 to R4. Referring to FIGS. 14A to 14C and 15, the first antenna module ANT1 and the second antenna module ANT2 may be configured in a multi-layered substrate structure in which a plurality of substrates is stacked. In this regard, the antenna module (ANT1 to ANT3) 1100 may be configured to include a dielectric carrier 137 and at least one substrate SUB.

The dielectric carrier 137 may be arranged to be mounted on the module bracket 1020. The at least one substrate SUB may be disposed on a top of the dielectric carrier 137. In this case, a plurality of antenna elements may be disposed at predetermined intervals on an upper or lower layer of a specific substrate of the at least one substrate of the antenna module (ANT2) 1100-2. That is, a plurality of antenna elements constituting an array antenna may be disposed on a front or rear surface of a first substrate S1 which is an upper substrate or on a front or rear surface of a second substrate S2 which is a lower substrate. Each of the plurality of antenna elements may be antenna elements which are stacked in a direction, in which the first substrate S1 and the second substrate S2 are stacked, to improve bandwidth characteristics.

The plurality of antenna elements may have the same shape or different shapes depending on cases. In this regard, referring to FIG. 9B, the plurality of antenna elements R1 to R4 may be in a shape of a square patch. However, the shape of the plurality of antenna elements is not limited thereto. For example, the plurality of antenna elements may be configured as arbitrary polygonal patch antennas or circular patch antennas in a rotated state by a predetermined angle.

Meanwhile, the antenna module (ANT1 to ANT3) 1100 described herein may be configured to perform beamforming. In this regard, the beamforming may be performed by applying a phase-varied signal between the plurality of antenna elements R1 to R4 in the antenna module (ANT1 to ANT3) 1100.

Referring to FIGS. 7A to 15, the first antenna module (ANT1) 1100-1 may be configured to radiate a first signal through another side surface of the electronic device. On the other hand, the second antenna module (ANT2) 1100-2 may be configured to radiate a second signal through one side surface of the electronic device. In detail, the first antenna module (ANT1) 1100-1 may be arranged to be perpendicular or vertical to the baseline of the electronic device. On the other hand, the second antenna module (ANT2) 1100-2 may also be arranged in a tilted form from the baseline of the electronic device by a predetermined slant angle.

Referring to FIG. 9B, the lower end of the first antenna module (ANT1) 1100-1 may be located higher than the upper end of the metal rim so that a signal radiated through the first antenna module (ANT1) 1100-1 cannot be blocked by the metal rim. On the other hand, referring to FIG. 10, the part of the lower region of the first antenna module (ANT1) 1100-1 may be located lower than the upper end of the metal rim 202*a*. In this case, as described above, lower ends of the antenna elements R1 to R4 of the first antenna module (ANT1) 1100-1 may be disposed higher than the upper end of the metal rim 202*a*.

The electronic device 1000 described herein may further include a transceiver circuit 1250 and a baseband processor 1400. The transceiver circuit 1250 may be operatively coupled to the first antenna module ANT1 and the second antenna module ANT2. The transceiver circuit 1250 may be configured to transmit or receive a first signal through the first antenna module ANT1 and a second signal through the second antenna module ANT2. Meanwhile, the transceiver circuit 1250 may be operatively coupled to the first antenna module ANT1 to the third antenna module ANT3. The transceiver circuit 1250 may be configured to transmit or receive the first signal through the first antenna module ANT1, the second signal through the second antenna module ANT2, and a third signal through the third antenna module ANT3.

Also, the transceiver circuit 1250 may be configured to transmit or receive four or more signals through other antenna modules in addition to the first antenna module ANT1 to the third antenna module ANT3. Referring to FIGS. 7B and 11, the transceiver circuit 1250 may emit a signal through a front or rear surface of the electronic device through a second-type array antenna such as a dipole (monopole) antenna. Accordingly, the transceiver circuit 1250 may transmit and receive signals through at least one of the first antenna module ANT1 to the third antenna module ANT3 and at least one of the second type array antenna modules.

The baseband processor 1400 may be operatively coupled to the transceiver circuit 1250. The baseband processor 1400 may be configured to perform multiple input/output (MIMO) or diversity using first and second signals transmitted or received through the transceiver circuit 1250. The baseband processor 1400 may be configured to perform multiple input/output (MIMO) or diversity using first to third signals transmitted or received through the transceiver circuit 1250. The baseband processor 1400 may be configured to perform multiple input/output (MIMO) or diversity through first to fourth signals transmitted or received through the transceiver circuit 1250. Here, the fourth signal may be a signal transmitted or received through the second-type array antenna module.

The multiple input/output (MIMO) operation described herein may be performed through two or more antenna modules. Hereinafter, the multi-input/output (MIMO) operation performed through the first antenna module (ANT1) 1100-1 and the second antenna module (ANT2) 1100-2 formed on the different side surfaces of the electronic device will be described. Meanwhile, the plurality of antenna modules disposed in the electronic device may further include a third antenna module (ANT3) 1100-3 configured to radiate a third signal through the rear surface of the electronic device. The third antenna module (ANT3) 1100-3 may be arranged to be spaced apart from the first antenna module (ANT1) 1100-1 or the second antenna module (ANT2) 1100-2.

The transceiver circuit 1250 may be operatively coupled to the first antenna module (ANT1) 1100-1 and the second antenna module (ANT2) 1100-2. The transceiver circuit 1250 may be configured to transmit or receive the first signal through the first antenna module (ANT1) 1100-1 and the second signal through the second antenna module (ANT2) 1100-2.

The baseband processor 1400 may be operatively coupled to the transceiver circuit 1250. The baseband processor 1400 may be configured to perform multiple input/output (MIMO) using the first and second signals transmitted or received through the transceiver circuit 1250. In this regard, beamforming regions through the first antenna module (ANT1) 1100-1 and the second antenna module (ANT2) 1100-2 may be configured so as not to overlap each other. Accordingly, spatial isolation between the first signal and the second signal through the first antenna module (ANT1) 1100-1 and the second antenna module (ANT2) 1100-2 can be improved.

Hereinafter, antenna performance according to an arrangement form of a plurality of antenna modules described herein and frequency bands of those antenna modules will be described. In this regard, FIGS. 16A and 16B compare radiation pattern characteristics in different bands according to antenna modules disposed at various positions of an electronic device according to an embodiment.

Figure 16A:
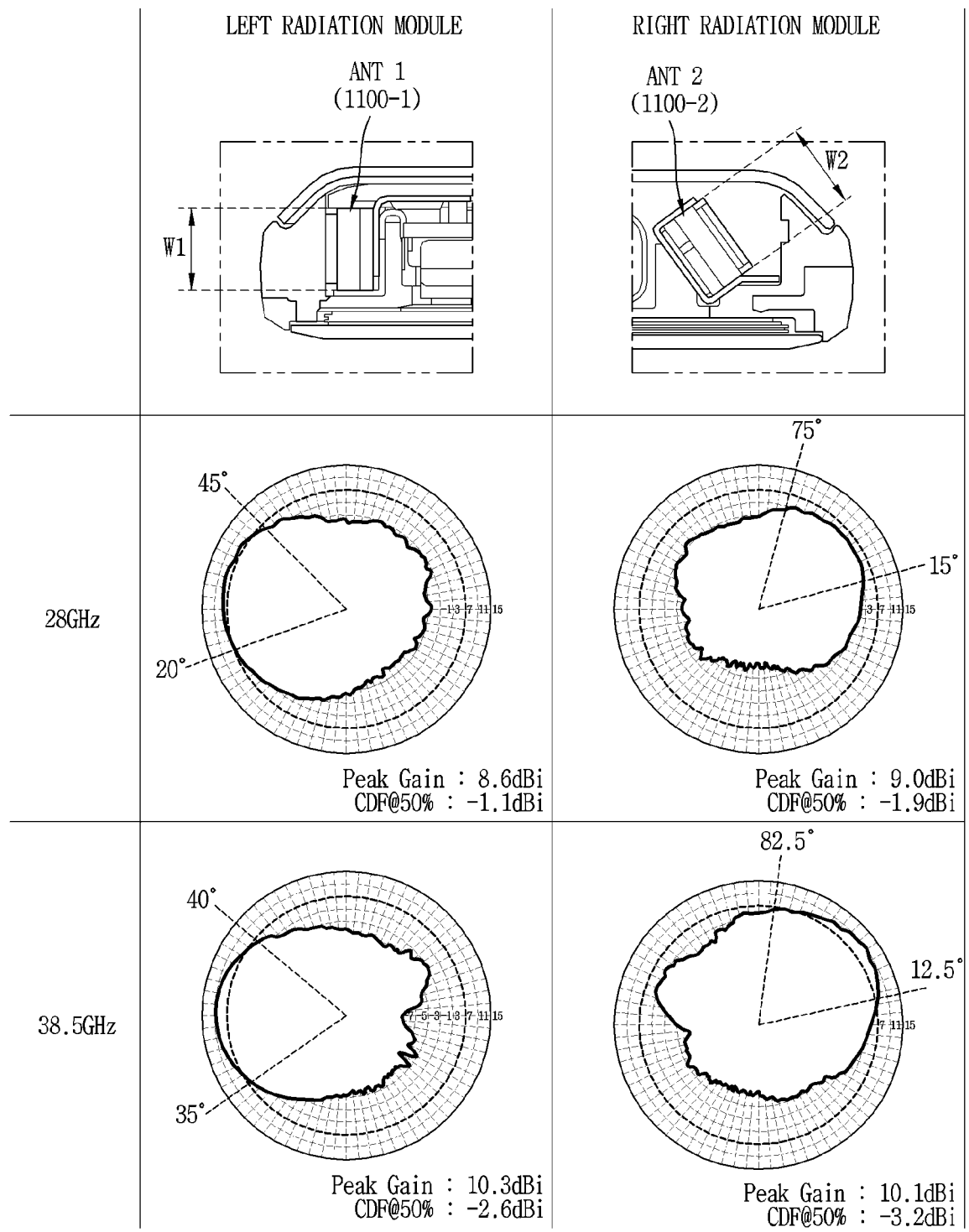
FIGS. 16A and 16B are comparison views of radiation pattern characteristics in different bands according to antenna modules disposed at various positions of an electronic device according to one embodiment.
Figure 16B:
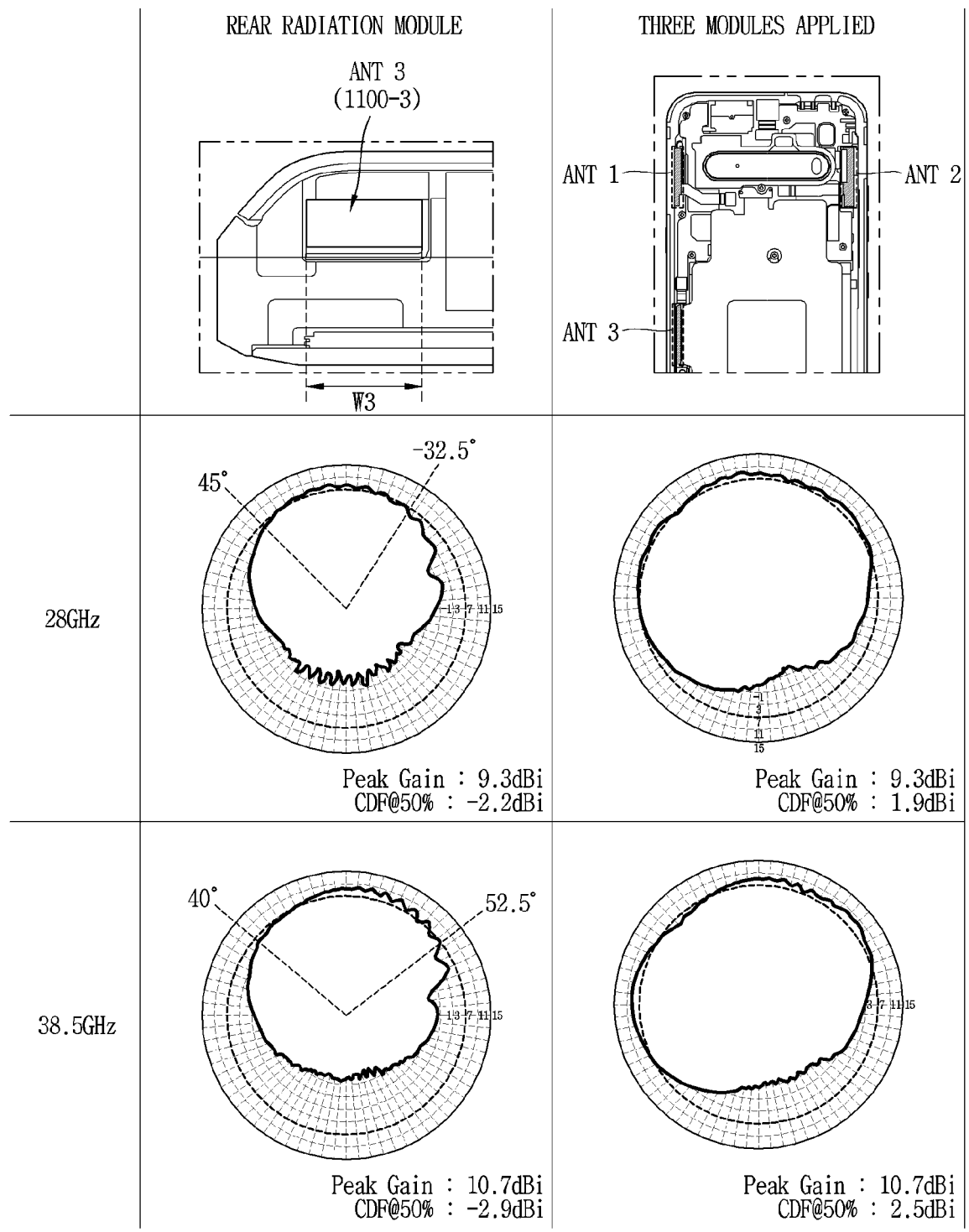

Referring to FIG. 16A, the first antenna module (ANT1) 1100-1 disposed on one side, for example, a left side of the electronic device may be arranged to be perpendicular or vertical to the baseline. In this case, a peak gain in a first frequency band (28 GHz) is 8.6 dBi, and a cumulative distribute function (CDF) @ 50% is −1.1 dBi. In this case, the beam coverage ranges from −20 degrees to 45 degrees. On the other hand, a peak gain in a second frequency band (38.5 GHz) is 10.3 dBi, and a CDF @ 50% is −2.6 dBi. In this case, the beam coverage ranges from −35 degrees to 40 degrees.

A first antenna module (ANT2) 1100-2 disposed on another side, for example, a right side of the electronic device may be arranged to be tilted from the baseline by a predetermined angle. In this case, a peak gain in a first frequency band (28 GHz) is 9.0 dBi, and a CDF @ 50% is −1.9 dBi. In this case, the beam coverage ranges from 15 degrees to 75 degrees. On the other hand, a peak gain in a second frequency band (38.5 GHz) is 10.1 dBi and a CDF @ 50% is −3.2 dBi. In this case, the beam coverage ranges from 12.5 degrees to 82.5 degrees.

Therefore, even when the metal frame is disposed through the second antenna module (ANT2) 1100-2 disposed in the tilted form by the predetermined angle described herein, the antenna characteristics can be maintained or even improved in a specific band. In addition, by forming different peak directions of the radiation patterns on different side surfaces of the electronic device, diversification of signal transmission and reception characteristics can be improved.

Referring to FIG. 16B, the third antenna module (ANT3) 1100-3 that radiates signals to the rear surface of the electronic device may be arranged in parallel to the baseline. In this case, a peak gain in a first frequency band (28 GHz) is 9.3 dBi and a CDF @ 50% is −2.2 dBi. In this case, the beam coverage ranges from −45 degrees to 32.5 degrees. On the other hand, a peak gain in a second frequency band (38.5 GHz) is 10.7 dBi and a CDF @ 50% is −2.9 dBi. In this case, the beam coverage ranges from −40 degrees to 52.5 degrees.

Meanwhile, the characteristic of the CDF @ 50% may be improved by using the three antenna modules of the aforementioned first to third antenna modules (ANT1 to ANT3) 1100-1 to 1100-3. In this case, a peak gain in a first frequency band (28 GHz) is 9.3 dBi, and a CDF @ 50% is 1.9 dBi. In this regard, the peak gain is the same as when the third antenna module (ANT3) 1100-3 having the highest peak gain is used, and the CDF @ 50% is improved. This results from that the optimal signal transmission and reception is possible using any one of the first to third antenna modules (ANT1 to ANT3) 1100-1 to 1100-3.

A peak gain in a second frequency band (38.5 GHz) is 10.7 dBi, and a CDF @ 50% is 2.5 dBi. In this regard, the peak gain is the same as when the third antenna module (ANT3) 1100-3 having the highest peak gain is used, and the CDF @ 50% is improved. This results from that the optimal signal transmission and reception is possible using any one of the first to third antenna modules (ANT1 to ANT3) 1100-1 to 1100-3.

In regard to the antenna characteristics, all of the first to third antenna modules (ANT1 to ANT3) 1100-1 to 1100-3 may be configured as one-dimensional array antennas, for example, 1×4 array antennas. Accordingly, widths of the first to third antenna modules (ANT1 to ANT3) 1100-1 to 1100-3 may be set to be the same.

Beamforming may be performed in an X-axis direction, which is a horizontal direction of the electronic device, through the first to third antenna modules (ANT1 to ANT3) 1100-1 to 1100-3) described herein. To this end, the first to third antenna modules (ANT1 to ANT3) 1100-1 to 1100-3 may be configured as 1×4 array antennas as illustrated in FIG. 7A.

On the other hand, some of the first to third antenna modules (ANT1 to ANT3) 1100-1 to 1100-3 may alternatively be configured as 2×4 array antennas, other than the 1×4 array antennas as illustrated in FIG. 7A. In this case, it may be configured to perform two-dimensional beamforming through the 2×4 array antennas, or directional beams may be used without beamforming.

In one embodiment, the second antenna module (ANT2) 1100-2 and the third antenna module (ANT3) 1100-3 may be arranged inside the electronic device even though the 2×4 array antennas are used. In this case, the second antenna module (ANT2) 1100-2 may be configured to have a larger width value W2 than a width value W1 of the first antenna module (ANT1) 1100-1 that is the 1×4 array antenna. In addition, the third antenna module (ANT3) 1100-3 may be configured to have a larger width value W3 than the width value W1 of the first antenna module (ANT1) 1100-1 which is the 1×4 array antenna.

In this regard, referring to FIGS. 3B, 12 and 16, a gain of a power amplifier or a reception amplifier in the transceiver circuit 1250 or the front-end module may be varied. For example, when the 2×4 array antennas are used for the second antenna module (ANT2) 1100-2 and the third antenna module (ANT3) 1100-3, the gain of the power amplifier or the reception amplifier connected to the module may be reduced. Accordingly, power consumption of circuit components provided in the electronic device can be reduced so as to reduce overall power consumption and solve a heat generation issue.

The foregoing description has been given of the electronic device having the plurality of antenna modules and transmission/reception circuits. Hereinafter, a wireless communication system including an electronic device that transmits a reference signal through a plurality of antenna modules and transmission/reception circuits, and a base station. In this regard, FIG. 17 illustrates a block diagram of a wireless communication system that is applicable to methods proposed herein.

Figure 17:
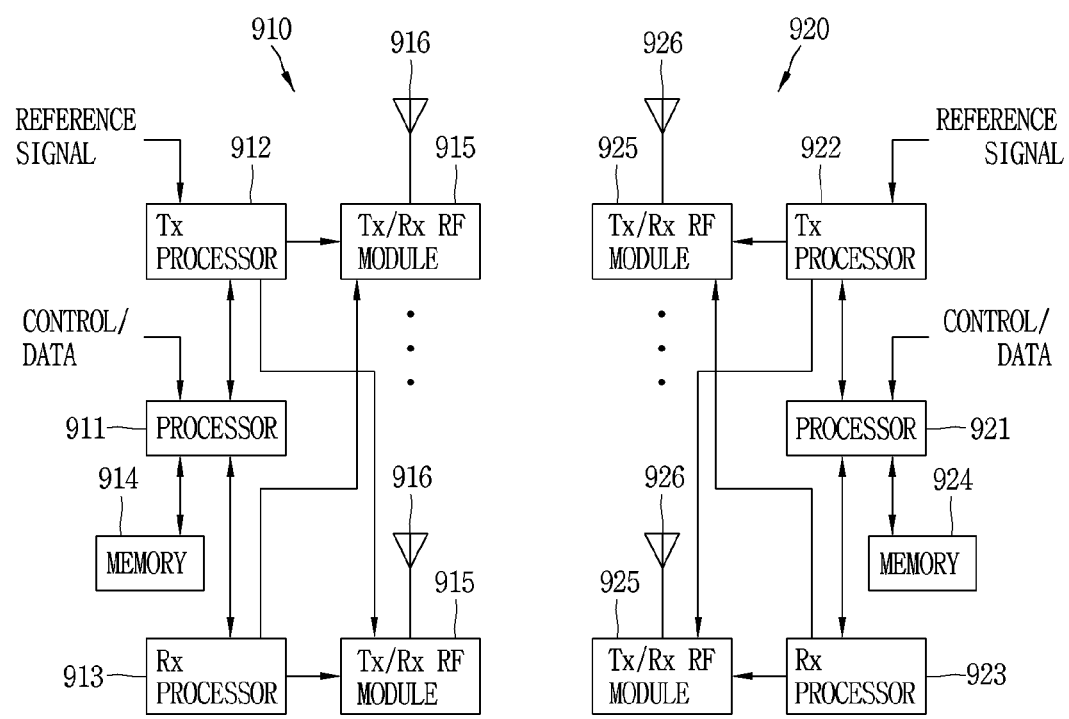
FIG. 17 is an exemplary block diagram of a wireless communication system that is applicable to methods proposed in the present disclosure.

Referring to FIG. 17, the wireless communication system includes a first communication device 910 and/or a second communication device 920. "A and/or B" may be interpreted to denote the same as "comprising at least one of A and B". The first communication device may represent a base station, and the second communication device may represent a terminal (or the first communication device may represent a terminal, and the second communication device may represent a base station).

The base station (BS) may be replaced with a term such as a fixed station, a Node B, an evolved-NodeB (eNB), a Next Generation NodeB (gNB), a base transceiver system (BTS), an access point (AP), or a general NB (gNB), a 5G system, a network, an AI system, a road side unit (RSU), robot or the like. In addition, a terminal may be stationary or mobile, and may include a user equipment (UE), a mobile station (MS), a user terminal (UT), a mobile subscriber station (MSS), a subscriber station (SS), and an advanced mobile (AMS), a wireless terminal (WT), a machine-type communication (MTC) device, a machine-to-machine (M2M) device, a device-to-device (D2D) device, a vehicle, a robot, an AI module or the like.

The first communication device and the second communication device may each include a processor 911, 921, a memory 914, 924, at least one Tx/Rx RF module 915, 925, a Tx processor 912, 922, an Rx processor 913, 923, and an antenna 916, 926. The processor implements the functions, processes and/or methods described above. More specifically, in a DL communication (communication from the first communication device to the second communication device), upper layer packets from a core network are provided to the processor 911. The processor implements a function of an L2 layer. In the DL, the processor provides multiplexing, radio resource allocation between a logical channel and a transport channel to the second communication device 920, and is responsible for signaling to the second communication device. A transmit (TX) processor 912 implements various signal processing functions for an L1 layer (i.e., physical layer). The signal processing functions facilitate forward error correction (FEC) in the second communication device, and include coding and interleaving. Coded and modulated symbols are split into parallel streams, and each stream is mapped to an OFDM subcarrier, and multiplexed with a reference signal (RS) in a time and/or frequency domain, and combined together using an Inverse Fast Fourier Transform (IFFT) to create a physical channel carrying a time-domain OFDMA symbol stream. An OFDM stream is spatially precoded to produce multiple spatial streams. Each spatial stream may be provided to a different antenna 916 through an individual Tx/Rx module (or transceiver 915).

Each Tx/Rx module may modulate an RF carrier with each spatial stream for transmission. In the second communication device, each Tx/Rx module (or transceiver) 925 receives a signal through each antenna 926 of each Tx/Rx module. Each Tx/Rx module recovers information modulated to an RF carrier, and provides it to the receive (RX) processor 923. The RX processor implements various signal processing functions of a layer 1. The RX processor may perform spatial processing on the information to recover any spatial streams heading to the second communication device. If multiple spatial streams proceed to the second communication device, they may be combined into a single OFDMA symbol stream by multiple RX processors. The RX processor converts the OFDMA symbol stream from a time domain to a frequency domain using fast Fourier transform (FFT). The frequency domain signal includes an individual OFDMA symbol stream for each subcarrier of the OFDM signal. The symbols and reference signal on each subcarrier are recovered and demodulated by determining the most likely signal placement points transmitted by the first communication device. Such soft decisions may be based on channel estimate values. The soft decisions are decoded and deinterleaved to recover data and control signals originally transmitted by the first communication device on the physical channel. The corresponding data and control signals are provided to the processor 921.

The UL (communication from the second communication device to the first communication device) is processed at the first communication device 910 in a similar manner to that described in connection with a receiver function at the second communication device 920. Each Tx/Rx module 925 receives a signal via each antenna 926. Each Tx/Rx module provides an RF carrier and information to the RX processor 923. The processor 921 may be associated with the memory 924 that stores program codes and data. The memory may be referred to as a computer readable medium.

The foregoing description has been given of the electronic device having the plurality of antenna modules operating in the 5G mmWave band. Hereinafter, technical effects of the electronic device having the plurality of antenna modules operating in the 5G mmWave band as described above will be described.

According to the present disclosure, a plurality of antenna modules operating in a 5G mmWave band can be disposed inside different side surfaces of an electronic device.

Further, the present disclosure can provide a structure capable of preventing interference with a metal frame by rotating a plurality of antenna modules operating in a 5G mmWave band at a predetermined angle.

In addition, according to the present disclosure, antenna radiation characteristics and CDF performance can be improved by way of rotating some of a plurality of antenna modules operating in a 5G mmWave band by a predetermined angle, and changing a shape of a metal frame.

In addition, according to the present disclosure, antenna radiation characteristics and CDF performance can be improved by way of rotating some of a plurality of antenna modules operating in a 5G mmWave band by a predetermined angle in a state where a metal rim for another antenna module is provided, and changing a shape of a metal frame.

Further scope of applicability of the present invention will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

With regard to the present disclosure described above, the design of an antenna including processors 180, 1250, and 1400 and a controller for controlling the same in an electronic device 180 having a plurality of antennas, and a control method thereof may be implemented as codes readable by a computer on a medium written by a program. The computer-readable media includes all types of recording devices in which data readable by a computer system can be stored. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

What is claimed is:

1. An electronic device, comprising:
   a cover glass through which electromagnetic waves are transmitted;
   a case having a metal rim formed on a side surface of the electronic device;
   an antenna module configured to transmit or receive beamformed signals through a plurality of antenna elements,
   wherein the antenna module is configured to be coupled with a module bracket and is tilted at a predetermined slant angle from a baseline of the electronic device so as to radiate the beamformed signals through the cover glass;
   a side key provided at the metal rim in a lengthwise direction of the antenna module; and
   a side key bracket having a hole formed therein to receive the side key, and configured to support the antenna module, wherein the side key bracket is formed of a dielectric, and a signal radiated through the antenna module is radiated through the side key bracket and the cover glass.

2. The electronic device of claim 1, wherein a part of a lower region of the antenna module is disposed lower than the metal rim.

3. The electronic device of claim 1, further comprising a dielectric mold portion disposed between the metal rim and the cover glass,
   wherein the predetermined slant angle is determined in a manner that a beam coverage region by the antenna module is not blocked by the metal rim.

4. The electronic device of claim 3,
   wherein the metal rim includes a lower metal rim disposed on a bottom of the side key and an upper metal rim disposed on a top of the side key.

5. The electronic device of claim 4, wherein the dielectric mold portion is formed inside the cover glass in a first region where the side key is not provided, so as to support a lower portion of the module bracket, and
   wherein the beam coverage region by the antenna module is formed in a region of the dielectric mold portion and the cover glass, so as not to be blocked by the metal rim.

6. The electronic device of claim 4, wherein the dielectric mold portion is disposed on an upper portion of the upper metal rim to be located inside the cover glass in a second region where the side key is provided, and
   wherein the beam coverage region by the antenna module is formed in a region of the dielectric mold portion and the cover glass, so as not to be blocked by the upper metal rim.

7. The electronic device of claim 1, wherein the module bracket is configured to be mounted on a slanted surface of a metal frame corresponding to the case.

8. The electronic device of claim 7, wherein the case is a middle case formed between a rear case of the electronic device and a front case corresponding to the cover glass,
   wherein the metal frame corresponding to the middle case includes a hole reception portion integrally formed with the slanted surface, and
   wherein the hole reception portion is coupled to a screw hole, formed integrally with the module bracket, through a screw for fixing the module bracket.

9. The electronic device of claim 1, wherein the module bracket is provided with a lower end support portion formed on a lower end thereof and configured to support a lower portion of the antenna module, and
   wherein the side key bracket is disposed on an upper portion of the lower end support portion and the antenna module and the side key bracket partially overlap each other.

10. The electronic device of claim 1, wherein the module bracket is provided with an upper end support portion formed on an upper end thereof and configured to support an upper portion of the antenna module, and
    wherein one end of the upper end support portion is configured not to cover a substrate of the antenna module to prevent blocking of the signal radiated through the antenna module.

11. The electronic device of claim 1, wherein the antenna module comprises:
    a dielectric carrier disposed to be mounted on the module bracket; and
    at least one substrate disposed on an upper portion of the dielectric carrier,
    wherein the plurality of antenna elements are disposed at predetermined intervals on an upper or lower layer of a specific substrate of the at least one substrate of the antenna module.

12. The electronic device of claim 11, wherein the plurality of antenna elements are configured as arbitrary polygonal patch antennas or circular patch antennas in a rotated state by a predetermined angle, and
    wherein beamforming is performed by applying a phase-varied signal between the plurality of antenna elements within the antenna module.

13. The electronic device of claim 1, further comprising a first antenna module configured to radiate a first signal through another side surface of the electronic device,
    wherein the antenna module is a second antenna module configured to radiate a second signal through one side surface of the electronic device.

14. The electronic device of claim 13, wherein the first antenna module is disposed perpendicular to the baseline of the electronic device, and the second antenna module is disposed to be tilted at a predetermined slant angle from the baseline of the electronic device, and
    wherein a lower end of the first antenna module is disposed to be higher than an upper end of the metal rim, so that a signal radiated through the first antenna module is not blocked by the metal rim.

15. The electronic device of claim 13, wherein the first antenna module is disposed perpendicular to the baseline of the electronic device, and the second antenna module is disposed to be tilted at a predetermined slant angle from the baseline of the electronic device, and
    wherein a part of a lower region of the first antenna module is disposed to be lower than an upper end of the metal rim, and lower ends of antenna elements within the first antenna module are disposed to be higher than the upper end of the metal rim.

16. The electronic device of claim 13, further comprising:
- a transceiver circuit operatively coupled with the first antenna module and the second antenna module, and configured to transmit or receive a first signal through the first antenna module and a second signal through the second antenna module; and
- a baseband processor operatively coupled with the transceiver circuit, and configured to perform multiple input/output (MIMO) through the first signal and the second signal transmitted or received through the transceiver circuit.

17. The electronic device of claim 13, further comprising a third antenna module disposed with being spaced a predetermined distance apart from the first antenna module or the second antenna module and configured to radiate a third signal through a rear surface of the electronic device.

\* \* \* \* \*